(12) United States Patent
Comstock, II et al.

(10) Patent No.: US 10,522,963 B2
(45) Date of Patent: Dec. 31, 2019

(54) LASER CUTTING OF MATERIALS WITH INTENSITY MAPPING OPTICAL SYSTEM

(71) Applicant: Corning Incorporated, Corning, NY (US)

(72) Inventors: Lovell Eglin Comstock, II, Charlestown, NH (US); Jaques Gollier, Redmond, WA (US); Thien An Thi Nguyen, Corning, NY (US); Garrett Andrew Piech, Corning, NY (US); Mark Ranney Westcott, Rochester, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/689,456

(22) Filed: Aug. 29, 2017

(65) Prior Publication Data

US 2018/0062342 A1 Mar. 1, 2018

Related U.S. Application Data

(60) Provisional application No. 62/402,337, filed on Sep. 30, 2016, provisional application No. 62/381,345, filed on Aug. 30, 2016.

(51) Int. Cl.
*B23K 26/04* (2014.01)
*B23K 26/53* (2014.01)
(Continued)

(52) U.S. Cl.
CPC ............ *H01S 3/0085* (2013.01); *B23K 26/04* (2013.01); *B23K 26/064* (2015.10);
(Continued)

(58) Field of Classification Search
CPC . C03B 33/0222; C03B 33/091; C03B 33/033; C03B 33/0215; C03B 33/04;
(Continued)

(56) References Cited

U.S. PATENT DOCUMENTS 1,790,397 A 1/1931 Woods et al.
2,682,134 A 6/1954 Stookey
(Continued)

FOREIGN PATENT DOCUMENTS

CN 2388062 Y 7/2000
CN 1283409 C 11/2006
(Continued)

OTHER PUBLICATIONS

McGloin et al."Bessel beams: diffraction in a new light" Contemporary Physics, vol. 46 No. 1 (2005) pp. 15-28.
(Continued)

*Primary Examiner* — David A Vanore
(74) *Attorney, Agent, or Firm* — Smit Kapadia; Svetlana Z. Short

(57) ABSTRACT

A method of laser processing a workpiece includes: focusing a pulsed laser beam into a laser beam focal line directed into the workpiece such that the laser beam focal line generates an induced absorption and produces a defect line along the laser beam focal line within the workpiece. The laser beam focal line has length L and a substantially uniform intensity profile such that the peak intensity distribution over at least 85% of the length L of the focal line does not vary by more 40%, and in some embodiments by no more than 30 or 20% from its mean peak intensity.

56 Claims, 26 Drawing Sheets

(51) Int. Cl.
- *H01S 3/06* (2006.01)
- *H01S 3/00* (2006.01)
- *B23K 26/0622* (2014.01)
- *B23K 26/064* (2014.01)
- *B23K 26/06* (2014.01)
- *B23K 26/067* (2006.01)
- *B23K 26/073* (2006.01)
- *C03B 33/02* (2006.01)
- *B23K 103/00* (2006.01)

(52) U.S. Cl.
CPC ...... *B23K 26/0624* (2015.10); *B23K 26/0648* (2013.01); *B23K 26/0665* (2013.01); *B23K 26/0673* (2013.01); *B23K 26/073* (2013.01); *B23K 26/53* (2015.10); *C03B 33/0222* (2013.01); *H01S 3/061* (2013.01); *B23K 2103/54* (2018.08)

(58) Field of Classification Search
CPC ... C03B 33/082; C03B 33/102; C03B 33/023; C03B 33/07; C03B 17/064; C03B 23/02; C03B 23/023; C03B 23/025; B23K 26/0624; B23K 26/53; B23K 26/54; B23K 26/40; B23K 26/402; B23K 26/006; B23K 26/0087; B23K 26/0613; B23K 26/0006; B23K 26/0622; B23K 26/04; B23K 26/0617; B23K 26/0648; B23K 26/0738; B23K 26/0884; B23K 26/38; B23K 26/384; B23K 26/57; B23K 26/064; B23K 26/0665; B23K 26/0673; B23K 26/0676; B23K 26/073; B23K 26/0734; B23K 26/382; B23K 26/55; B23K 26/706; Y01T 428/24777; Y01T 428/15; Y01T 428/24273; Y01T 428/24322; Y01T 428/24355; Y01T 428/249921; Y01T 428/21; Y01T 428/24471
USPC ................. 65/112, 31, 111, 160, 29.18, 65; 219/121.66, 121.72, 121.73, 121.75, 219/121.76, 121.78
See application file for complete search history.

(56) References Cited

U.S. PATENT DOCUMENTS

| | | |
|---|---|---|
| 2,749,794 A | 6/1956 | O'Leary |
| 3,647,410 A | 3/1972 | Heaton et al. |
| 3,695,497 A | 10/1972 | Dear |
| 3,695,498 A | 10/1972 | Dear |
| 3,729,302 A | 4/1973 | Heaton |
| 3,775,084 A | 11/1973 | Heaton |
| 4,226,607 A | 10/1980 | Domken |
| 4,441,008 A | 4/1984 | Chan |
| 4,546,231 A | 10/1985 | Gresser et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 5,035,918 A | 7/1991 | Vyas |
| 5,040,182 A | 8/1991 | Spinelli et al. |
| 5,104,210 A | 4/1992 | Tokas |
| 5,108,857 A | 4/1992 | Kitayama et al. |
| 5,112,722 A | 5/1992 | Tsujino et al. |
| 5,114,834 A | 5/1992 | Nachshon |
| 5,265,107 A | 11/1993 | Delfyett |
| 5,400,350 A | 3/1995 | Galvanauskas et al. |
| 5,434,875 A | 7/1995 | Rieger et al. |
| 5,436,925 A | 7/1995 | Lin et al. |
| 5,553,093 A | 9/1996 | Ramaswamy et al. |
| 5,574,597 A | 11/1996 | Kataoka et al. |
| 5,586,138 A | 12/1996 | Yokayama |
| 5,656,186 A | 8/1997 | Mourou et al. |
| 5,676,866 A | 10/1997 | In Den Baumen et al. |
| 5,684,642 A | 11/1997 | Zumoto et al. |
| 5,696,782 A | 12/1997 | Harter et al. |
| 5,736,709 A | 4/1998 | Neiheisel |
| 5,776,220 A | 7/1998 | Allaire et al. |
| 5,854,751 A * | 12/1998 | Di Pietro ............. B23K 26/034 700/166 |
| 6,016,223 A | 1/2000 | Suzuki et al. |
| 6,033,583 A | 3/2000 | Musket et al. |
| 6,038,055 A | 3/2000 | Hansch et al. |
| 6,055,829 A | 5/2000 | Witzmann et al. |
| 6,078,599 A | 6/2000 | Everage et al. |
| 6,156,030 A | 12/2000 | Neev |
| 6,160,835 A | 12/2000 | Kwon |
| 6,186,384 B1 | 2/2001 | Sawada |
| 6,210,401 B1 | 4/2001 | Lai |
| 6,256,328 B1 | 7/2001 | Delfyett et al. |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,322,958 B1 | 11/2001 | Hayashi |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,484,052 B1 | 11/2002 | Visuri et al. |
| 6,489,589 B1 | 12/2002 | Alexander |
| 6,501,578 B1 | 12/2002 | Bernstein et al. |
| 6,552,301 B2 | 4/2003 | Herman et al. |
| 6,573,026 B1 | 6/2003 | Aitken et al. |
| 6,592,703 B1 | 7/2003 | Habeck et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,161 B1 | 5/2004 | Miura et al. |
| 6,744,009 B1 | 6/2004 | Xuan et al. |
| 6,787,732 B1 | 9/2004 | Xuan et al. |
| 6,800,237 B1 | 10/2004 | Yamamoto et al. |
| 6,800,831 B1 | 10/2004 | Hoetzel |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,061,583 B2 | 6/2006 | Mulkens et al. |
| 7,353,829 B1 | 4/2008 | Wachter et al. |
| 7,402,773 B2 | 7/2008 | Nomaru |
| 7,511,886 B2 | 3/2009 | Schultz et al. |
| 7,535,634 B1 | 5/2009 | Savchenkov et al. |
| 7,633,033 B2 | 12/2009 | Thomas et al. |
| 7,642,483 B2 | 1/2010 | You et al. |
| 7,649,153 B2 | 1/2010 | Haight et al. |
| 7,726,532 B2 | 6/2010 | Gonoe |
| 8,104,385 B2 | 1/2012 | Hayashi et al. |
| 8,118,971 B2 | 2/2012 | Hori et al. |
| 8,132,427 B2 | 3/2012 | Brown et al. |
| 8,168,514 B2 | 5/2012 | Garner et al. |
| 8,245,539 B2 | 8/2012 | Lu et al. |
| 8,245,540 B2 | 8/2012 | Abramov et al. |
| 8,269,138 B2 | 9/2012 | Garner et al. |
| 8,283,595 B2 | 10/2012 | Fukuyo et al. |
| 8,292,141 B2 | 10/2012 | Cox et al. |
| 8,296,066 B2 | 10/2012 | Zhao et al. |
| 8,327,666 B2 | 12/2012 | Harvey et al. |
| 8,341,976 B2 | 1/2013 | Dejneka et al. |
| 8,347,651 B2 | 1/2013 | Abramov et al. |
| 8,358,888 B2 | 1/2013 | Ramachandran |
| 8,444,906 B2 | 5/2013 | Lee et al. |
| 8,448,471 B2 | 5/2013 | Kumatani et al. |
| 8,518,280 B2 | 8/2013 | Hsu et al. |
| 8,549,881 B2 | 10/2013 | Brown et al. |
| 8,584,354 B2 | 11/2013 | Cornejo et al. |

(56) References Cited

U.S. PATENT DOCUMENTS

| | | |
|---|---|---|
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,697,228 B2 | 4/2014 | Carre et al. |
| 8,720,228 B2 | 5/2014 | Li |
| 8,826,696 B2 | 9/2014 | Brown et al. |
| 8,852,698 B2 | 10/2014 | Fukumitsu |
| 8,887,529 B2 | 11/2014 | Lu et al. |
| 8,943,855 B2 | 2/2015 | Gomez et al. |
| 8,951,889 B2 | 2/2015 | Ryu et al. |
| 8,971,053 B2 | 3/2015 | Kariya et al. |
| 9,138,913 B2 | 9/2015 | Arai et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,446,590 B2 | 9/2016 | Chen et al. |
| 9,481,598 B2 | 11/2016 | Bergh |
| 9,815,730 B2 * | 11/2017 | Marjanovic ............ C03B 33/091 |
| 9,850,160 B2 * | 12/2017 | Marjanovic ......... C03B 33/0222 |
| 9,873,628 B1 * | 1/2018 | Haloui .................. C03B 33/102 |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2003/0006221 A1 | 1/2003 | Hong et al. |
| 2003/0007773 A1 | 1/2003 | Kondo et al. |
| 2004/0021615 A1 | 11/2004 | Postupack et al. |
| 2005/0024743 A1 | 2/2005 | Camy-Peyret |
| 2005/0098548 A1 | 5/2005 | Kobayashi et al. |
| 2005/0115938 A1 | 6/2005 | Sawaki et al. |
| 2005/0274702 A1 | 12/2005 | Deshi |
| 2005/0277270 A1 | 12/2005 | Yoshikawa et al. |
| 2006/0011593 A1 | 1/2006 | Fukuyo |
| 2006/0028728 A1 | 2/2006 | Li |
| 2006/0109874 A1 | 5/2006 | Shiozaki et al. |
| 2006/0127679 A1 | 6/2006 | Gulati et al. |
| 2006/0151450 A1 | 7/2006 | You et al. |
| 2006/0227440 A1 | 10/2006 | Glukstad |
| 2006/0266744 A1 | 11/2006 | Nomaru |
| 2006/0289410 A1 | 12/2006 | Morita et al. |
| 2007/0091977 A1 | 4/2007 | Sohn et al. |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0079940 A1 | 4/2008 | Sezerman et al. |
| 2008/0099444 A1 | 5/2008 | Misawa et al. |
| 2009/0013724 A1 | 1/2009 | Koyo et al. |
| 2009/0032510 A1 * | 2/2009 | Ando ................... B23K 26/067 219/121.72 |
| 2009/0176034 A1 | 7/2009 | Ruuttu et al. |
| 2009/0183764 A1 | 7/2009 | Meyer |
| 2009/0242528 A1 | 10/2009 | Howerton et al. |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0029460 A1 | 2/2010 | Shojiya et al. |
| 2010/0032087 A1 | 2/2010 | Takahashi et al. |
| 2010/0086741 A1 | 4/2010 | Bovatsek et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0320179 A1 | 12/2010 | Morita et al. |
| 2010/0326138 A1 | 12/2010 | Kumatani et al. |
| 2011/0049764 A1 | 3/2011 | Lee et al. |
| 2011/0049765 A1 | 3/2011 | Lei et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0139760 A1 | 6/2011 | Shah et al. |
| 2011/0183116 A1 | 7/2011 | Hung et al. |
| 2011/0210105 A1 | 9/2011 | Romashko et al. |
| 2011/0240611 A1 | 10/2011 | Sandstrom et al. |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0067858 A1 | 3/2012 | Kangastupa et al. |
| 2012/0103018 A1 | 5/2012 | Lu et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0205356 A1 | 8/2012 | Pluss |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0056450 A1 | 3/2013 | Lissotschenko et al. |
| 2013/0061636 A1 | 3/2013 | Imai et al. |
| 2013/0068736 A1 | 3/2013 | Mielke et al. |
| 2013/0075480 A1 | 3/2013 | Yokogi et al. |
| 2013/0091897 A1 | 4/2013 | Fujii et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0216573 A1 | 5/2013 | Hosseini et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0209731 A1 | 8/2013 | Nattermann et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |

(56) References Cited

U.S. PATENT DOCUMENTS

| | | | |
|---|---|---|---|
| 2014/0102146 A1 | 4/2014 | Saito et al. | |
| 2014/0110040 A1 | 4/2014 | Cok | |
| 2014/0113797 A1 | 4/2014 | Yamada et al. | |
| 2014/0133119 A1 | 5/2014 | Kariya et al. | |
| 2014/0141217 A1 | 5/2014 | Gulati et al. | |
| 2014/0147623 A1 | 5/2014 | Shorey et al. | |
| 2014/0147624 A1 | 5/2014 | Streltsov et al. | |
| 2014/0165652 A1 | 6/2014 | Saito | |
| 2014/0174131 A1 | 6/2014 | Saito et al. | |
| 2014/0199519 A1* | 7/2014 | Schillinger | B23K 26/0648 428/155 |
| 2014/0216108 A1 | 8/2014 | Wiegel et al. | |
| 2014/0290310 A1 | 10/2014 | Green | |
| 2014/0320947 A1 | 10/2014 | Egerton et al. | |
| 2014/0333929 A1 | 11/2014 | Sung et al. | |
| 2014/0361463 A1 | 12/2014 | Desimone et al. | |
| 2015/0014891 A1* | 1/2015 | Amatucci | C23F 4/02 264/447 |
| 2015/0034612 A1 | 2/2015 | Hosseini et al. | |
| 2015/0038313 A1 | 2/2015 | Hosseini | |
| 2015/0075221 A1 | 3/2015 | Kawaguchi et al. | |
| 2015/0075222 A1 | 3/2015 | Mader | |
| 2015/0110442 A1 | 4/2015 | Zimmel et al. | |
| 2015/0118522 A1 | 4/2015 | Hosseini | |
| 2015/0136743 A1 | 5/2015 | Hosseini | |
| 2015/0140241 A1 | 5/2015 | Hosseini | |
| 2015/0140735 A1 | 5/2015 | Hosseini | |
| 2015/0151380 A1 | 6/2015 | Hosseini | |
| 2015/0158120 A1* | 6/2015 | Courvoisier | B23K 26/0613 264/482 |
| 2015/0165548 A1 | 6/2015 | Marjanovic et al. | |
| 2015/0165560 A1 | 6/2015 | Hackert et al. | |
| 2015/0165562 A1* | 6/2015 | Marjanovic | C03B 33/0222 428/64.1 |
| 2015/0165563 A1 | 6/2015 | Manley et al. | |
| 2015/0166391 A1* | 6/2015 | Marjanovic | C03B 33/0222 428/43 |
| 2015/0166393 A1 | 6/2015 | Marjanovic et al. | |
| 2015/0166394 A1* | 6/2015 | Marjanovic | C03B 33/091 428/43 |
| 2015/0166395 A1* | 6/2015 | Marjanovic | B23K 26/0057 428/131 |
| 2015/0166396 A1* | 6/2015 | Marjanovic | B23K 26/0057 428/137 |
| 2015/0166397 A1 | 6/2015 | Marjanovic et al. | |
| 2015/0183679 A1* | 7/2015 | Saito | C03B 33/04 65/112 |
| 2015/0232369 A1* | 8/2015 | Marjanovic | C03B 33/0222 428/192 |
| 2015/0299018 A1* | 10/2015 | Bhuyan | B23K 26/0057 65/29.18 |
| 2015/0367442 A1 | 12/2015 | Bovatsek et al. | |
| 2016/0008927 A1* | 1/2016 | Grundmueller | B23K 26/57 65/112 |
| 2016/0009066 A1 | 1/2016 | Neiber et al. | |
| 2016/0023922 A1 | 1/2016 | Addiego et al. | |
| 2016/0031745 A1 | 2/2016 | Ortner et al. | |
| 2016/0060156 A1 | 3/2016 | Krueger et al. | |
| 2016/0279895 A1 | 9/2016 | Marjanovic et al. | |
| 2016/0280580 A1 | 9/2016 | Bohme | |
| 2016/0290791 A1 | 10/2016 | Buono et al. | |
| 2017/0052381 A1 | 2/2017 | Huang et al. | |
| 2017/0169847 A1 | 6/2017 | Tamaki | |
| 2017/0225996 A1* | 8/2017 | Bookbinder | C03B 33/0222 |
| 2017/0252859 A1* | 9/2017 | Kumkar | B23K 26/0057 |
| 2017/0368638 A1 | 12/2017 | Tayebati et al. | |
| 2018/0029919 A1* | 2/2018 | Schnitzler | C03B 33/0222 |
| 2018/0029920 A1* | 2/2018 | Marjanovic | B23K 26/0624 |
| 2018/0062342 A1* | 3/2018 | Comstock, II | C03B 33/0222 |
| 2018/0133837 A1* | 5/2018 | Greenberg | B23K 26/0648 |

FOREIGN PATENT DOCUMENTS

| | | |
|---|---|---|
| CN | 101386466 A | 3/2009 |
| CN | 101502914 A | 8/2009 |
| CN | 201357287 Y | 12/2009 |
| CN | 101637849 A | 2/2010 |
| CN | 201471092 U | 5/2010 |
| CN | 102060437 A | 5/2011 |
| CN | 102248302 A | 11/2011 |
| CN | 102343631 A | 2/2012 |
| CN | 102649199 A | 8/2012 |
| CN | 102672355 A | 9/2012 |
| CN | 102898014 A | 1/2013 |
| CN | 102916081 A | 2/2013 |
| CN | 102923939 A | 2/2013 |
| CN | 103013374 A | 4/2013 |
| CN | 103143841 A | 6/2013 |
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 10346027 A | 4/2014 |
| CN | 203509350 U | 4/2014 |
| CN | 104344202 A | 2/2015 |
| DE | 2231330 A1 | 1/1974 |
| DE | 10200635555 A1 | 1/2008 |
| DE | 102012010635 A1 | 11/2013 |
| DE | 102013223637 A1 | 5/2015 |
| EP | 0270897 A1 | 6/1988 |
| EP | 0609978 A1 | 8/1994 |
| EP | 1159104 B1 | 8/2004 |
| EP | 2202545 A1 | 6/2010 |
| EP | 2783784 A2 | 10/2014 |
| FR | 298294 A1 | 10/2013 |
| GB | 1242172 | 8/1971 |
| JP | 1179770 A | 7/1989 |
| JP | 6318756 A | 11/1994 |
| JP | 09106243 A | 4/1997 |
| JP | 11269683 A | 10/1999 |
| JP | 11347758 A | 12/1999 |
| JP | 2001138083 A | 5/2001 |
| JP | 2002228818 A | 8/2002 |
| JP | 2003062756 A | 3/2003 |
| JP | 2003114400 A | 4/2003 |
| JP | 2003154517 A | 5/2003 |
| JP | 2003238178 A | 8/2003 |
| JP | 2004209675 A | 7/2004 |
| JP | 2005104819 A | 4/2005 |
| JP | 2005205440 A | 8/2005 |
| JP | 2005288503 A | 10/2005 |
| JP | 3775250 B2 | 5/2006 |
| JP | 2006130691 A | 5/2006 |
| JP | 2006248885 A | 9/2006 |
| JP | 2007021548 A | 2/2007 |
| JP | 2007253203 A | 10/2007 |
| JP | 2009056482 A | 3/2009 |
| JP | 2009172633 A | 8/2009 |
| JP | 2010017990 A | 1/2010 |
| JP | 2010046761 A | 3/2010 |
| JP | 04592855 B2 | 12/2010 |
| JP | 2011049398 A | 3/2011 |
| JP | 04672689 B2 | 4/2011 |
| JP | 04880820 B2 | 2/2012 |
| JP | 2012024782 A | 2/2012 |
| JP | 2012031018 A | 2/2012 |
| JP | 2012159749 A | 8/2012 |
| JP | 2012187618 A | 10/2012 |
| JP | 2013007842 A | 1/2013 |
| JP | 2013031879 A | 2/2013 |
| JP | 2013043808 A | 3/2013 |
| JP | 2013075802 A | 4/2013 |
| JP | 2013091578 A | 5/2013 |
| JP | 05274085 B2 | 8/2013 |
| JP | 05300544 B2 | 9/2013 |
| JP | 2013187247 A | 9/2013 |
| JP | 2013203630 A | 10/2013 |
| JP | 2013203631 A | 10/2013 |

(56) References Cited

FOREIGN PATENT DOCUMENTS

| | | |
|---|---|---|
| JP | 2013223886 A | 10/2013 |
| KR | 2009057161 A | 6/2009 |
| KR | 1020621 B1 | 3/2011 |
| KR | 2012015366 A | 2/2012 |
| KR | 2012074508 A | 7/2012 |
| KR | 2013031380 A | 3/2013 |
| KR | 1269474 B1 | 5/2013 |
| KR | 2013124646 A | 11/2013 |
| KR | 1344368 B1 | 12/2013 |
| KR | 2014022980 A | 2/2014 |
| KR | 2014022981 A | 2/2014 |
| KR | 1020140064220 A | 5/2014 |
| TW | 201139025 A | 11/2011 |
| TW | 201226345 A | 7/2012 |
| WO | 1999029243 A1 | 6/1999 |
| WO | 1999063900 A1 | 12/1999 |
| WO | 2004110693 A1 | 12/2004 |
| WO | 2006073098 A1 | 7/2006 |
| WO | 2007094160 A1 | 8/2007 |
| WO | 2008049389 A1 | 5/2008 |
| WO | 2008080182 A1 | 7/2008 |
| WO | 2008128612 A1 | 10/2008 |
| WO | 2009114375 A2 | 9/2009 |
| WO | 2010035736 A1 | 4/2010 |
| WO | 2011056781 A1 | 5/2011 |
| WO | 2012006736 A2 | 1/2012 |
| WO | 2012166753 A2 | 6/2012 |
| WO | 2012108052 A1 | 8/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | 2014064492 A1 | 5/2014 |
| WO | 2014079478 A1 | 5/2014 |
| WO | 2014079570 A1 | 5/2014 |
| WO | 2015127583 A1 | 9/2015 |
| WO | 2016005455 A1 | 1/2016 |
| WO | 2016010954 A2 | 1/2016 |
| WO | 2016154284 A1 | 9/2016 |

OTHER PUBLICATIONS

Merola et al. "Characterization of Bessel beams generated by polymeric microaxicons" Meas. Sci. Technol. 23 (2012) 10 pgs.
Mirkhalaf, M. et al., Overcoming the brittleness of glass through bio-inspiration and micro-achitecture, Nature Communications, 5:3166/ncomm4166(2014).
Perry et al., "Ultrashort-pulse laser machining of dielectric materials"; Journal of Applied Physics, vol. 85, No. 9, May 1, 1999, American Institute of Physics, pp. 6803-6810.
Perry et al., "Ultrashort-pulse laser machining"; UCRL-ID-132159, Sep. 1998, pp. 1-38.
Perry et al., "Ultrashort-pulse laser machining"; UCRL-JC-132159 Rev 1., Jan. 22, 1999, pp. 1-24.
Polynkin et al., "Extended filamentation with temporally chirped femtosecond Bessel-Gauss beams in air"; Optics Express, vol. 17, No. 2, Jan. 19, 2009, OSA, pp. 575-584.
Romero et al. "Theory of optimal beam splitting by phase gratings. II. Square and hexagonal gratings" J. Opt. Soc. Am. A/vol 24 No. 8 (2007) pp. 2296-2312.
Salleo A et al., Machining of transparent materials using IR and UV nanosecond laser pulses, Appl. Physics A 71, 601-608, 2000.
Serafetinides et al., "Polymer ablation by ultra-short pulsed lasers" Proceedings of SPIE vol. 3885 (2000) http://proceedings.spiedigitallibrary.org/.
Serafetinides et al., "Ultra-short pulsed laser ablation of polymers"; Applied Surface Science 180 (2001) 42-56.
Shah et al. "Micromachining with a high repetition rate femtosecond fiber laser", Journal of Laser Micro/Nanoengineering vol. 3 No. 3 (2008) pp. 157-162.
Shealy et al. "Geometric optics-based design of laser beam shapers",Opt. Eng. 42(11), 3123-3138 (2003). doi:10.1117/1.1617311.
Stoian et al. "Spatial and temporal laser pulse design for material processing on ultrafast scales" Applied Physics A (2014) 114, p. 119-127.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Thiele, "Relation between catalytic activity and size of particle" Industrial and Egineering Chemistry, vol. 31 No. 7, pp. 916-920.
Toytman et al. "Optical breakdown in transparent media with adjustable axial length and location", Optics Express vol. 18 No. 24, 24688-24698 (2010).
Vanagas et al., "Glass cutting by femtosecond pulsed irradiation"; J. Micro/Nanolith. MEMS MOEMS, 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).
Velpula et al.. "Ultrafast imaging of free carriers: controlled excitation with chirped ultrafast laser Bessel beams", Proc. of SPIE vol. 8967 896711-1 (2014).
Wang et al, "Investigation on CO2 laser irradiation inducing glass strip peeling for microchannel formation", Biomicrofluidics 6, 012820 (2012).
Wu et al. "Optimal orientation of the cutting head for enhancing smoothness movement in three-dimensional laser cutting" (2013) Zhongguo Jiguang/Chinese Journal of Lasers, 40 (1), art. No. 0103005.
Xu et al. "Optimization of 3D laser cutting head orientation based on the minimum energy consumption" (2014) International Journal of Advanced Manufacturing Technology, 74 (9-12), pp. 1283-1291.
Yan et al. "Fiber structure to convert a Gaussian beam to higher-order optical orbital angular momentum modes" Optics Letters vol. 37 No. 16 (2012) pp. 3294-3296.
Yoshino et al., "Micromachining with a high repetition rate femtosecond fiber laser"; JLMN-Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.
"What is the difference between Ra and RMS?"; Harrison Electropolishing LP; (http://www.harrisonep.com/electropolishingra.html), Accessed Aug. 8, 2016.
"EagleEtch" Product Brochure, EuropeTec USA Inc., pp. 1-8, Aug. 1, 2014.
"PHAROS High-power femtosecond laser system" product brochure; Light Conversion, Vilnius, LT; Apr. 18, 2011, pp. 1-2.
"TruMicro 5000" Product Manual, Trumpf Laser GmbH + Co. KG, pp. 1-4, Aug. 2011.
Abakians et al."Evaporative Cutting of a Semitransparent Body With a Moving CW Laser", J. Heat Transfer 110(4a), 924-930 (Nov. 1, 1988) (7 pages) doi:10.1115/1.3250594.
Abramov et al., "Laser separation of chemically strengthened glass"; Physics Procedia 5 (2010) 285-290, Elsevier.; doi: 10.1016/j.phpro.2010.08.054.
Ahmed et al. "Display glass cutting by femtosecond laser induced single shot periodic void array" Applied Physics A: Materials Science and Proccessing vol. 93 No. 1 (2008) pp. 189-192.
Arimoto et al., "Imaging properties of axIcon in a scanning optical system"; Applied Optics, Nov. 1, 1992, vol. 31, No. 31, pp. 6653-6657.
Bagchi et al. "Fast ion beams from intense, femtosecond laser irradiated nanostructured surfaces" Applied Physics B 88 (2007) p. 167-173.
Bhuyan et al. "Laser micro- and nanostructuring using femtosecond Bessel beams", Eur. Phys. J. Special Topics 199 (2011) p. 101-110.
Bhuyan et al. "Single shot high aspect ratio bulk nanostructuring of fused silica using chirp-controlled ultrafast laser Bessel beams" Applied Physics Letters 104 (2014) 021107.

(56) References Cited

OTHER PUBLICATIONS

Bhuyan et al. "Ultrafast Bessel beams for high aspect ratio taper free micromachining of glass" Proc. of SPIE vol. 7728 77281V-1.
Bhuyan et al., "Femtosecond non-diffracting Bessel beams and controlled nanoscale ablation" by IEEE (2011).
Bhuyan et al., "High aspect ratio nanochannel machining using single shot femtosecond Bessel beams"; Applied Physics Letters 97, 081102 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.
Case Design Guidelines for Apple Devices Release R5 (https://web.archive.org/web/20131006050442/https://developer.apple.com/resources/cases/Case-Design-Guidelines.pdf ; archived on Oct. 6, 2013).
Chiao et al. 9. "Self-trapping of optical beams," Phys. Rev. Lett, vol. 13, No. 15, p. 479 (1964).
Corning Inc., "Corning® 1737 AM LCD Glass Substrates Material Information", issued Aug. 2002.
Corning Inc., "Corning® Eagle2000 TM AMLCD Glass Substrates Material Information", issued Apr. 2005.
Couairon et al. "Femtosecond filamentation in transparent media" Physics Reports 441 (2007) pp. 47-189.
Courvoisier et al. "Applications of femtosecond Bessel beams to laser ablation" Applied Physics A (2013) 112, p. 29-34.
Courvoisier et al. "Surface nanoprocessing with non-diffracting femtosecond Bessel beams" Optics Letters vol. 34 No. 20, (2009) p. 3163-3165.
Cubeddu et al., "A compact time-resolved reflectance system for dual-wavelength multichannel assessment of tissue absorption and scattering"; Part of the Spie Conference on Optical Tomography and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance"; Applied Optics, vol. 38, No. 16, Jun. 1, 1999, pp. 3670-3680.
Ding et al., "High-resolution optical coherence tomography over a large depth range with an axicon lens"; Optic Letters, vol. 27, No. 4, pp-243-245, Feb. 15, 2002, Optical Society of America.
Dong et al. "On-axis irradiance distribution of axicons illuminated by spherical wave", Optics & Laser Technology 39(2007) 1258-1261.
Duocastella et al. "Bessel and annular beams for material processing", Laser Photonics Rev. 6, 607-621, 2012.
Durnin. "Exact solutions for nondiffracting beams I. The scaler theory" J. Opt. Soc. Am. A. 4(4) pp. 651-654.
Eaton et al. "Heat accumulation effects in femtosecond laser written waveguides with variable repetition rates", Opt. Exp. 5280, vol. 14, No. 23, Jun. 2006.
Gattass et al. "Micromachining of bulk glass with bursts of femtosecond laser pulses at variable repetition rates" Opt. Exp. 5280, vol. 14, No. 23, Jun. 2006.
Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.

Glezer et al., "Ultrafast-laser driven micro-explosions in transparent materials"; Applied Physics Letters, vol. 71 (1997), pp. 882-884.
Golub, I., "Fresnel axicon"; Optic Letters, vol. 31, No. 12, Jun. 15, 2006, Optical Society of America, pp. 1890-1892.
Gori et al. "Analytical derivation of the optimum triplicator" Optics Communications 157 (1998) pp. 13-16.
Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Honda et al. "A Novel Polymer Film that Controls Light Transmission", Progress in Pacific Polymer Science 3, 159-169 (1994).
http://www.gtat.com/Collateral/Documents/English-US/Sapphire/12-21-12_GT_TouchScreen_V3_web.pdf.
Hu et al. "5-axis laser cutting interference detection and correction based on STL model" (2009) Zhongguo Jiguang/Chinese Journal of Lasers, 36 (12), pp. 3313-3317.
Huang et al., "Laser etching of glass substrates by 1064 nm laser irradiation", Applied Physics, Oct. 2008, vol. 93, Issue 1, pp. 159-162.
Juodkazis S. et al. Laser induced microexplosion confined in the bulk of a sapphire crystal: evidence of multimegabar pressures., Phys. Rev. Lett. 96, 166101, 2006.
Karlsson et al. "The technology of chemical glass strengthening—a review" Glass Technol: Eur. J. Glass Sci. Technol. A (2010) 51 (2) pp. 41-54.
Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.
Kruger et al., "Femtosecond-pulse visible laser processing of transparent materials"; Applied Surface Science 96-98 (1996) 430-438.
Kruger et al., "Laser micromachining of barium aluminium borosilicate glass with pluse durations between 20 fs and 3 ps"; Applied Surface Science 127-129 (1998) 892-898.
Kruger et al., "Structuring of dielectric and metallic materials with ultrashort laser pulses between 20 fs and 3 ps"; SPIE vol. 2991, 0277-786X/97, pp. 40-47.
Lapczyna et al., "Ultra high repetition rate (133 MHz) laser ablation of aluminum with 1.2-ps pulses"; Applied Physics A 69 [Suppl.], S883-S886, Springer-Verlag (1999); doi: 10.1007/s003399900300.
Levy et al. "Design, fabrication, and characterization of circular Dammann gratings based on grayscale lithography," Opt. Lett vol. 35, No. 6, p. 880-882 (2010).
Liu X et al. "laser ablation and micromachining with ultrashort laser pulses", IEEE J. Quantum Electronics, 22, 1706-1716, 1997.
Maeda et al. "Optical performance of angle-dependent light-control glass", Proc. SPIE 1536, Optical Materials Technology for Energy Efficiency and Solar Energy Conversion X, 138 (Dec. 1, 1991).
Mbise et al. "Angular selective window coatings: theory and experiments" J. Phys. D: Appl. Phys. 30 2103 (1997).
Kerr. "Filamentary tracks formed in transparent optical glass by laser beam self-focusing. II. Theoretical Analysis" Physical Review A. 4(3) 1971, pp. 1196-1218.

* cited by examiner

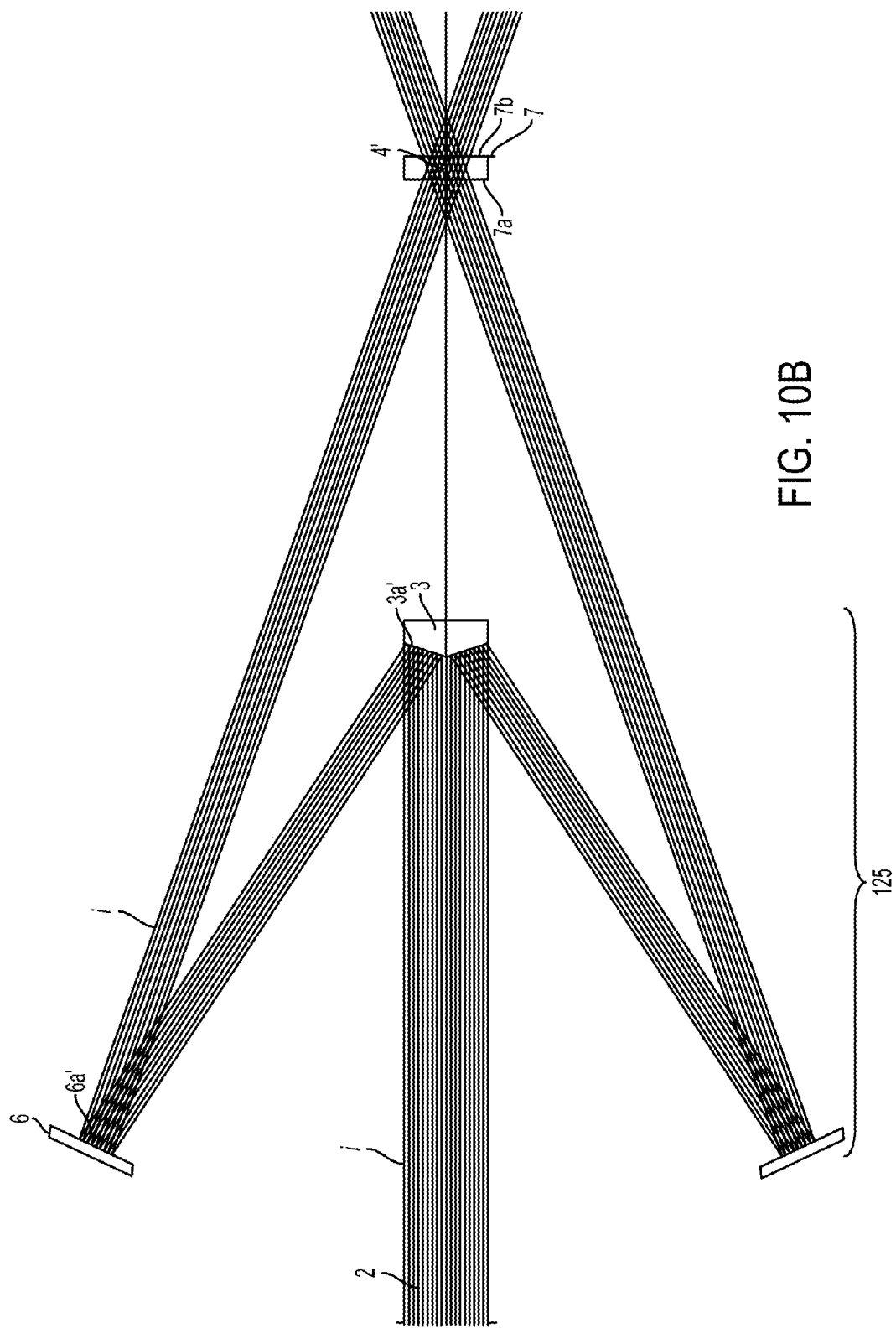

LASER CUTTING OF MATERIALS WITH INTENSITY MAPPING OPTICAL SYSTEM

This application claims the benefit of priority under 35 U.S.C. § 119 of U.S. Provisional Application Ser. No. 62/381,345 filed on Aug. 30, 2016, the content of which is relied upon and incorporated herein by reference in its entirety. This application also claims the benefit of priority under 35 U.S.C. § 119 of U.S. Provisional Application Ser. No. 62/402,337 filed on Sep. 30, 2016 the content of which is relied upon and incorporated herein by reference in its entirety.

BACKGROUND

The disclosure relates generally to laser processing of transparent materials, and more particularly to cutting such materials or forming holes in such materials with focal lines formed by non-diffractive laser beams.

No admission is made that any reference cited herein constitutes prior art. Applicant expressly reserves the right to challenge the accuracy and pertinence of any cited documents.

SUMMARY

One embodiment of the disclosure relates to a method of laser processing a workpiece, the method comprising:

focusing a pulsed laser beam into a laser beam focal line directed into the workpiece, the laser beam focal line generating an induced absorption within the material, and the induced absorption producing a defect line along the laser beam focal line within the workpiece, wherein said focal line having length L and a substantially uniform intensity profile such that the peak intensity distribution over at least 85% of the length L of the focal line does not vary by more than 40%, preferably does is not vary by more than 30%, preferably does not vary by more than 20%, preferably does is not vary by more than 20%, and even more preferably does not vary by more than 10%, from mean peak intensity. According to some embodiments the laser beam focal line is axisymmetric. According to other embodiments the laser beam focal line is not axisymmetric (e.g., it may have an elliptical cross-section). According to some embodiments the laser beam focal line is formed by a Gauss-Bessel beam or a Bessel beam that a center spot or central lobe with that has an axisymmetric cross-section. According to some embodiments the laser beam focal line is formed by a Gauss-Bessel beam or a Bessel beam that a center spot or central lobe with that has non-axisymmetric cross-section.

According to some embodiments the method further includes utilizing an optical system comprising at least one aspheric surface to focusing said pulsed laser beam into said laser beam focal line directed into the workpiece. According to some embodiments the aspheric surface is a curved surface of a refractive or a reflective element. According to some embodiments the optical system includes at least two aspheric optical components.

According to some embodiments: (i) said focal line has a substantially uniform intensity profile such that the peak intensity distribution over at least 90% of the length L of the focal line does not vary by more than 40%, for example does not vary by more than 35% or even 30%, preferably does not vary by more than 20%, preferably does not vary by more than 20%, preferably does not vary by more than 15%, and even more preferably does not vary by more than 10%, from mean peak intensity; or (ii) said focal line has a substantially uniform intensity profile such that the intensity distribution over the length L of the focal line does not vary by more than 40%, preferably does not vary by more than 35% or 30%, preferably does not vary by more than 20%, preferably does not vary by more than 20%, and even more preferably does not vary by more than 15% or even by more than 10%.

According to some embodiments the optical system being structured to form said laser beam focal line such that: (i) for any given cross-section of the beam focal line the laser beam focal line diameter D does not vary by more than 15% from a maximum diameter for at least 90% of the length L of the defect line; or (ii) for any given cross-section of the beam focal line the diameter D does not vary by more than 10% from a maximum diameter for the length L of the defect line.

According to some embodiments said focal line is characterized by energy density per unit length, and the energy density of the focal line per unit length along the propagation axis does not does not vary by more than 15% over at least over at least 90% of the length L of the focal line, and preferably does not vary by more than 10% over at least over at least 90% of the length L of the focal line According to some embodiments optical system is structured such that optical beams exiting the optical system, for any cross-section, at different heights relative to the focal line converge toward the focal line at a substantially the same angle β', within 10% of each other.

According to some embodiments a device for laser processing transparent materials comprises:

a laser source generating a Gaussian intensity profile beam, an optical system forming a modified Gauss-Bessel beam, said optical system comprising at least two aspheric components and configured to provide into a laser beam focal line oriented along the beam propagation axis;

wherein the laser beam focal line has an on-axis peak intensity profile and the optical energy of the laser beam focal line is confined into a region along the propagation axis such that: (i) greater than 75%, or even greater than 80% of total intensity is contained being between the half-maximum power points of the peak intensity distribution along the propagation axis; and/or (ii) the diameter D for any given cross-section of the beam focal line does not vary by more than 20%, and preferably by no more than 10% from a maximum diameter for at least 90% of the length L.

According to some embodiments of this device, the device optical system comprises at least one aspheric surface to focusing said pulsed laser beam into said laser beam focal line directed into the workpiece. According to some embodiments the aspheric surface is a curved surface of a refractive or a reflective element. According to some embodiments the optical system includes at least two aspheric optical components According to some embodiments device is structured such that the beam focal line has a non-axisymmetric beam cross section that comprises a minimum Rayleigh range $Z_{Rx,min}$ in a cross-sectional x-direction and a minimum Rayleigh range $Z_{Ry,min}$ in a cross-sectional y-direction, wherein the smaller of $Z_{Rx,min}$ and $Z_{Ry,min}$ is greater than $$F_D \frac{\pi w_{0,eff}^2}{\lambda},$$

where $F_D$ is a dimensionless divergence factor that is greater than 15 and preferably greater than 50, and in at least some embodiments greater than 75 (e.g., $100 \geq F_D \geq 10000$).

According to some embodiments the beam focal line has a non-axisymmetric beam cross section that comprises a minimum Rayleigh range $Z_{Rx,min}$ in a cross-sectional x-direction and a minimum Rayleigh range $Z_{Ry,min}$ in a cross-sectional y-direction, wherein the smaller of $Z_{Rx,min}$ and $Z_{Ry,min}$ is greater than $$F_D \frac{\pi w_{0,eff}^2}{\lambda},$$

where $F_D$ is a dimensionless divergence factor that is greater than 15 and preferably greater than 50, and in at least some embodiments greater than 75 (e.g., $100 \geq F_D \geq 10000$).

According to some embodiments comprising the method includes a step of decohering a first beam portion of the pulsed laser beam from a second beam portion of the pulsed laser beam using a decohering optical element positioned between the beam source and the transparent workpiece. For example, according to some embodiments, polarizing the first beam portion to a first polarization and polarizing the second beam portion to a second polarization that is orthogonal the second beam portion decoheres the first beam portion from the second beam portion. According to some embodiments the decohering optical element comprises at least one waveplate (e.g., a split quarter waveplate SQW)

According to some embodiments the method further includes directing the pulsed laser beam beyond an optical blocking element, wherein the optical blocking element is positioned between the conical wavefront producing optical element and the transparent workpiece. Preferably, the beam cross section is a non-axisymmetric beam cross section that comprises a minimum Rayleigh range $Z_{Rx,min}$ in a cross-sectional x-direction and a minimum Rayleigh range $Z_{Ry,min}$ in a cross-sectional y-direction, wherein the smaller of $Z_{Rx,min}$ and $Z_{Ry,min}$ is greater than $$F_D \frac{\pi w_{0,eff}^2}{\lambda},$$

where $F_D$ is a dimensionless divergence factor that is greater than 15 and preferably greater than 50, and in at least some embodiments greater than 75 (e.g., $100 \geq F_D \geq 10000$).

According to some embodiments the method further includes the use of an optical delay plate, configured to induce a specific optical delay (retardation) into a first portion of the pulsed laser beam, relative to another portion (second portion of the pulsed laser beam). For example, the optical delay plate may induce an optical retardation of $\pi$ over half the pulsed laser beam (where one optical period of the laser wavelength is considered to cover $2\pi$ radians of optical phase, so an optical retardation of $\pi$ is a delay of one-half the optical period), an optical retardation of $0.875\pi$ over half the pulsed laser beam, and, in some embodiments, an optical retardation of $0.5\pi$ over half the laser beam. Preferably, the beam cross section is a non-axisymmetric beam cross section that comprises a minimum Rayleigh range $Z_{Rx,min}$ in a cross-sectional x-direction and a minimum Rayleigh range $Z_{Ry,min}$ in a cross-sectional y-direction, wherein the smaller of $Z_{Rx,min}$ and $Z_{Ry,min}$ is greater than $$F_D \frac{\pi w_{0,eff}^2}{\lambda},$$

where $F_D$ is a dimensionless divergence factor that is greater than 15 and preferably greater than 50, and in at least some embodiments greater than 75 (e.g., $100 \geq F_D \geq 10000$).

According to some embodiments said workpiece comprises: (a) at least one portion that includes a coating, and (b) at least one portion that does not include a coating.

One embodiment of the disclosure relates to a method of laser processing a workpiece, the method comprising:

focusing a pulsed laser beam into a laser beam focal line directed into the workpiece, the laser beam focal line generating an induced absorption within the material, and the induced absorption producing a defect line along the laser beam focal line within the workpiece, wherein said focal line having length L and a substantially uniform intensity profile such that the peak intensity distribution over at least 85% of the length L of the focal line does not vary by more than 40% (e.g., does not vary by more than 35%, or by more than 30%, or by more than 25%, or by more than 20% from mean peak intensity.

Another embodiment relates to a method of laser processing a workpiece, the method comprising:

focusing a pulsed laser beam into a laser beam focal line directed into the workpiece, the laser beam focal line generating an induced absorption within the material, and the induced absorption producing a defect line along the laser beam focal line within the workpiece, wherein said focal line having length L has a substantially uniform intensity profile such that, the peak intensity distribution over at least 85% of the length L of the focal line in the direction of beam propagation does not vary by more than 20% from maximum peak intensity.

Another embodiment relates to a method of laser processing a workpiece, the method comprising:
(i) focusing a pulsed laser beam into a laser beam focal line oriented along the beam propagation axis;
(ii) directing the laser beam focal line into the workpiece, the laser beam focal line generating an induced absorption within the workpiece material, and the induced absorption producing a defect line along the laser beam focal line within the workpiece, wherein the focal line has a length L and a peak on-axis optical power profile and the optical power of the laser beam focal line is confined into a region along the propagation axis such that 80% of the power is contained being between the half-maximum power points of the power distribution along the propagation axis.

An additional embodiment of the disclosure relates to a method of laser processing a glass workpiece, the method comprising:
(i) focusing a pulsed laser beam into a laser beam focal line oriented along the beam propagation axis;
(ii) directing the laser beam focal line into the glass workpiece, the laser beam focal line generating an induced absorption within the material, and the induced absorption producing a defect line along the laser beam focal line within the workpiece, wherein the focal line has an on-axis peak intensity profile and the optical energy of the laser beam focal line is confined into a region along the propagation axis such that >70%, and preferably greater than 75% or >80% of total intensity is contained being between the half-maximum peak intensity points of the peak intensity distribution along the propagation axis.

An additional embodiment of the disclosure relates to a method of laser processing a glass workpiece, the method comprising:
(i) focusing a pulsed laser beam into a laser beam focal line oriented along the beam propagation axis;

(ii) directing the laser beam focal line into the glass workpiece, the laser beam focal line generating an induced absorption within the material, and the induced absorption producing a defect line along the laser beam focal line within the workpiece, wherein the focal line has an on-axis peak intensity profile and the optical energy of the laser beam focal line is confined into a region along the propagation axis such that 75% or even greater than >80% (e.g. >85% or greater than 90%) of total energy is contained being between the half-maximum peak intensity points of the peak intensity distribution along the propagation axis.

An additional embodiment is directed to a device for laser processing transparent materials, comprising:

(i) a laser source generating a Gaussian intensity profile beam, (ii) an optical system forming a modified Gauss-Bessel beam, said optical system comprising at least two aspheric components and configured to provide into a laser beam focal line oriented along the beam propagation axis;

wherein the laser beam focal line has an on-axis peak intensity profile and the optical energy of the laser beam focal line is confined into a region along the propagation axis such that greater than 80% of total intensity is contained being between the half-maximum power points of the peak intensity distribution along the propagation axis An additional embodiment is directed to a device for laser processing transparent materials, comprising:

(i) a laser source generating a Gaussian intensity profile beam, (ii) an optical system forming a modified Gauss-Bessel beam, said optical system comprising at least one aspheric component, and configured to provide into a laser beam focal line oriented along the beam propagation axis such that the laser beam focal line has a length L and diameter D, and the diameter D for any given cross-section of the beam focal line does not vary by more than 20% from a maximum diameter of the focal line for at least 90% of the length L.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 10A and 10B illustrate other embodiment of the optical system for laser processing or cutting glass and other materials that is structured to provide a modified Gauss-Bessel beam forming focal line with substantially uniform peak intensity distribution and a substantially constant diameter;

DETAILED DESCRIPTION

Figure 1:
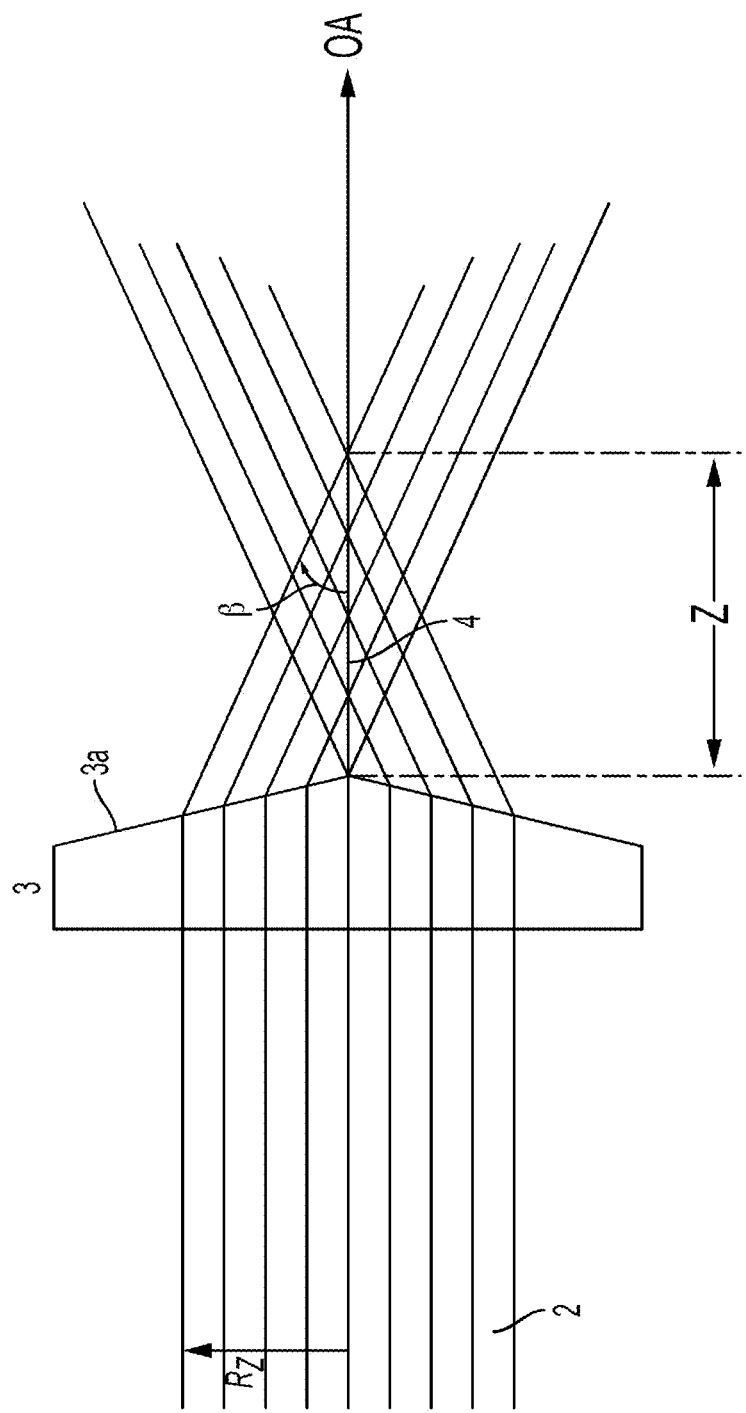
FIG. 1 is a schematic cross-sectional view of a collimated Gaussian beam incident on a typical axicon component, and a focal line formed by the axicon component.

The area of laser processing of materials described herein encompasses a wide variety of applications that involve cutting, drilling, milling, welding, melting, etc. and different types of materials. These materials may be, for example, chemically strengthened glass substrates (e.g., Gorilla® glass available from Corning Incorporated), or alkaline earth boro-aluminosilicate glass composition glasses, for example TFT (thin film transistor) glass compositions such as Eagle XG®, Corning Lotus™, soda-lime glass, thermally strengthened (tempered) glass, fused silica, or other glass substrate. The method can be used, for example, to cut pieces of glass from a larger glass substrate, to create perforations, defect lines or through holes in glass or to chamfer glass, as needed. The method described herein also can be utilized to form micron scale holes, and such holes which can be used, for example, to make glass "interposers" useful in routing high speed electrical signals.

For example, in order to cut pieces of glass from a larger glass substrate the process creates a fault line, contour or path 110 (see, for example, FIG. 15A) that delineates the desired shape and establishes a path of least resistance for crack propagation and hence separation and detachment of the glass of desired shape from its substrate matrix. The laser separation method can be tuned and configured to enable manual or mechanical separation, partial separation or total separation of glass shapes out of the original substrate.

The object to be processed, such as a glass workpiece 7 described below, is irradiated with a pulsed laser beam provided by a laser 5. The pulsed laser beam may be, for example, an ultra-short pulsed (pulse width less than 100 psec) laser beam that is condensed into a high aspect ratio line (focal line 4') having substantially uniform intensity distribution and high energy density, described below. The wavelength of the laser beam may be, for example, 1064 nm or less. The focal line 4' penetrates through the thickness of the workpiece 7 that is being processed. In some embodiments the workpiece 7 is a glass substrate. Within this volume of high energy density the material of the workpiece 7 is modified via nonlinear effects. It is important to note that without this high optical intensity, nonlinear absorption is not triggered. Below this intensity threshold, the material is transparent to the laser radiation and remains in its original state. By scanning the focal line formed by the laser beam over a desired line or path we create a plurality of narrow defect lines 120 (a few microns wide) along a contour or path which can be used to define the perimeter or shape to be separated.

A focal line is a region whereby the focused spot of an optical beam is maintained over a length that is longer than expected by the typical diffraction properties of a the same sized single focus spot formed by a Gaussian beam. Instead of the beam being focused to a point (or at least a very short region), the beam corresponding to a focal line is being focused to an extended region along the beam propagation direction. The "length L" of the focal line, as referred to herein, is the distance (within the focal line, along the beam propagation direction) between the points where the peak cross sectional beam intensity drops to ½ its maximum peak value. For a Gaussian beam, the typical length over which spot size is maintained to within a factor of square root) is the Rayleigh range, typically given by $pi*w0^2/lambda$, where lambda is the wavelength of the light and w0 is the $1/e^2$ radius of the Gaussian beam spot. One strategy for forming a focal line is to form a quasi-non-diffracting beam, which instead of employing a Gaussian beam profile that is common in laser systems, can use more sophisticated beam shapes such as a Bessel or a Gauss-Bessel profile(s), which effectively diffract much more slowly than a Gaussian beam. A more detailed discussion of quasi non-diffracting beams, Rayleigh range, and how to measure spot diameter of these more complicated beam profiles, is presented later in this specification.

The optical energy contained in the focal line 4' can create multi-photon absorption (MPA) in substantially transparent materials such as, for example, glass composite workpieces. MPA is the simultaneous absorption of two or more photons of identical or different frequencies in order to excite a molecule from one state (usually the ground state) to a higher energy electronic state (ionization).

For MPA, the energy difference between the involved lower and upper states of the molecule is equal to the sum of the energies of the two or more photons. MPA, also called induced absorption, can be a second-order or third-order process (or higher order), for example, that is several orders of magnitude weaker than linear absorption. It differs from linear absorption in that the strength of second-order induced absorption can be proportional to the square of the light intensity, for example, and thus it is a nonlinear optical process.

The glass substrate or the workpiece 7 is moved relative to the focal line 4' formed by the laser beam (or the laser beam focal line is translated relative to the glass) to create perforated regions that trace out the shape of any desired parts. For example, in at least some embodiments, the laser beam focal line 4' creates hole-like defect zones (or damage tracks, or defect lines 120) that penetrate the full depth the glass, with internal openings of, for example, approximately 0.3-1 micron in diameter. These perforations, defect regions, damage tracks, or defect lines are generally spaced from 1 to 50 microns apart (for example, 1-50 microns, 1-25 microns, 5-25 microns, 5-30 microns, 8-30 microns, 8-40 microns, 1-20 microns, 3-15 microns, or 5-10 microns).

Once the line or contour with defects or perforations is created, separation can occur via: 1) inherent material stress (such as from chemical strengthening), manually applied stress, or other mechanical means create stress on or around the perforated fault line 110; the stress or pressure should create tension that pulls both sides of the perforated fault line 110 apart and break the areas that are still bonded together; 2) using a heat source, create a stress zone around the fault line 110 to put the defect (also referred to herein as the defect line 120) or perforated fault line in tension, inducing partial or total separation. In both cases, separation depends on several of the process parameters, such as laser scan speed, laser power, parameters of lenses, pulse width, repetition rate, etc.

According to at least some embodiments described herein laser cutting or hole forming processes makes use of an ultra-short pulse laser 5 in combination with an optical system that generates a focal line 4' to fully perforate the body of a range of glass compositions. As described herein, the focal line 4' provides substantially uniform optical intensity distribution along the required distance within the length L of the focal line (as shown, for example, by MGB curve in FIG. 5A).

In some embodiments, the pulse duration of the individual pulses is in a range of between greater than about 1 picoseconds and less than about 100 picoseconds, such as greater than about 5 picoseconds and less than about 20 picoseconds, and the repetition rate of the individual pulses can be in a range of between about 1 kHz and 4 MHz, such as in a range of between about 10 kHz and 650 kHz.

In addition to a single pulse operation at the aforementioned individual pulse repetition rates, the pulses can be produced in bursts of two pulses, or more (such as, for example, 3 pulses, 4, pulses, 5 pulses, 10 pulses, 15 pulses, 20 pulses, or more) separated by a duration between the individual pulses within the burst that is in a range of between about 1 nsec and about 50 nsec, for example, 10 to 30 nsec, such as about 20 nsec, and the burst repetition frequency can be in a range of between about 1 kHz and about 200 kHz. (Bursting or producing pulse bursts is a type of laser operation where the emission of pulses is not in a uniform and steady stream but rather in tight clusters of pulses.) The pulse burst laser beam has an operating wavelength λ selected such that the material is substantially transparent at this wavelength. The average laser power per burst measured at the material can be greater than 40 microJoules per mm thickness of material, for example between 40 microJoules/mm and 2500 microJoules/mm, or between 500 and 2250 microJoules/mm. For example, for 0.1 mm-0.2 mm thick Corning Eagle XG® glass one may use 200 µJ pulse bursts to cut and separate the glass, which gives an exemplary range of 1000-2000 µJ/mm. For example, for 0.5-0.7 mm thick Corning Eagle XG® glass, one may use 400-700 µJ pulse bursts to cut and separate the glass, which corresponds to an exemplary range of 570 µJ/mm (400 µJ/0.7 mm) to 1400 µJ/mm (700 µJ/0.5 mm).

As defined herein, the diameter or internal diameter of a defect line 120 is the internal diameter of the open channel or air hole in the glass or workpiece. For example, in some embodiments described herein the internal diameter of the defect line 120 is <500 nm, for example ≤400 nm, or ≤300 nm. Furthermore, the internal diameter of a defect line can be as large as the spot diameter of the laser beam focal line, for example. The laser beam focal line can have an average spot diameter in a range of between about 0.1 micron and about 5 microns, for example 1.5 to 3.5 microns. In the case of a Gauss-Bessel beam, the focal line diameter D (D=2R, see for example, FIG. 3A) may be considered to be the twice the distance between the central intensity peak and the first null in the Bessel function that approximates the cross sectional profile of the laser beam focal line where it interacts with the substrate. Once a workpiece or glass part is separated along a fault line or contour 110, the defect lines 120 on the cut and separated surface can potentially still be viewed and can have a widths comparable to the internal diameters of the defect lines, for example. Thus, widths of defect lines 120 on a cut surface of a glass article prepared by embodiment methods described herein can have widths between about 0.1 micron and about 5 microns, for example.

Beyond single sheets of glass, the process can also be used to cut stacks of glass, and can fully perforate glass stacks of up to a few mm total height with a single laser pass. The glass stacks additionally may have air gaps in various locations; the laser process will still, in a single pass, fully perforate both the upper and lower glass layers of such a stack.

Once the glass is perforated, if the glass has sufficient internal stress, cracks will propagate along the perforation lines and the glass sheet will separate into the desired parts.

The method and apparatus described herein can be utilized, for example, for precision cutting and separation of arbitrary shapes out of transparent substrates, more specifically to glass in a controllable fashion, with negligible debris and minimum damage to part edges that preserves edge strength, edge impact strength and enables high level of glass edge reliability. The developed laser method advantageously allows maintenance of a clean and pristine surface quality and the reduced subsurface damage created by the area of high intensity around the laser focus. One of the key enablers of this process is the high aspect ratio of the defect or defect line 120 created by the focal line 4' with the substantially uniform intensity distribution as described below, created by the ultra-short pulsed laser. It allows creation of a fault line 110 that extends from the top to the bottom surfaces of the material to be cut. In principle, this defect can be created by either a single laser pulse or a single burst pulse.

The generation of a focal line may be performed by sending a Gaussian laser beam provided by a laser 5 to an optical system 125 (described in detail further in the specification) in which creates a focal line 4' via a modified Gauss-Bessel beam (MGB beam). The focal line 4' has a length L (i.e., the distance between 0.5 maximum intensity points) in a range of between about 0.1 mm and about 100 mm, or between 0.3 mm and 10 mm, or between about 0.5 mm and about 5 mm, such as about 1 mm, about 2 mm, about 3 mm, about 4 mm, about 5 mm, about 6 mm, about 7 mm, about 8 mm, or about 9 mm, or a length in a range of between about 0.1 mm and about 1 mm. The focal line 4' also has and an average spot diameter in a range of between about 0.1 micron and about 5 microns. Thus, for example, the focal line 4' may have a length L of 0.3 mm to 10 mm and an average spot diameter (over its length) between 0.1 micron and about 5 microns (e.g., 0.2 microns to 1 or 2 microns). The holes or defect lines 120 created in the glass can each have a diameter between 0.1 microns and 10 microns, for example 0.25 to 5 microns—e.g., 0.2-0.75 microns, or 0.3-0.75 microns.

Figure 2:
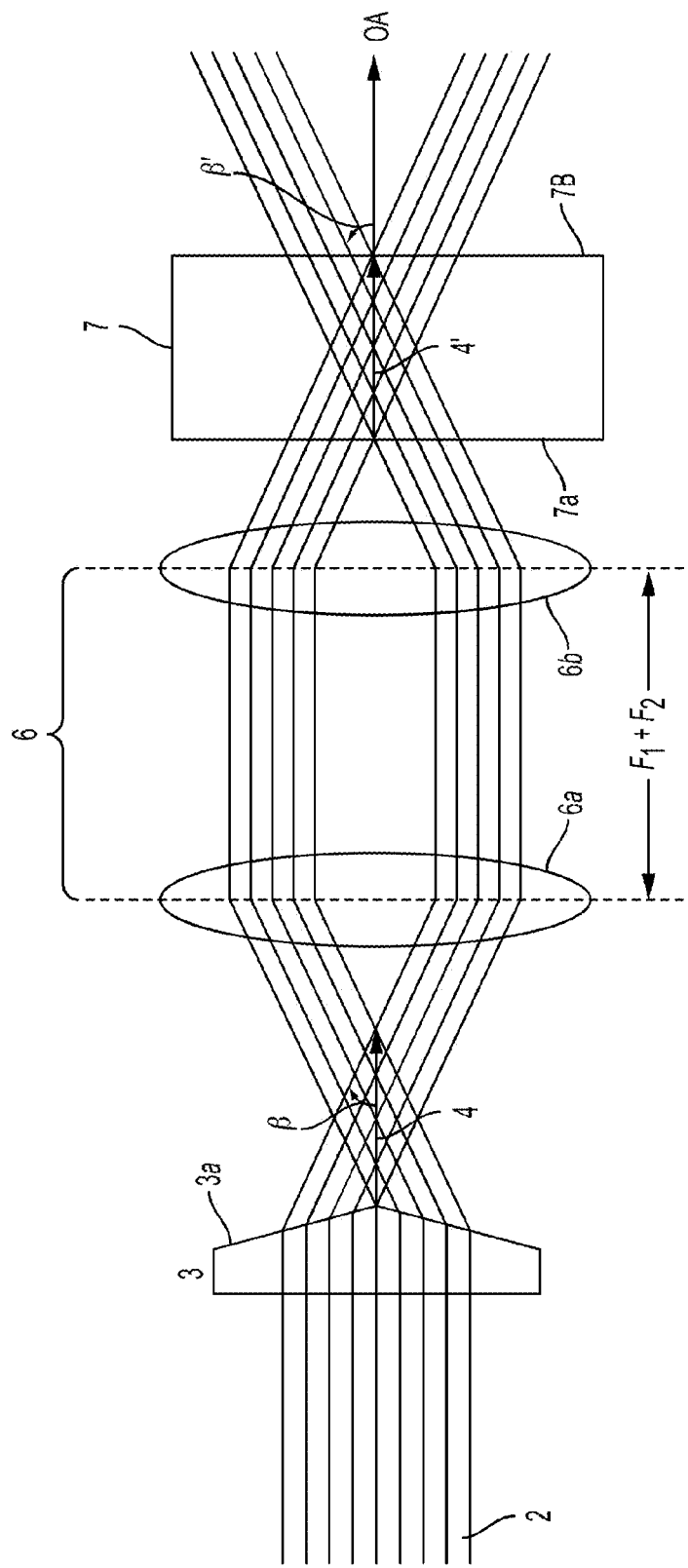
FIG. 2 is schematic illustration of optical components of an exemplary optical system that forms a focal line for forming defect lines in a workpiece.

Comparative example—focal line formation with a Gauss-Bessel Beam Standard laser machining systems generally employ Gaussian beams (i.e., laser beams with Gaussian intensity distribution). When focused to small enough spot sizes to be intense enough to modify the material, due to the phenomenon of diffraction, such beams have short depths of focus, for example, a few microns or less. In contrast, laser machining can be performed with Gauss-Bessel laser beams forming a laser beam focal line, and such beams have the advantage over the typical focus formed by a Gaussian beam, because it creates a long region of material modification in glass sheet that can span several millimeters through the depth of the glass sheet. A Gauss-Bessel beam can be formed, for example, by providing a typical laser beam with a Gaussian intensity profile to an optical component such as a refractive or reflective axicon, a phase modifying element such as a spatial light modulator, or a grating element such as a Dammann grating, forming a focal line. As shown in a comparative example depicted in FIG. 1, a collimated laser beam 2 with a typical Gaussian intensity distribution is provided to an axicon 3 (i.e., a lens component with one conical surface 3a), which forms a Gauss- Bessel beam that creating an extended focal line 4 situated directly adjacent to the axicon's conical surface 3a. FIG. 2 illustrates the re-imaging optical system 6 that reimages the extended focal line 4 as laser beam focal line 4' (also referred to as a focal line herein) within the workpiece 7 (e.g., a glass substrate). The reimaging optical system 6 of FIG. 2 comprises two optical components—an optical component 6a having focal length F1, and an optical component 6b having focal length F2. These components may be separated from one another by a distance F1+F2. The re-imaged laser beam focal line 4' is spaced from the rear surface of the re-imaging optical system 6 such that the focal line 4' is not formed directly adjacent to lens component 6b.

Figure 3:
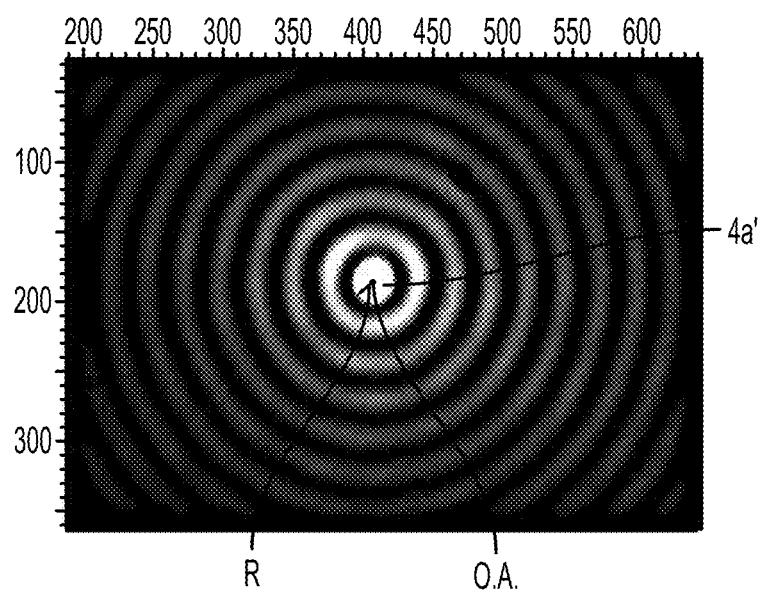
FIG. 3 illustrates a transverse cross section of a Gauss-Bessel beam formed, for example, by the optical system of FIG. 2.

Lenses 6a and 6b of the optical system 6 simply magnify (or de-magnify) the focal line 4 that has been created directly behind the axicon 3. FIG. 3 illustrates a cross section (radial profile) of the Gauss-Bessel beam (optical beam used in the comparative example) formed by the optical system of FIG. 2. The center portion 4a' (also referred to as the center spot, or central lobe herein) of the optical beam shown in FIG. 3 corresponds to the focal line 4', and the rings around the center portion correspond to optical intensities (beams) converging towards the center of the focal line further down within the glass substrate. The center portion 4a' of the focal line 4' has a diameter D (where D=2R). At any given location, most of the laser beam energy is concentrated in the center portion 4a', and the center portion 4a' of the Gauss-Bessel beam is what is utilized to create defect lines 120 within the glass substrate 7. In some embodiments, it is preferable that the diameter D be as small as possible.

However, the focal line 4, (and thus of focal line 4') formed by typical Gauss-Bessel beams of the comparative example has a very non-uniform peak intensity profile along the optical axis OA (i.e., direction of beam propagation). The term "peak intensity" here is used to describe the maximum intensity observed in a cross sectional (or transverse) profile of the laser beam, where the cross sectional plane is transverse to the beam propagation direction, evaluated at one given location along the beam propagation direction. The peak intensity will typically be proportional to the amount of energy contained within the central spot of the Gauss-Bessel beam at a given location along the beam propagation direction. The intensity of the comparative Gauss-Bessel beam in the x-y plane P at a distance z from the tip of the axicon along the focal line 4, as formed by the axicon from that receives an input laser beam with a Gaussian intensity profile is given by the following equation:

$$I(r,z)=I_o(R_z)R_z 2\pi k(\sin(\beta)/\cos^2(\beta))J_o^2(k\,R\,\sin(\beta)) \quad \text{Eq. 1.1}$$

where $R_z$ is the input beam radius measured at $1/e^2$ point of the incident Gaussian beam 2, $I_o(R_z)$ is the intensity of the light beam illuminating the axicon that corresponds to the input beam radius $R_z$ (i.e., Gaussian beam intensity at radial height $R_z$), λ the wavelength of the laser beam, β is the convergence angle of the laser beam as it converges towards the focal line, $J_o$ is a zeroeth order Bessel function of the first kind (a solution to the Bessel differential equation), R is the radius of the focal line (i.e., the radius of the center portion 4a'), and k=2π/λ.

Thus, the peak intensity at the center of the focal line at the distance z is given by:

$$I_p(z)=I_o(R_z)R_z 2\pi k(\sin(\beta)/\cos^2(\beta)) \quad \text{Eq. 1.2}$$

Figure 4A:
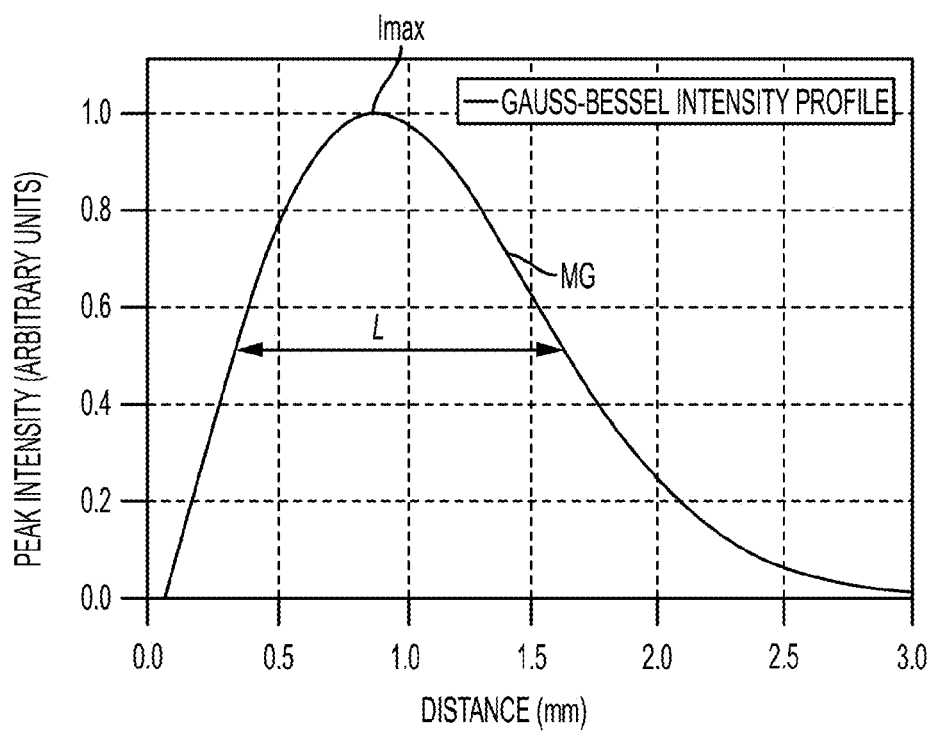
FIGS. 4A and 4B illustrate, respectively, a modeled and a measured peak intensity distribution of a Gauss-Bessel beam along the length of the focal line as a function of distance mm along the optical axis.
Figure 4B:
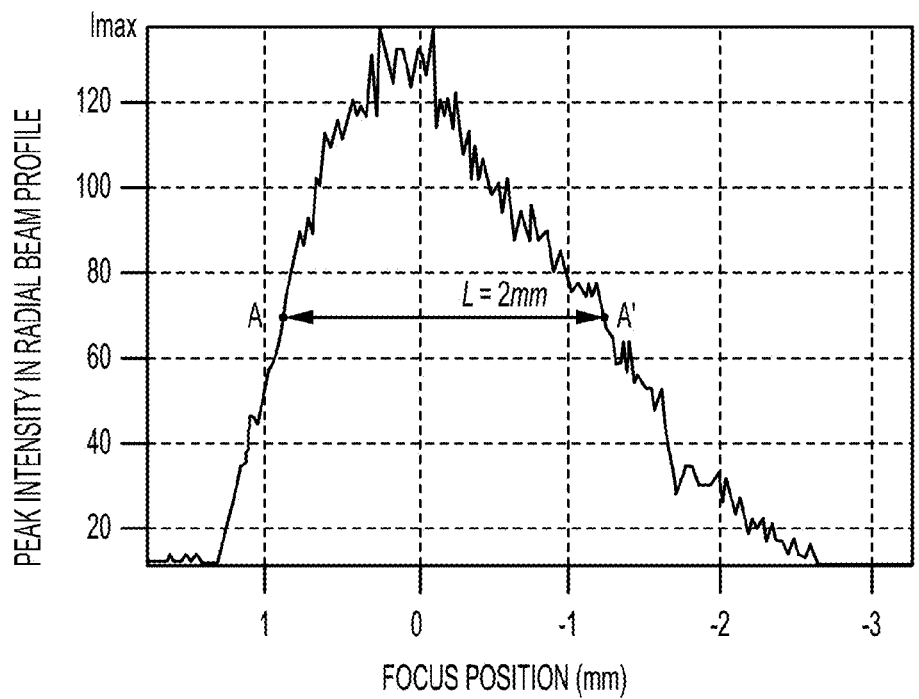
Figure 4C:
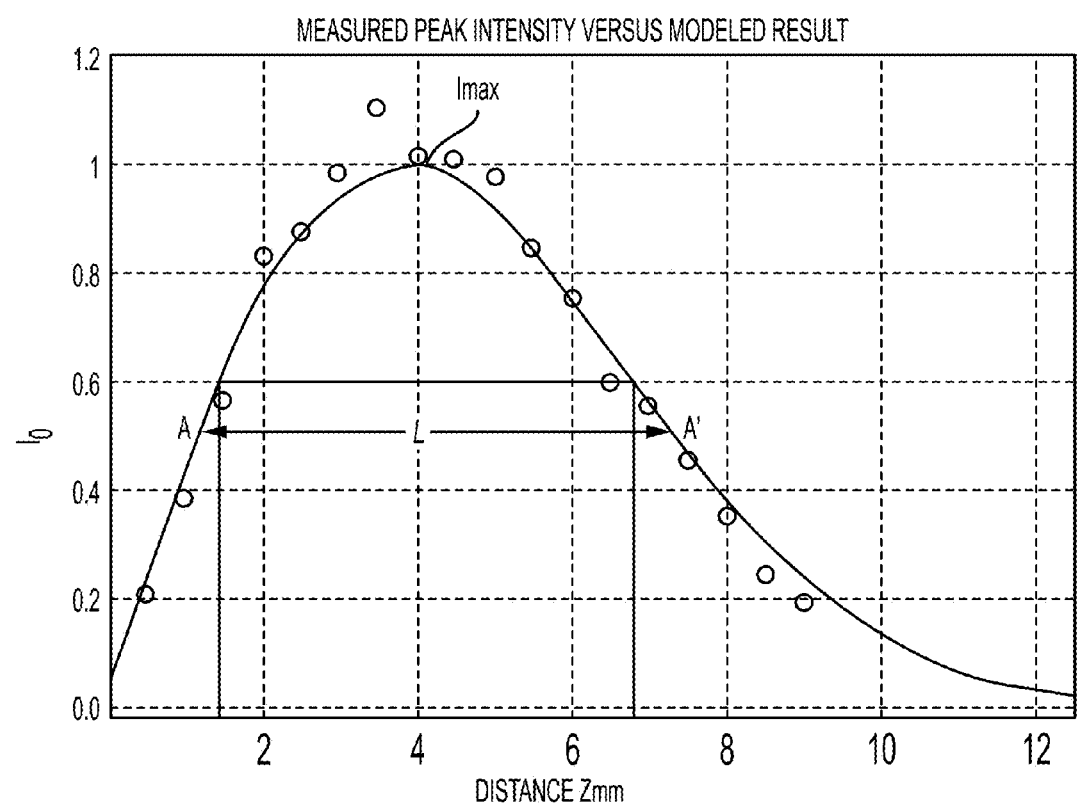
FIG. 4C illustrates how a significant fraction of the light energy within the Gauss-Bessel beam intensity profile cannot be utilized.

This equation describes the radial intensity distribution of the Gauss-Bessel beam as a function of distance along the optical axis (z), corresponding to those shown in FIGS. 4A-4C.

As shown in FIGS. 4A-4C the peak intensity profile of a typical Gaussian Bessel beam (along the beam propagation direction) is highly non-uniform, as shown in FIGS. 4A-4C. The diameter of the focal line 4 is related to the angle β, and the diameter D of the focal line is related to angle β'. The angle β may also be considered a measure of the numerical aperture (NA) of a particular portion of the optical beam that illuminates or creates a small section of the focal line. As is known in optical physics, the spot diameter D formed by an optical beam is inversely proportional to the numerical aperture of that optical beam. Hence if the angle β varies along the length of the focal line, this is equivalent to stating that the NA of varies along the length of the focal line or the spot diameter varies along the length of the focal line. For example, as shown in FIG. 4A, when refractive axicons, phase elements performing the same function, or diffractive Dammann gratings, are utilized to create focal line 4' from an input Gaussian beam, the optical beam intensity (I) distribution along the beam propagation axis (optical axis OA) results in excess energy to be present in some regions along the optical axis OA (line z), and not enough in other regions along the beam. This non-uniform intensity distribution of the Gauss-Bessel beams can cause unwanted micro-crack formation in the areas of the glass workpiece that receives extra energy, and insufficient modification of the material in regions that receive too little energy. The non-uniform peak intensity distribution of the Gauss-Bessel beams (along the optical axis OA) can also cause formation of a hole that is not uniform in cross-sectional size, or in incomplete holes if a portion of glass workpiece 7 receives inadequate optical power for forming the required size holes.

More specifically, FIG. 4A is a plot of modeled peak beam intensity profile vs. distance z along the optical axis OA (and along the length of the focal line 4') formed by the Gauss-Bessel beam of the comparative optical system shown in FIG. 2. As shown in FIG. 4A, the distance L is the distance along the beam propagation direction between the $0.5I_{max}$ points (half-maximum peak intensity points, which also correspond to half maximum power). The peak intensity curve of FIG. 4A illustrates, for example, that a distance z of 0.25 mm away from the last lens component 6b the peak intensity in the center of the of the comparative optical beam (Gauss-Bessel beam) is about 40% of the maximum intensity $I_{max}$ that occurs along the optical axis OA at about 0.8 mm away from the lens component 6b. However, the peak intensity $I \le 0.4 I_{max}$ of the Gaussian Bessel beam is may not be sufficient to cut or modify typical glass substrates, and may result in incomplete formation of defect lines within the substrate(s). Thus, the optical energy situated in the tail ends of a comparative Gauss-Bessel beam is typically not usable in glass cutting applications.

FIG. 4B shows a plot of measured peak intensity I produced by an exemplary comparative optical system of FIG. 2 at different positions (at different distances z away from the last lens component 6b) on the optical axis AO. More specifically, FIG. 4B is a plot of the measured peak intensity of the optical beam measured along the optical axis OA on which focal line 4' is situated, as a function of the distance along the optical axis OA. The Gauss-Bessel beam corresponding to the plot of FIG. 4B was formed using an axicon lens 3 and a two-lens system 6 that created a focal line 4' with the length L of approximately 2 mm. That is, in this example, as shown in FIG. 4B, intensity points (A, A') corresponding to ½ of maximum intensity (i.e., $0.5I_{max}$) are about 2 mm apart. As shown in FIG. 4B, the measured peak intensity of the Gauss-Bessel beam is highly non-uniform along the length of the focal line 4', and has a shape similar to that shown in FIG. 4A.

FIG. 4C is similar to those of FIGS. 4A and 4B, and illustrates peak intensity distribution of another comparative focal line created by the Gauss-Bessel beam, as a function of distance z along the optical axis, for z values between 0 and 12 mm. (The distance z is the distance behind the last optical component of the reimaging system 6.) In FIG. 4C the solid line corresponds to the modeled results, the circles to the measured data. The optical intensity corresponding to the shaded region is the intensity required to modify glass (i.e., to make a defect line 120, e.g., a hole) within the given thickness of glass substrate. In this example the a glass substrate 7 has a thickness t that extends along the optical axis from position z≈1.5 mm to position z≈6.75 mm. However, as seen from FIG. 4C, in this comparative example, the optical power outside of the shaded region is effectively wasted. In the regions where 0<z<1.5 mm and 7 mm<z<12 mm the optical power (and thus intensity) is not strong enough to effectively modify glass. In addition, in this embodiment the optical power (or intensity) above what is required to modify glass is also wasted, because it is not used productively. For example, the optical energy that corresponds to peak intensity above the $0.6I_{max}$, situated above the shaded area of FIG. 4C, is excess of what is required to effectively modify glass. Furthermore, because the optical power in the center of the region (i.e., between the distance z of about 3 mm and 5 mm greatly exceeds the amount of power required to drill or cut the glass substrate 7, this excess power can lead to excessive material damage such as unwanted micro-crack formation in this region. The measured peak intensity for the comparative Gauss-Bessel beam is indicated by the circles and, as we can see, is similar to that obtained by the modeled results.

In terms of power density, for glass materials, when the laser energy density gets higher than the material cohesion forces, the material volatizes, creating a modification of the material which can form a densification, crack, damage track, or hole. Thus, it is desirable that the power density at each segment along the length of the focal line 4' is higher than a given threshold $P_o$ (in Watts/micron$^3$) in order to create holes that go all the way through the work piece 7, such as the glass substrate. In the example shown in FIG. 4C, the threshold intensity within the beam cross section, corresponding to a power density in an infinitesimal volumetric region around that optical axis location, that enables holes creation corresponds to intensity threshold $I_o=0.6I_{max}$), and the power density of $0.6Pmax/\mu m^3$ creates the desired modifications within the glass. In this comparative example, when the optical power density falls such that it corresponds to $I_o<0.6I_{max}$, the focal line 4' does not reliably create densification, crack, damage tracks, or holes with a single laser pulse or a single pulse bust.

It is desirable to have a method of glass separation or glass processing than what achieves:

I.) a more uniform peak intensity and more uniform power density of the laser beam, as a function of material depth within the substrate 7; and/or II.) a focal line 4' with better peak intensity uniformity along the beam propagation direction than created by a typical Gauss-Bessel beam.

Accordingly it is desirable to create a focal line 4' such that laser energy density is higher than the material cohesion forces throughout the desired thickness of the material, for the required length region of the focal line, but not so much higher that a large amount of beam power is wasted because much more energy is incident on the material within the focal line than what is required for creating material modification that which can form a densification, crack, damage track, or hole. As described in more detail below, the embodiments of the optical system 125 advantageously provide modified Gauss Bessel beams (MGB beams) with substantially uniform optical intensity distribution along the required length of the focal line 4'.

Thus, the embodiments of the optical system 125 described herein are configured to form improved laser beam focal line 4' that has substantially constant peak intensity—i.e., more constant peak intensity distribution than that of the optical Gaussian Bessel intensity distribution described by equation 1.2. This improved peak intensity distribution is shown, for example, in FIG. 5A and is also referred herein as to Modified Gauss Bessel (MGB) beam intensity distribution, or a "top-hat" distribution). According to at least some of the embodiments described herein, the improved laser beam focal line 4' formed by the optical system 125 advantageously has substantially constant beam diameter D.

Figure 5A:
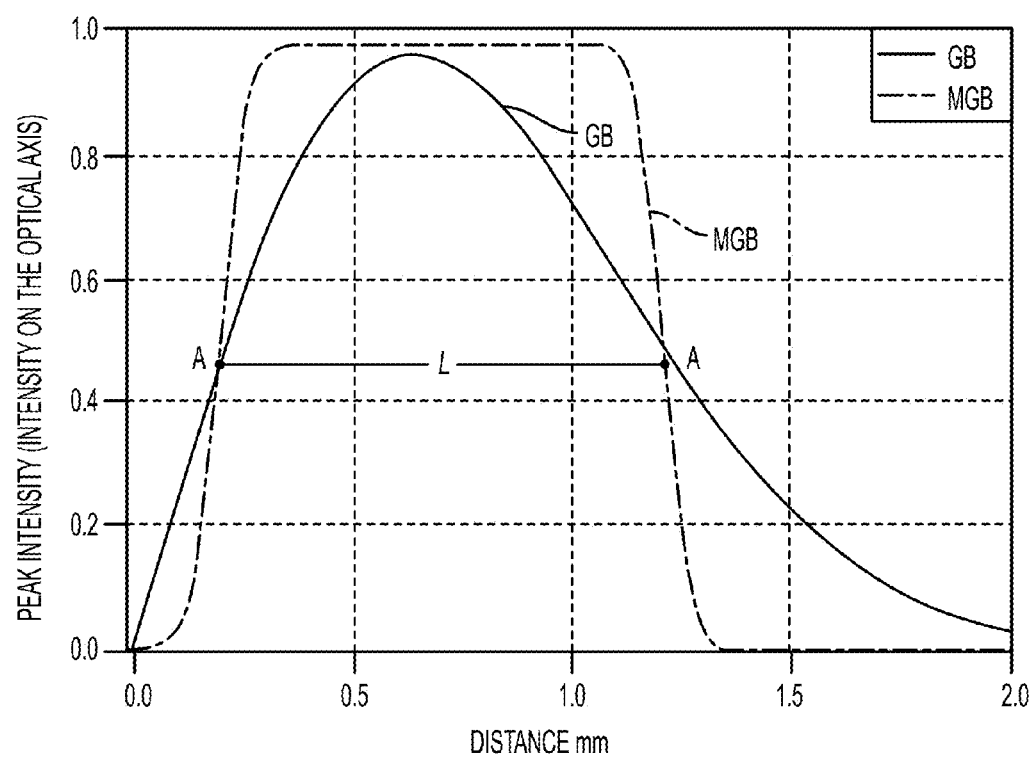
FIG. 5A illustrates a typical Gauss-Bessel beam intensity profile and a "top hat" intensity distribution provided by a modified Gauss-Bessel beam (MGB) according to one embodiment.

More specifically, FIG. 5A illustrates peak intensity distribution (W/µm$^2$) of the typical Gauss-Bessel (GB) laser beam, as well as the peak intensity distribution along the optical axis of the optical beam according to at least one embodiment described herein (e.g., a MGB described herein), with both intensity distributions normalized to equal area (total energy in each distribution=1). FIG. 5A illustrates that embodiments of the optical system 125 (also referred to as an Focal Line Intensity Mapping optical system (FLIMOS), herein) that is structured to provide a focal line 4' with a significantly more uniform peak intensity distribution along the optical axis than that provided by Gaussian-Bessel beam. FIG. 5A also illustrates that a substantially greater portion of laser beam energy is contained between $0.5I_{max}$ points (between points A and A') within the MGB beam than that contained in the Gauss-Bessel beam. This indicates that the MGB beam can utilize a greater portion of the laser beam energy for glass modification than the equivalent Gauss-Bessel beam. Exemplary embodiments for formation of the MGB beam are described below in the specification.

Figure 5B:
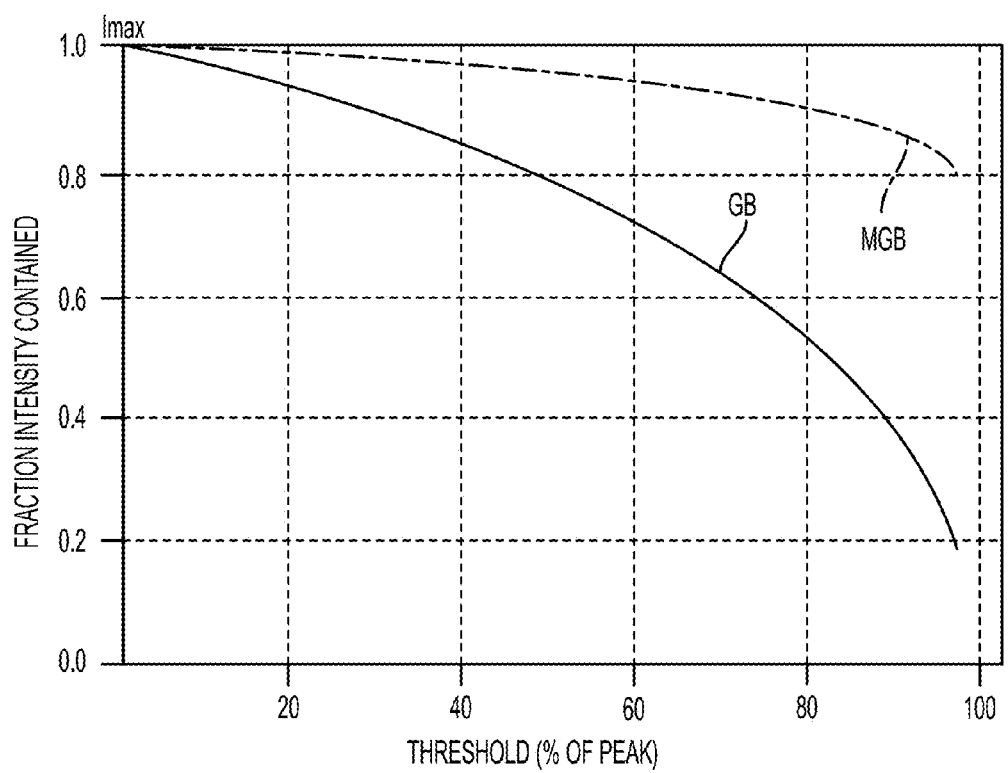
FIG. 5B illustrates a plot of the total energy contained (y-axis) within the MGB beam, and within the Gauss-Bessel beam, vs. an intensity threshold (expressed as % intensity of peak, x-axis) shown in FIG. 5A.

FIG. 5B illustrates a given intensity threshold (% intensity of peak) plots vs. the total energy contained with the MGB and Gauss-Bessel distributions corresponding to FIG. 5A. As shown in FIG. 5B, for any given power threshold, the total energy contained within the intensity distribution produced by the optical system 125 is always higher.

FIG. 5B illustrates that, at least initially, a rising intensity threshold barely affects the % power provided by the improved peak energy distribution (e.g., such as the MGB energy distribution) via the optical system 125. For example, when the threshold intensity to modify glass substrate is 60% of the maximum peak intensity $I_{max}$, and the focal line is formed by a Gaussian-Bessel beam, the amount of optical energy contained in the focal line between the $0.6I_{max}$ points (60% threshold) is about 70% of total energy (i.e., the fraction of power contained is 0.7). In contrast, when the peak intensity in the focal line formed by the exemplary optical system 125 (FLIMOS) forming the MGB beam is at 60% of the maximum peak intensity, the amount of power contained in the focal line between the $0.6I_{max}$ is about 95% of total power (i.e., the fraction of power contained is 0.95). That is, only about 5% of the power or pulse energy is lost when a MGB beam is utilized, as opposed to 30% of power lost when one employs a Gauss-Bessel beam. Also for example, if the threshold power to modify glass substrate is 80% of maximum peak intensity $I_{max}$, and the focal line is formed by a Gauss-Bessel beam, the amount of optical power contained in the focal line between the $0.8I_{max}$ points is only about 50% of total optical power. In contrast, the amount of optical power contained in the focal line between the $0.8I_{max}$ points in the focal line formed by the exemplary optical system 125, (with the MGB beam) is about 95% of total power. I.e., only about 10% of the energy is lost when MGB beam is utilized, as opposed to 50% of energy lost when one employs a Gaussian-Bessel (GB) beam.

The MGB intensity profile shown in FIG. 5A has further advantages. When trying to cut a substrate in a region close to sensitive coatings on the substrate, such a polymer layers, black matrix coating, metal traces, etc., any energy that forms portions of the focal line that are not in the substrate itself is not only wasted but also can serve to heat or damage the nearby coatings. For example, the rays that form the tail end of the GB beam focal line do strike the substrate, but over a large annular aperture, before they focus to form the intense core at the tail end of the focal line. The same condition occurs at the head or top of the focal line, where rays first focus to form a dense core and then diverge, where they form an annulus that will still impinge upon the substrate. Thus by limiting the energy to a distribution that is just long enough to cut the substrate itself, the MGB beam advantageously allows for optimal cutting with the least damage (or no damage) to nearby coatings, and therefore allows to cut in closer proximity to coatings than with a GB beam. Thus, according to some of the embodiments of device(s) and/or a method(s) disclosed herein, the workpiece comprises a portion that includes a coating (e.g., a polymer layers, black matrix coating, metal, or any other coating(s)), and a portion that does not include a coating. According to some embodiments n the uncoated portion has a thickness d, and the distance between the center of the focal line and the coating (i.e., of the coating that is adjacent to the focal line) is less than 500 µm, preferably less than 350 µm, for example between 10 µm, and 250 µm, or between 10 µm and 200 µm, or for example between 10 µm and 300 µm, or between 10 µm and 500 µm, or between 15 µm and 400 µm, or between 20 µm and 500 µm, or between 20 µm and 350 µm, or between 20 µm and 250 µm, or between or between 25 µm and 400 µm, or between 25 µm and 250 µm. According to some embodiments. The method(s) and/or device described herein create a plurality of perforations or defects (via said focal line) within the portion of the workpiece that does not include the coating, and the perforations or defects are formed a distance $Z_d$ from the coated portion of the workpiece. The distance $Z_d$ is measured edge-to edge—i.e., from the edge of the perforation(s) or defect(s) to the edge of the coating that is adjacent to the perforation(s) or defect(s). According to some embodiments $Z_d \le d/3$ and $Z_d > 5$ µm, for example $Z_d > 10$ µm, or >15 µm, where d the thickness of the uncoated portion of the workpiece. According to some embodiments $Zd \le d/4$ and $Zd > 5$ µm, for example $Zd > 10$ µm, or $Zd > 15$ $Zd > 25$ µm where d the thickness of the uncoated portion of the workpiece Furthermore, with a flat-top energy distribution such as shown with the MGB of FIG. 5C, the sensitivity of a cutting process to focus or substrate height changes will be minimized. For the GB shown in FIG. 5C, if the substrate location is moved along the optical axis, then different depths of the substrate will see either increased or decreased energy density, as the GB function changes in intensity along the optical axis. However, with the MGB, as long as the substrate is fully contained within the width of the MGB intensity profile, then according to the embodiments described herein small changes in focus will not result in any depth of the substrate receiving and more or less intensity. This means that the MGB beam advantageously provides a more consistent cutting or drilling process, where small focus changes (those within the range of the flat top energy distribution or length of the focal line) do not strongly influence the process or the quality of the end product or the workpiece.

According to at least some embodiments, the focal line within the glass substrate has a substantially uniform intensity profile, such that the peak intensity of the laser beam focal line along its optical axis does is not vary by more 35%, or by more than 30%, or by more than 25%, and preferably by no more than 20% relative to its maximum peak intensity $I_{max}$ for at least 80%, of the length L of the focal line 4' that is situated between $0.5I_{max}$ points. (The length L is the distance between $0.5I_{max}$ points (A, A') along the center of the focal line, in a beam propagation direction). According to some exemplary embodiments the peak intensity of the laser beam focal line 4' along its optical axis does is not vary by more 10% relative to its maximum peak intensity Imax for at least 80% of the length of the focal line. According to at least some embodiments, the focal line formed within the glass substrate has a substantially uniform profile as a function of distance, such that the peak intensity of the laser beam focal line along its optical axis does is not vary by more 25% (and preferably by less than 15%, for example by less than 10%, or by 5% or less) relative to its maximum peak intensity Imax for at least the length L of the defect line formed by the focal line 4'.

According to at least some embodiments, the focal line 4' within the glass substrate 7 has a substantially uniform intensity profile, such that the peak intensity of the laser beam focal line along its optical axis does is not vary by more 25% (e.g., variation is ≤20%, ≤15%, ≤10%, ≤5%, and even ≤3%) relative to its maximum peak intensity $I_{max}$ for the at least 85% of the length L of the focal line 4'. According to at least some embodiments, the focal line within the glass substrate has a substantially uniform intensity profile, such that the peak intensity of the laser beam focal line along its optical axis does is not vary by more 25% (e.g., variation is ≤20%, ≤15%, ≤10%, ≤5%, and even ≤3%) relative to its maximum peak intensity $I_{max}$ for the at least 90% of the length L of the focal line 4'.

The method of processing a glass workpiece can be used to cut glass, and to separate pieces of glass from one another. The laser cutting process separates glass parts in a controllable fashion with negligible debris and minimum defects and low subsurface damage to the edges, preserving part strength.

The laser processing method described herein is well suited for materials that are transparent to the selected laser wavelength. This wavelength may be, for example, 1064, 1030, 532, 530, 355, 343, or 266 nanometers. The workpiece preferably is substantially transparent to the selected laser wavelength (e.g., absorption less than about 20%, preferably less than 10%, and preferably less than about 1% per mm of material depth). The process step described herein is to create a 1 fault line or contour 110 that delineates the desired shape and establishes a path of least resistance for crack propagation and hence separation and detachment of the shape from its substrate matrix. The laser separation method can be tuned and configured to enable manual or mechanical separation, thermal separation, and partial separation or total separation of glass shapes out of the original substrate.

According to some embodiments, as shown for example in FIG. 5B, over 0.85 (or 85%) of total optical power in the focal line 4' formed by the in the modified Gauss-Bessel beam (MGB beam) is contained between $(\frac{1}{2})I_{max}$ points (i.e., when intensity threshold=$(\frac{1}{2})I_{max}$). According to some embodiments over 90% of total power in the focal line 4' formed by the MGB beam, and in some embodiments over 95%, is contained between $0.5I_{max}$ points. For example, in some embodiments 85% to 99% of total energy in the focal line 4' formed by the in the modified Gauss-Bessel (MGB) beam is contained in between $0.5I_{max}$ points. In contrast, only 80% of total power is contained in between $0.5I_{max}$ points in the focal line 4' formed by the ordinary Gauss-Bessel beam.

According to some embodiments over 60% of total optical power in the focal line 4' formed by the modified Gauss-Bessel (MGB) beam is contained between $0.8I_{max}$ points (i.e., when intensity threshold=$(0.8)I_{max}$). In contrast, less than 55% of total power is contained in between $0.8I_{max}$ points in the focal line 4' formed by the ordinary Gauss-Bessel beam.

According to some embodiments over 70% of total optical power in the focal line 4' formed by the in the modified Gauss-Bessel beam is contained between $0.8I_{max}$ points. According to some embodiments over 80% of total power, and in some embodiments over 85% of total power in the focal line 4' formed by the in the MGB beam is contained between $0.8I_{max}$ points. For example, in some embodiments 70% to 90% of total power in the focal line 4' formed by the in the MGB beam is contained in between $0.8I_{max}$ points. Also, for example, in the embodiment corresponding to FIG. 5B over 90% (e.g., ≥95%) of total optical power (and thus over 90% (e.g., ≥95%) of the beam energy) in the focal line 4' formed by the in the MGB beam is contained between $0.4I_{max}$ points (i.e., when intensity threshold=$0.4I_{max}$).

Figure 6:
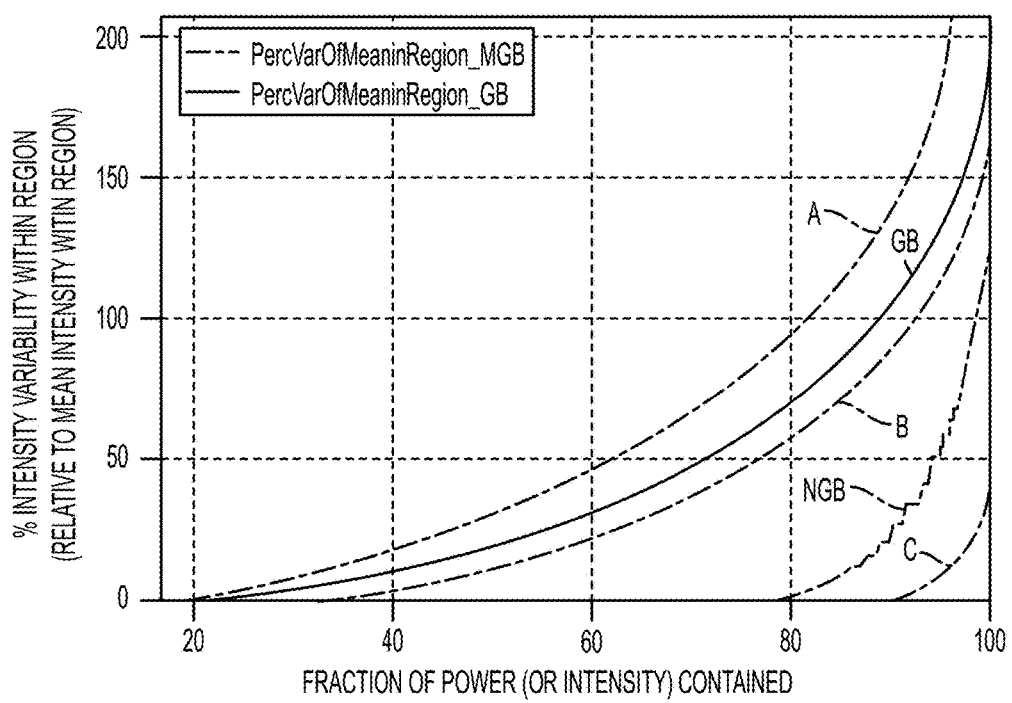
FIG. 6 is a plot, for both a Gauss-Bessel beam and a MDB, of the % peak intensity variation of the laser beam focal line along the optical axis (as % of mean peak intensity within the same region) vs. the percentage of the laser focal line total energy contained in the same region.

FIG. 6 is a plot of the % peak intensity variation of the laser beam focal line along the optical axis (as % of mean peak intensity within that same region) vs. the total % of the optical intensity contained within that region. The modified Gauss-Bessel beam embodiments described herein will always form focal lines that have smaller intensity variability (smaller % of intensity variation) than the focal lines formed by the Gauss-Bessel beams. For example, as shown in FIG. 6, for an ideal Gauss-Bessel (GB) beam shown in FIG. 5A, a region that contains 80% of the total optical energy will have at least 63% intensity variability relative to the mean peak intensity within that region. (Mean peak intensity may be calculated, for example, by measuring the peak intensity of the focal line at least 5 (e.g. 5 to 10, or 5 to 15) equidistant locations, where the total distance between these points comprises at least 90% of the distance L, along the length L, and averaging the obtained peak intensity values). Similarly, for the same Gauss-Bessel (GB) beam, a region that contains 90% of the total optical energy will have at least 100% intensity variability (relative to the mean (average) peak intensity) within that region. A Gauss-Bessel beam that is not a perfect Gauss-Bessel (GB) beam may have even more % intensity variability than that shown for the Gauss-Bessel of FIG. 6. I.e., the less ideal the Gauss-Bessel beam is, the more variability it will have, and its variability curve will be situated in the region above that of the Gauss-Bessel beam curve (see, for example, curve A shown in FIG. 6). The Gauss-Bessel curve A of FIG. 6 may be formed, for example, when the axicon has a rounded rather than perfectly conical tip, or by the defects in the optical grating forming a focal line.

In contrast, the laser beam focal line 4' formed by the optical beam (MGB beam 2') according to the embodiments described herein will have variability curves that are situated below that of the Gauss-Bessel (GB) beam. This is illustrated, for example, by the MGB curves labeled B, C and MGB of FIG. 6. (The curve labeled MGB in FIG. 6 corresponds to the exemplary MGB curve of FIG. 5A). Thus, according to the embodiments described herein, a region of focal line 4' that contains 80% of the total optical energy will have less than 55%, and preferably less than 50% intensity variability relative to the mean peak intensity within that region; and a region that contains 90% of the total optical energy will have less than about 90% (e.g., 0 to 80%, or 0 to 70%, or 0 to 60%, or 0 to 50%, 0 to 25%) of intensity variability within that region (relative mean peak intensity within this region). Thus, according to the embodiments the intensity variability curves of the focal line formed by MGB beams are situated below that of the Gauss-Bessel (GB) beam. For example, according to the embodiments described herein, a region of focal line 4' that contains 80% of the total optical energy will have less than 50% (e.g., 0% to 50%, or 0% to 40%, or even 0 to 25%) intensity variability relative to the mean peak intensity within that region, and a region that contains 90% of the total optical energy will have less than about 70, and in some embodiments less than 50% (e.g., 0% to 50%, or 0 to 40%) of intensity variability within that region (relative to mean peak intensity within this region). According to at least some of the embodiments described herein, a region of focal line 4' that contains 60% of the total optical energy will have 0 to 25% intensity variability relative to the mean peak intensity within that region.

For example, according to some embodiments, shown as MGB curve in FIG. 6, for the improved energy distribution of focal line (for example, the nearly, but not quite perfect, top hat energy distribution shown in FIG. 5A), a region that contains 80% of the total optical energy will have about 1% intensity variability relative to the mean peak intensity within that region, and a region that contains 90% of the total optical energy will have less than about 30% peak intensity variability within that region.

In some embodiments of the invention described herein the focal line has a non-axisymmetric beam cross section rather than circular cross-section. Thus, in some embodiments, the portion of the pulsed laser beam directed into the transparent workpiece 7 includes a wavelength λ, an effective spot size $w_{o,eff}$, and a non-axisymmetric cross section that comprises a minimum Rayleigh range $Z_{Rx,min}$ in a cross-sectional x-direction and a minimum Rayleigh range $Z_{Ry,min}$ in a cross-sectional y-direction, wherein the smaller of $Z_{Rx,min}$ and $Z_{Ry,min}$ is greater than $$F_D \frac{\pi w_{0,eff}^2}{\lambda},$$

where $F_D$ is a dimensionless divergence factor. In at least some embodiments $F_D \geq 10$, $F_D \geq 10$, or ≥20, or even ≥50. In some embodiments $F_D \geq 75$ and even ≥100. For example, in the exemplary embodiments described herein $10000 \geq F_D \geq 100$. For example, in the exemplary embodiments described herein $1000 \geq F_D \geq 100$. According to at least some embodiments, the non-axisymmetric beam cross section of the portion of the pulsed laser beam directed into the transparent workpiece comprises a long axis $w_{o,max}$ and a short axis $w_{o,min}$, wherein the long axis $w_{o,max}$ is longer than the short axis $w_{o,min}$ and an aspect ratio of the long axis $w_{o,max}$ to the short axis $w_{o,min}$ is greater than 1.1, or even greater than 1.3. In some embodiments the aspect ratio of the long axis $w_{o,max}$ to the short axis $w_{o,min}$ is 1.2 to 15.0, or 1.5 to 3.0. In some embodiments wherein the smaller of $Z_{Rx,min}$ and $Z_{Ry,min}$ is greater than $$250 \frac{\pi w_{0,eff}^2}{\lambda}$$

For example, the focal line beam cross-section may be elliptical and in such embodiments the center portion 4a' of the focal line 4' will have two diameters—a maximum diameter along the major axis of the ellipse and a minimum diameter long the minor axis of the ellipse. In at least some embodiments the ratio of the maximum diameter to the minimum diameter is greater than 1.1, for example greater than 1.3 (e.g., 1.2 to 15.0, or 1.5 to 3.0).

When a quasi-non diffracting beam or focal line has a non-axisymmetric cross section, such as elliptical cross section, the optical intensity with within the non-axisymmetric spot formed by the focal line is typically less than the intensity within a circular spot formed by of the axisymmetric focal line, since the energy is spread out more by the long axis of the ellipse, or another oblong cross-sectional shape. In addition, many of the methods that can be used to generate such a non axi-symmetric beam comprise decohering one section of the beam from another. This means that there is an additional loss in intensity because of the incoherent addition of the two beam segments formed by the non axi-symmetric beam, which results in a weaker average intensity within the spot than that produced by a coherent addition of the light that generally forms axisymmetric spots. These two effects mean that the non axi-symmetric beam formation methods suffer from an inherent energy disadvantage compared to more symmetric non-diffracting beams. In the case of a GB beam, such an energy penalty can make the difference between being able to cut a particular material or not, to be able to cut a thicker piece of material where the energy must be spread out over a longer line length, or being able to split one laser beam into two to make a piece of equipment more cost effective. However use of a MGB beam, which is more energy efficient than a GB beam, can be particularly advantageous if MGB is a non axisymmetric quasi-non diffracting beam. As the use of a MGB beam profile allows one to recover (within the focal line) some of the energy efficiency that is lost by the use of non axi-symmetric beams.

It is noted that in the plots shown herein the peak intensity percentages (y axis) also corresponds to the same percentage of peak optical power. Both peak intensity and peak power is the maximum value observed within a given beam cross-section of the focal line (typically along the optical axis).

As discussed above, in order to create holes in glass substrate or to cut glass, it is advantageous to utilize the focal line 4' that has a substantially uniform peak intensity profile along at least 80%, 85%, or 90% of its length L. Optical system features to consider when calculating an appropriate optical surfaces for the exemplary optical system 125 (FLIMOS) for producing a focal line 4' having the "top hat" energy distribution shown in FIG. 5A) with a MGB beam are shown schematically in FIG. 7. The optical system (FLIMOS) of this exemplary embodiment converts the input Gaussian Bessel beam 2 into an MGB beam 2'. More specifically, in this embodiment, at least the $1/e^2$ intensity region of the Gaussian beam 2 is mapped by the optical system 125 (FLIMOS) to a focal line 4' such that it has a substantially uniform peak intensity distribution along the length L of the focal line 4'. In some embodiments, the optical system 125 maps at least the energy contained between the 1.2 times the $1/e^2$ of the input Gaussian beam to the focal line 4'. In some embodiments, the optical system 125 at least the 1.3 times the $1/e^2$ region of the input Gaussian beam 2 to the focal line 4'. In some embodiments, the optical system 125 maps the energy contained between at least the 1.5 times the $1/e^2$ region of the input Gaussian beam to the focal line 4'. In some embodiments, the optical system 125 maps at the energy contained between at least the 1.7 times the $1/e^2$ region of the input Gaussian beam to the focal line 4', and in some embodiments, the optical system 125 maps at the energy contained between least the 2 times the $1/e^2$ region of the input Gaussian beam 2 to the focal line 4'. The optical system 125, the mapping, and the exemplary features of the embodiments optical system(s) 125 performing the mapping function described above, as well as the FIG. 7 are disclosed in more detail further in the specification.

According to some embodiments the focal line 4' has a uniform intensity profile, such that the peak intensity of the laser beam focal line along its optical axis does is not vary by more than 35%, 30%, 25%, 20%, or 15%, or 10% or even 5%, for at least 90% of the length L of the defect line 120.

According to at least some embodiments the diameter D of the focal line does not vary by more than 20% from its mean diameter within the focal line region corresponding to the length L. According to at least some embodiments the diameter D within the region L of the focal line 4' does not vary by more than 20% from its maximum diameter within this region. If the focal line 4' has non axisymmetric cross section, such as an elliptical cross-section, the above conditions can still be satisfied for any focal line cross-section that includes the center of the focal line—i.e. that includes the peak intensity core portion of the focal line. For example, if the cross-section of the focal line 4' is axisymmetric (e.g., elliptical) and the focal line satisfies the condition that the diameter D of the focal line does not vary by more than 20% from its mean diameter within the focal line region corresponding to the length L, it means that 1) the maximum diameter of the focal line $D_{max}$ of the focal line does not vary by more than 20% from its mean maximum diameter within the focal line region corresponding to the length L; and) the minimum diameter of the elliptical of the focal line also does not vary by more than 20% from its mean minimum diameter within the focal line region corresponding to the length L. Similarly, if the cross-section of the focal line 4' is elliptical and the focal line satisfies the condition that the diameter D of the focal line does not vary by more than 20% from maximum diameter within this region within the focal line region corresponding to the length L, it means that:

1) the maximum diameter of the focal line $D_{max}$ of the focal line does not vary by more than 20% from its mean maximum value within the focal line region corresponding to the length L; and
2) the minimum diameter of the elliptical of the focal line also does not vary by more than 20% from its maximum value within the focal line region corresponding to the length L.

According to at least some embodiments the diameter D of the focal line 4' is controlled by controlling the variability of angles β' of the rays forming the focal line 4'. According to at least some embodiments the angles β' of the rays forming the focal line 4' does not vary by more than 10% from the mean angle (mean β') of the rays within the focal line region corresponding to the length L. According to at least some embodiments the angles β' of the rays forming the focal line 4' does not vary by more than 5% from its mean angle β' of the rays within the focal line region corresponding to the length L of the focal line 4'. If the focal line 4' has an elliptical cross-section, the above conditions are satisfied for any focal line cross-section. For example, in the focal line's cross-section corresponding to the maximum diameter of the ellipse, the angles β' of the rays forming the focal line 4' does not vary by more than 15%, and more preferably do not vary by more than 10% from its mean angle β of the rays within the focal line region corresponding to the length L. Also, in the focal line's cross-section corresponding to the maximum diameter of the ellipse, the angles β' of the rays forming the focal line 4' does not vary by more than 10% from its mean angle β of the rays within the focal line region (of this cross-section) corresponding to the length L.

According to at least some embodiments the angles β' of the rays forming the focal line 4' and corresponding to the ray height $h_i$, for any given cross-section (that includes the center of the focal line) of the optical beam 2', does not vary by more than 10% from the convergence angle β' of the rays corresponding to the ray height $h_{i-1}$, for any rays situating within the $1/e^2$ points of the optical beam 2. According to at least some embodiments the angles β' of the rays forming the focal line 4' and corresponding to the ray height $h_i$ do not vary by more than 10% (for example less than 7% or even less than 5%, or not more than 3%) from angles β' of the rays corresponding to the ray height $h_{i-1}$, for any rays situating of the optical beam 2 situated within the radius Rz', where Rz=1.1$R_z$. According to at least some embodiments the angles β' of the converging light rays forming the focal line 4' and corresponding to the ray height $h_i$ do not vary by more than 10% from angles β' of the rays corresponding to the ray height $h_{i-1}$, for any rays of the optical beam 2 situating within the radius Rz', where Rz'=1.2$R_z$. According to at least some embodiments the convergence angles β' of the light rays forming the focal line 4' and corresponding to the ray height $h_i$ do not vary by more than 10% (for example less than 7% or even less than 5%) from the angles β' of the rays corresponding to the ray height $h_{i-1}$, for any rays of the optical beam 2 situating within the radius Rz', where Rz'=1.3Rz.

Figure 7:
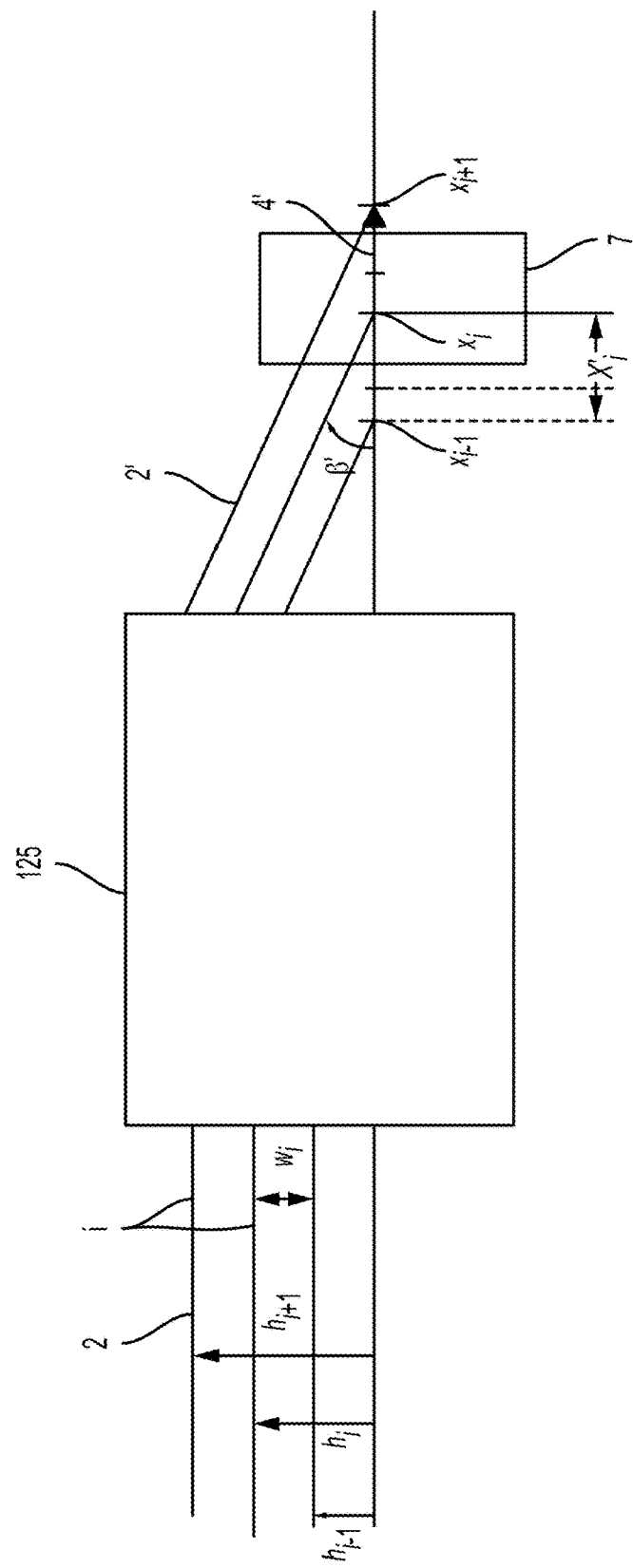
FIG. 7 is a schematic illustration of the optical system features to consider when calculating an appropriate optical surfaces for generation of modified Gauss-Bessel (MGB) beams, according to an embodiment of the present invention.

FIG. 7 is a schematic illustration of one embodiment the optical system 125 (FLIMOS) according to some embodiments of the present invention. The optical system 125 generates a Modified Gauss-Bessel (MGB) beam 2' from the incoming Gaussian beam 2 provided by the laser source 5, and creates a focal line 4' with substantially uniform optical intensity profile (e.g., nearly "top hat" intensity distribution) on the optical axis at least along the length of the defect line 120 for a specified distance z.

In order to create a focal line 4' that has substantially constant peak intensity along the optical axis and simultaneously has a substantially constant beam diameter D in each sub-section of the focal line 4', the optical system 125 preferably satisfies the following two conditions.

First, it is desirable that the portions of the same amount of energy within beam 2 are reimaged into the optical axis within the focal line region 4' along the sections of the same or substantially the same length X' (condition 1) This condition creates substantially constant peak intensity at least within 90% of the portion L of the focal line 4'.

Second, the converging ray's angles β forming the focal line 4' should also be substantially equal to one another (condition 2). This condition helps to create substantially constant diameter D for least within 90% of the portion L of the focal line 4.

Thus, when the Gaussian energy distribution of beam 2 is subdivided into annular rings of equal power (but not necessarily equal width $w_i$), the optical system 125 images the energy within each ring so that the energy within each ring of width $w_i$ is contained within the regions of the focal line 4' having the same or substantially the same length ($X_i' \approx X'$), such that the lengths $X_i'$ corresponding to the different rings of the same power in the incoming Gaussian beam 2 are within 15%, and preferably within the 10%, and more preferably within 0-5% of one another). For example, in the embodiment of FIG. 8A, distances $X_i$ within the focal line 4 formed by the optical component 3 are all equal to one another, thus after being reimaged by the reimaging optical system 6 into a focal line 4', corresponding distances $X_i'$ along the focal line 4' will also be equal to each other.

According to one embodiment, to satisfy this these conditions, we proceed as follows:

The input Gaussian beam 2 is discretized into a series of rings each corresponding to a ray height $h_i$, with i going from 1 to an arbitrary number N, with N preferably less than 100 (e.g., 5≤N≤20), with the maximum ray height Rz'=$h_{iMax}$, where Rz'≥0.9$R_z$. Preferrably, to minimise undesired energy spike(s) that can occur at the end of the focal line 4 and/or 4', the radial distance Rz' is at least equal to the radius that corresponds to $1/e^2$ radius of the Gaussian beam 2 (i.e., Rz'≥$R_z$). According to some embodiments Rz' corresponds to a radial distance within the beam 2 where Gaussian energy (intensity) is at least 1.1 times $1/e^2$ radius (i.e., Rz'≥1.1$R_z$). According to some embodiments Rz'<2 times $1/e^2$ radius (i.e., Rz'=2$R_z$). According to some embodiments $R_z$≤1.7×1/$e^2$ (i.e., Rz'≤1.7$R_z$). According to some embodiments Rz' is the radial distance within the beam 2 that corresponds to the level of intensity between 1.1 times $1/e^2$ and 1.5 times $1/e^2$ (i.e., 1.1 $R_z$≤Rz'≤1.5$R_z$). According to some embodiments Rz' is the radial distance within the beam 2 that corresponds to the level of intensity that is between 1.1 and 1.3 times $1/e^2$ (i.e., 1.1 $R_z$≤Rz'≤1.3$R_z$)

The height $h_i$ (see, for example, FIG. 8A) of each ring described above is chosen or calculated in such a way that the optical power or intensity contained inside any annulus in between two adjacent rings $h_i$ and $h_{i+1}$ is constant.

When propagating into the optical system 125, light rays originating from each ring $h_i$ are imaged by the optical system 125 at positions $x_i$ on the optical axis OA along the focal line 4'. To achieve the substantially uniform irradiance profile (substantially uniform peak intensity distribution) along the length of the focal line 4' the first condition is that the length of each sub-section defined by the optical axis crossing points [$x_i$, $x_{i+1}$] for each set of rays [i, i+1] the rays have substantially the same length $X_i'$ (for example, to a tolerance ±15%, and preferably to ±10%, and according to some embodiments to no more than ±5%).

Second, the diameter of the beam in each sub-section of the focal line is dictated by the ray angle β'.

Thus, in order to insure a constant beam diameter along the focal line, according to at least some exemplary embodiments described herein, the second condition satisfied by the optical system 125 (FLIMOS) is that the angle β' for each ray [i] needs to be constant for example, to a tolerance of ±20%, or ±15%, and preferably to ±10% or even ±10% or ±5%, or less. The condition for constraining angle β' to be substantially constant is present because, without such a constraint, the diameter D of the focal line 4' will change.

Changes in the diameter D will cause commensurate changes in the optical intensity within that section of the focal line. Too severe a change (large change) in the diameter D may result in no damage (e.g., no hole formation) within the glass in some of the glass regions, or in too many micro cracks which can damage the glass, or produce inconsistent damage.

Figure 8A:
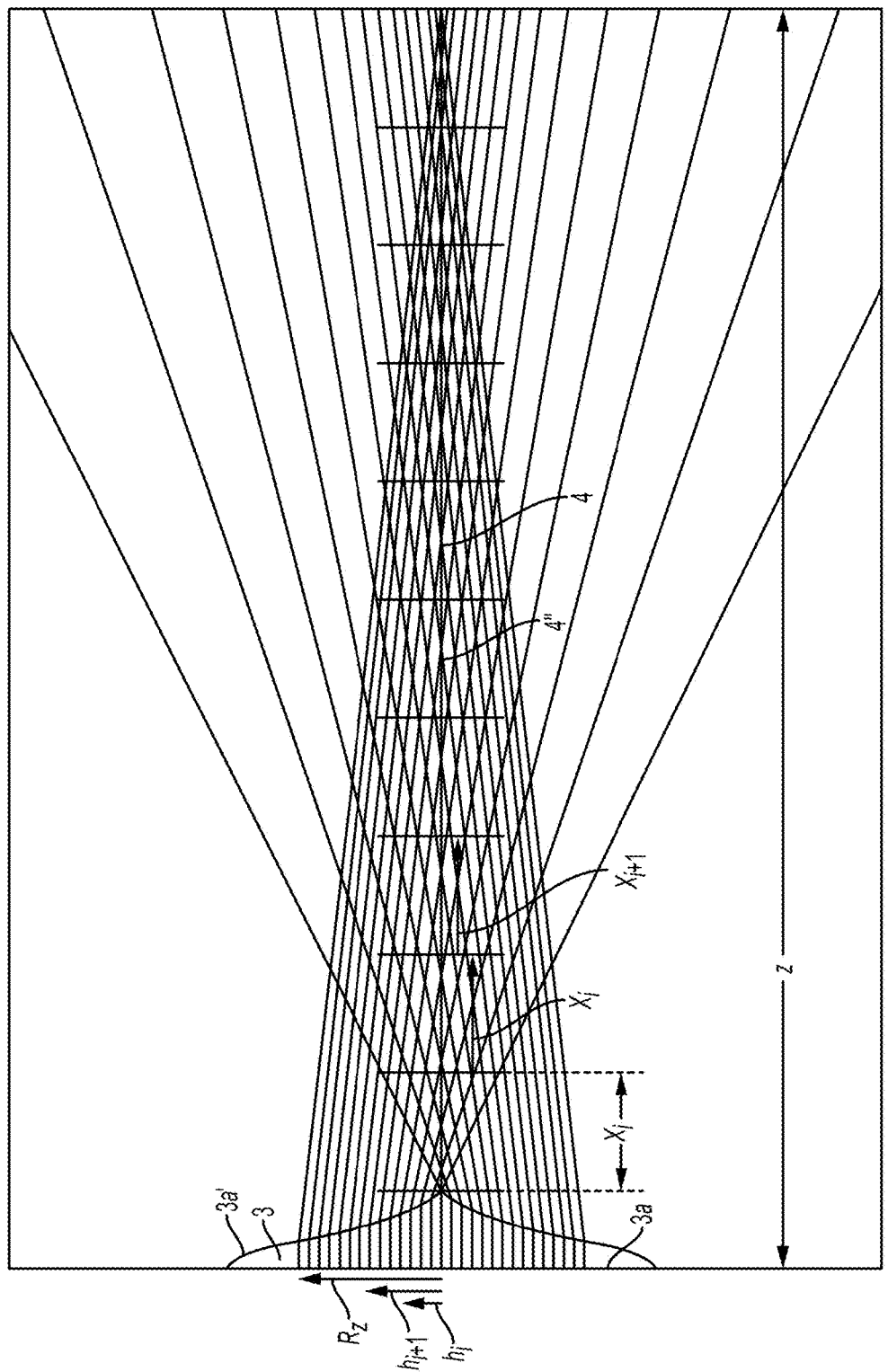
FIG. 8A illustrates an optical component (modified axicon) and the optical ray trace from the same, according to one embodiment of the present invention.
Figure 8B:
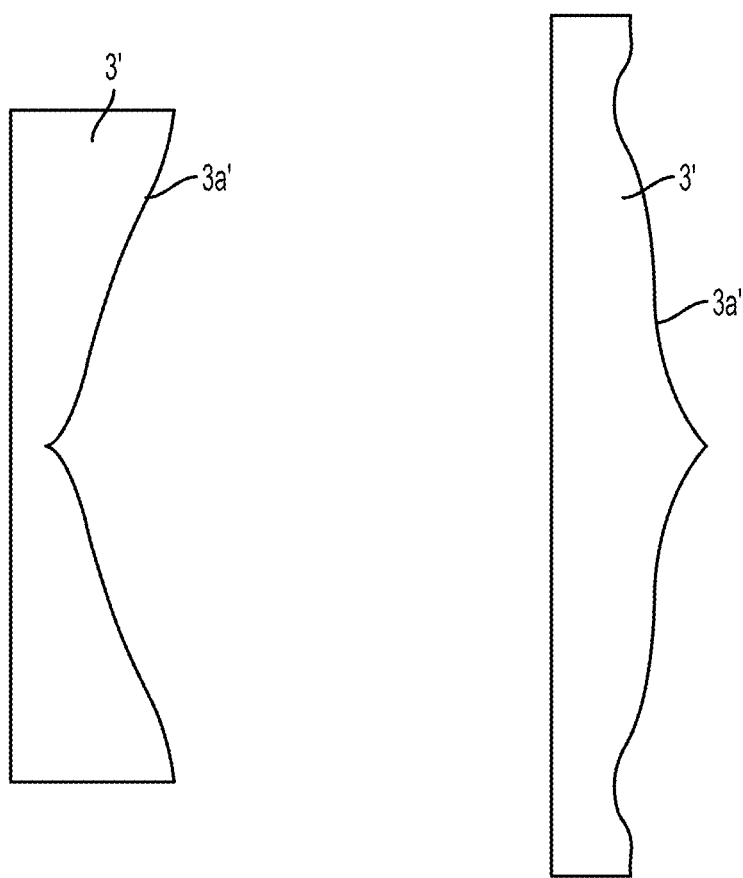
FIG. 8B illustrates other optical components according to some embodiments of the present invention.

FIG. 8A illustrates an optical component 3' of the optical system 125. In this embodiment the optical component 3' is a modified axicon. As can be seen in the embodiment shown in FIG. 8A, the optical component 3' has a surface 3a' that is not a typical conical surface of an axicon that has a constant slope, but instead a surface that has a more complex profile (e.g., an aspheric profile shaped such that the slope of the surface varies across the surface as it radial eight changes). In this embodiment, as we can see in the figure, surface 3a' of the optical component 3' has slight undulations (slope changes shown in cross-section), which keeps the peak intensity of light beam substantially uniform within the focal line 4' for a distance z. More specifically, in this embodiment surface 3a' of the optical component 3' has a variable radius of curvature—the shape of surface 3a' changes so that light rays impinging at this surface encounter a slightly different surface shape, and are bent to converge towards the focal line to achieve the substantially uniform peak intensity profile along the length of the focal line 4 and thus uniform peak intensity profile along the length focal line 4'. However, as shown schematically in FIG. 8B, a different optical component 3' such as modified waxicon, modified inverted axicon (either refractive or reflective), or an aspherical component (conical or non-conical) with at least one optical surface 3a' that changes so that light rays impinging at this surface encounter a slightly different surface shape, and are bent to converge towards the focal line to achieve the substantially uniform irradiance profile (and thus a substantially uniform peak intensity profile) along the length L of the focal line may also be utilized. Optical component 3' may be, for example, a spatial light modulator or a grating that satisfies the above two conditions).

More specifically, in FIG. 8A embodiment, the optical component 3' folds the light rays such that there is the constant energy (and thus constant peak intensity) per subsection i.e., that the length of each sub-section defined by the optical axis crossing points $[x_i, x_{i+1}]$ for each set of rays [i, i+1] all have substantially same length Xi' to a tolerance of about ±10%). Surface 3a' of the optical component 3' can be designed, for example, by starting with an axicon component similar to that shown in FIG. 1, and then optimizing the component's surface 3a (via the use of design using a commercial lens design program) by varying the aspheric coefficients of the surface while specifying where the specific rays having specified high $h_i$ should intersect the optical axis to define surface 3a'. An alternative solution is to trace the rays crossing the points $x_i, x_{i+1}$ backwards and calculate where these rays should intersect the optical surface 3a' to correspond to the ray heights $h_i, \ldots h_N$ on the input side of the optical component 3'. The points of intersection will define the surface 3a' of the optical component 3'.

As shown in FIG. 8A, when the resultant modified axicon 3' is provided with Gaussian beam 2 which is i divided into a series of rings each with pupil height $h_i$, with i going from 1 to an arbitrary number N (wherein the height of each ring is calculated in such a way that the energy (power) comprised inside any annulus in between two adjacent rings $h_i$ and $h_{i+1}$ is constant.), the lengths of each sub-section defined by the optical axis crossing points $[x_i, x_{i+1}]$ for each set of rays [i, i+1] are substantially equal to one another (for example, to a tolerance ±15%, and preferably to ±10%, ±5%, or less).

However, as we can see in FIG. 8A, the angle β for each ray [i] forming the focal line 4 is not constant when the light rays exit optical component 3'. That is, the modified axicon of FIG. 8A, when used alone (without the properly designed re-imaging system 6), satisfies only one of the above two conditions. One could achieve constant energy (constant peak intensity) from each unit length at the focal line 4, but the light rays are converging out of the modified axicon at slightly different convergence angles β, which will affect the diameter of the focal line 4. For example, the rays are converging at different angles rather than remaining parallel to one another. In addition, the rays adjacent to the tip of the optical component 3' diverge. If this area is relatively large, it can create an undesirable spike of energy near the tip of the optical component. If the focal line is reimaged by an optical system 6 that does not correct for different ray angles β of the converging rays forming focal line 4, the resultant focal line 4' will not have a substantially constant diameter D.

Figure 9A:
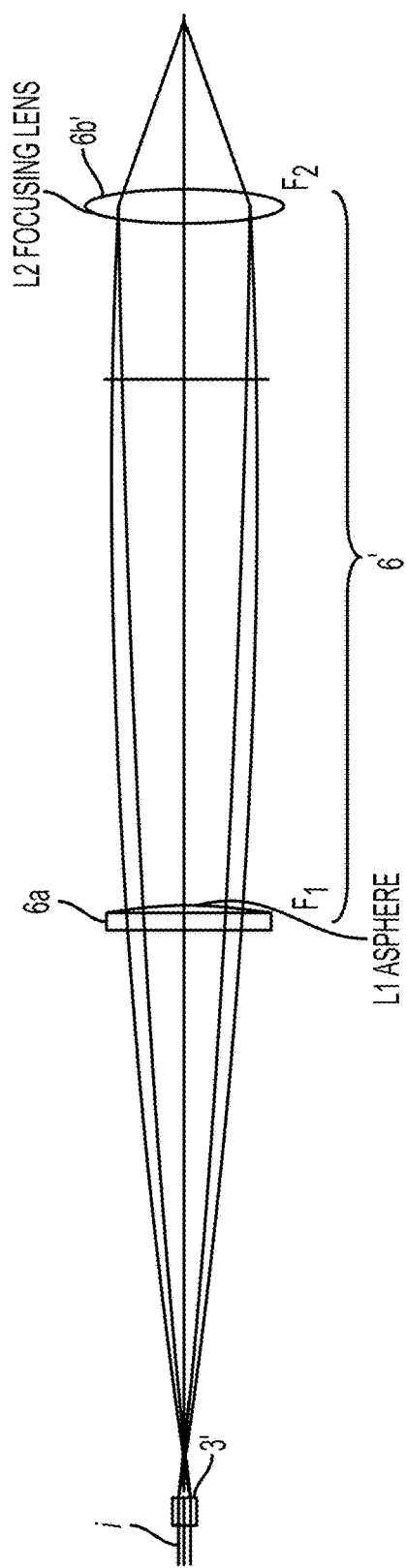
FIG. 9A illustrates one embodiment of refractive optical system for laser processing or cutting glass and other materials. The optical system is structured to form a Modified Gauss-Bessel beam such that the focal line formed by the optical system has a substantially uniform peak intensity distribution and a substantially constant diameter.

Accordingly in order to meet the second condition discussed above—i.e., in order to have a substantially the same angle β' for each ray exiting the optical system 125 (FLIMOS), it can be beneficial to utilize another optical component with an aspheric surface. This component may be, for example, an aspheric lens of the reimaging system 6'. FIG. 9A illustrates a reimaging optical system 6' and exemplary optical components 6a and 6b, one of which is a lens with an aspheric surface. This component may also be, for example, a reflective component with an n aspheric.

More specifically, in some embodiments (see, for example, FIG. 9B), a modified axicon 3' can be used in conjunction with at least one component of the re-imaging lens system 6' to provide the substantially constant angle β' for each ray [i] corresponding to the rays in beam 2 contained within the radial distance Rz' that forms the focal line 4', (e.g., all angles β' are within ±15% of each other). Preferably, as shown in the embodiments described herein, all rays converging to form the focal line 4' converge at angles β' that are within ±10%, and more preferably within ±5% of each other. In these embodiments, the re-imaging lens system 6' includes optical components 6a' and 6b' which are similar to those illustrated in FIG. 2, but at least one of the optical components 6a', 6b' has an aspheric surface. The optical components 6a' and 6b' of the imaging system 6' thus reimage the extended focus (i.e. focal line), as laser beam focal line 4', such that the angle β' for each ray [i] converging to form the focal line 4' is substantially constant when the light rays exit optical component 6b'. In some embodiments $Rz'=R_z$, and in some embodiments Rz' is greater $R_z$ than but smaller than $3R_z$. In some embodiments Rz' is greater $R_z$ than but smaller or equal to $2R_z$. In some embodiments $Rz' \leq 1.5R_z$. In some embodiments Rz' is at least $1.2R_z$.

Preferably, according to some embodiments, optical system 125 (FLIMOS) utilizes at least two aspheric optical components that are spaced apart from one another, and during the optical system design we adjust the one or more aspherization coefficients (also referred to as higher order aspheric coefficients or aspheric coefficients $a_2$-$a_{12}$, described below) of one or both optical component to meet both conditions. For example, at least one optical component of the optical system optical system 125 (FLIMOS) may have an aspheric surface described by one or more non-zero aspheric coefficients $a_2$-$a_{12}$, as shown for example in Example 1 embodiment, and described in reference to Table 1.

The embodiments described below utilize a pair of such aspheric components. However, more than two aspheric components may also be utilized, and the aspheric components of the optical system 125 may have one or two aspheric surfaces.

Various embodiments will be further clarified by the following examples.

Example 1 Embodiment

Figure 9B:
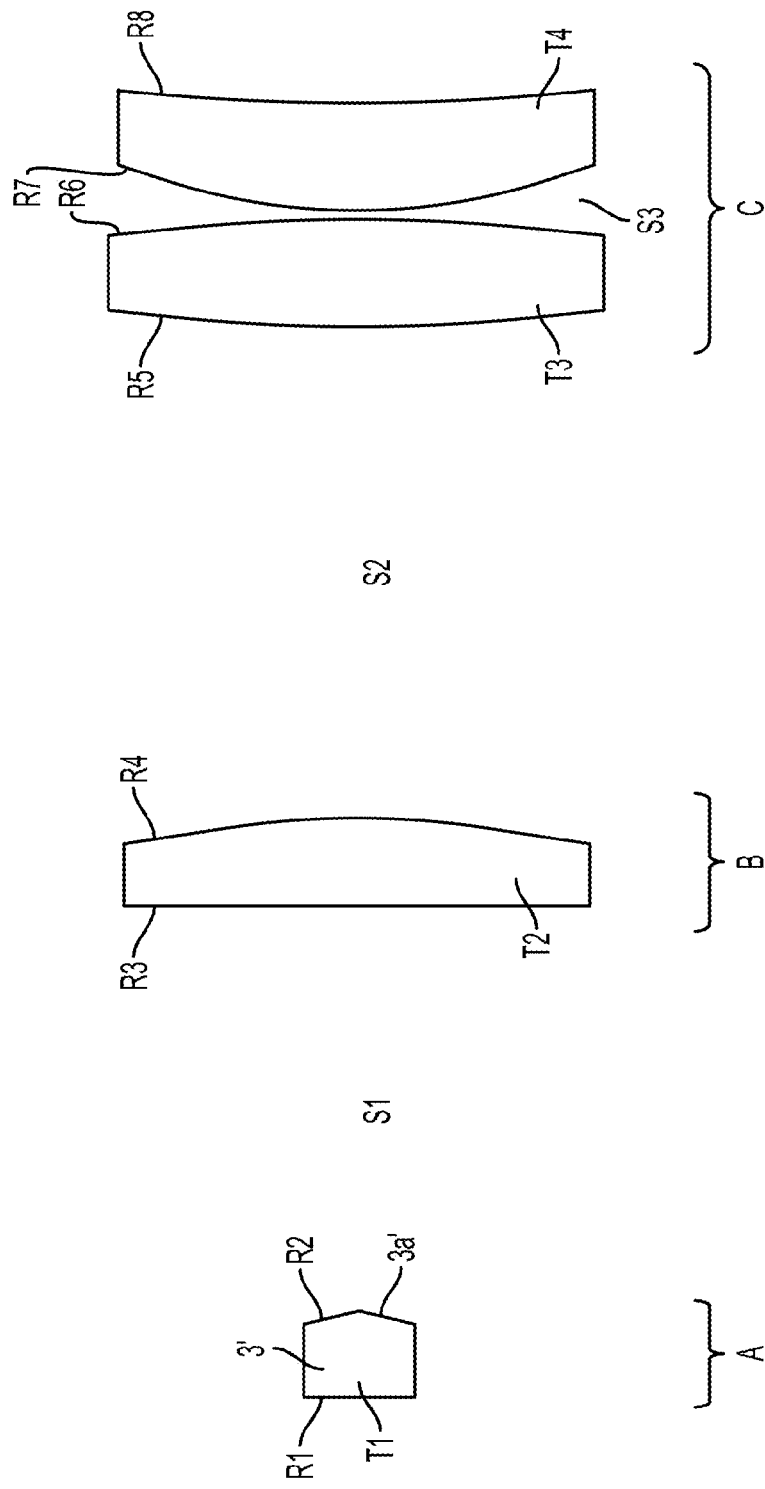
FIG. 9B illustrates the optical components of FIG. 9A in more detail.

FIG. 9A illustrates a refractive optical system 125 structured to form a modified Gauss-Bessel beam having the following characteristics: (i) substantially uniform power distribution at least for a distance Z (or the length L of the focal line and (ii) substantially constant diameter D. FIG. 9A illustrates that this embodiment of the optical system 125 includes a modified axicon 3' with an aspheric surface $3a'$ and the re-imaging lens system 6' that includes at least two optical components $6a'$ and $6b'$. The optical component $6a'$ includes an aspheric surface (denoted as an L1 asphere in this figure) which in this embodiment faces the optical component $6b'$. In this embodiment, the second optical component $6b'$ does not have an aspheric surface, and can be easily replaced by another lens component of different focal length, thus changing the focal line's magnification. However, in some embodiments it may have an aspheric surface. FIG. 9B illustrates the shapes of the exemplary optical components of FIG. 9A. In this figure T1, T2, T3, T4 are the thickness of each glass element, S1, S2 and S3 are the airspaces between the optical elements, along the optical axis, (these are not shown to scale), and R1-R8 denote the radii of curvature of each optical element. The components or elements are situated in "groups". For example, as shown in FIG. 9B, group "A" corresponds to the modified axicon 3', group "B" corresponds to lens component 6A, and group "C" corresponds to the lens component 6B (a doublet). Table 1, below, provides optical parameters for the embodiment of the refractive optical system 125 illustrated in FIGS. 9A and 9B.

TABLE 1

| Group | Surface Radius (mm) Ri/configuration | Element Thickness Ti (mm) | Refractive index | Spacing Si to next optical element(mm) | Abbe No. ($V_d$) |
|---|---|---|---|---|---|
| A | $R_1$ = ∞ (the surface is planar) $R_2$ = not applicable/ aspheric surface | T1 = 4.7 | 1.4745 | S1 = 133.115 | 81.6078 |
| B | $R_3$ = ∞ (the surface is planar) $R_4$ = −64.902 | T2 = 4.7 | 1.4745 | S2 = 157.894 | 81.6078 |
| C | $R_5$ = 76.902 $R_6$ = −128.180 | T3 = 6 | 1.6200 | S3 = 0.5 | 36.3665 |
|   | $R_7$ = 32.081 $R_8$ = 95.431 | T4 = 6 | 1.6200 | Image distance = 2.73 | 36.3665 |

In this embodiment F1=125 mm; F2=40 mm, and F1+F2=165 mm. Conic constant/aspheric coefficients for the surfaces corresponding to the radii $R_2$ and $R_4$ of the embodiment of Table 1 are provided below and are described by the equation 1.3.

An aspheric surface is a surface whose shape described by the following equation $$z' = (cr^2/1 + (1-(1+k)c^2r^2)^{1/2}) + (a_1r + a_2r^2 + a_3r^3 + a_4r^4 + a_5r^5 + a_6r^6 + a_7r^7 + a_8r^8 + a_9r^9 + a_{10}r^{10} + a_{11}r^{11} + a_{12}r^{12})$$

Eq. 1.3 where z' is the surface sag, r is the height of the surface from the optical axis in radial direction (e.g., x or y height, depending on surface cross-section), c is the surface curvature (i.e. $c_i=1/R_i$), k is the conic constant, and coefficients $a_i$ are the first to the $12t^h$ order aspheric coefficients or higher order aspheric coefficients (polynomial aspheres) describing the surface.

In Table 1 embodiment, the optical component 3' has a surface $3a'$(corresponding $R_2$ in Table 1) described by the following coefficients $a_1$-$a_7$, respectively: −0.085274788; 0.065748845; 0.077574995; −0.054148636; 0.022077021; −0.0054987472; 0.0006682955; and the aspheric coefficients $a_8$-$a_{12}$ are 0. In this embodiment this surface $3a'$ has the conic constant K=0, however an $a_1$ coefficient has a nonzero value, which is equivalent to having a conic constant K with a non-zero value. Accordingly, an equivalent surface may be described by specifying a conic constant K that is non zero, or a non-zero zero value for the coefficient $a_1$ coefficient (or a combination of a nonzero K and $a_1$).

In the embodiment of Table 1, the optical element's surface corresponding to $R_4$, (Group B component) has a conic constant K=4.518096; and the coefficients $a_1$-$a_{12}$ are 0. In alternative embodiment of component $6a$, one of the surfaces is defined by higher order aspheric coefficients $a_2$ through $a_{12}$, at least one of which has a non-zero value.

In the embodiment of Table 1, at least one of the surfaces is described or defined by at least one higher order aspheric coefficients $a_2$-$a_{12}$ with non-zero value (i.e., at least one of $a_2, a_3, \ldots, a_{12} \neq 0$), and at least one another surface is described by either a non zero conic constant and (or at least one non zero higher aspheric coefficient chosen from $a_2$ to $a_{12}$ (i.e., K≠0 and/or at least one $a_2$ to $a_{12}$ is not 0).

Example 2

Figure 10A:
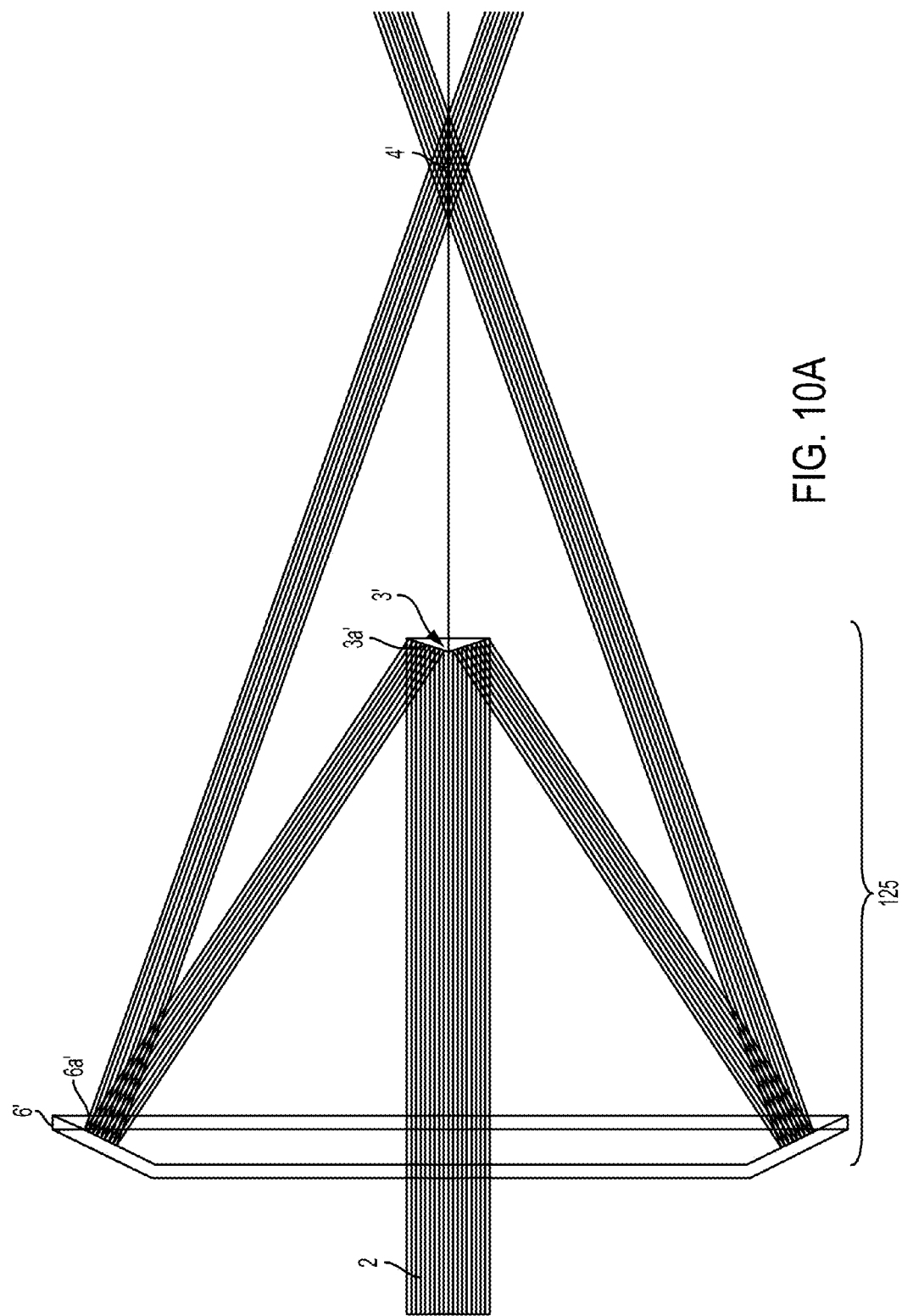

FIGS. 10A and 10B illustrates an embodiment of the reflective optical system 125 that is forming a modified Gauss-Bessel beam having the following characteristics: (i) substantially uniform peak intensity distribution at least for a distance 0.9L of the focal line 4'; and (ii) substantially constant diameter D. In this embodiment the diameter D does not vary by more than 20% from its maximum value at least at least for a distance 0.9L of the focal line 4'. FIG. 10A illustrates that this embodiment of the optical system 125 includes a modified reflective axicon 3' with a reflective aspheric surface $3a'$ and the re-imaging system 6' that includes a single reflective component $6a'$ with the aspheric surface. The reflective embodiment of FIGS. 10A and 10B are optically equivalent to the refractive embodiment shown in FIGS. 9A and 9B, and are designed in a similar manner, in order to provide the "top hat" type intensity profile similar to that shown in FIG. 5A. Please note that at least one of the reflective components has a surface that is at least partially defined by least one higher order aspheric coefficient ($a_2, a_3, \ldots, a_{12}$, that is non-zero).

As described above, according to at least some exemplary embodiments, the design of the optical system 125 includes dividing or discretizing the incoming Gaussian beam 2 into a series of rings and the rays are imaged along the optical axis: 1) at the right place (i.e., so that the beam portions contained within each ring, are mapped along the sections of the optical axis that have substantially the same length (i.e., within plus or minus 15%, 10%, and preferably 5% or even 2% of that of the previous section); and 2) with the proper angle (i.e. substantially the same angle (β'), for example within plus or minus 15%, 10%, and preferably 5% or even 2%. That is, we determined that, for at least a Gaussian beam 2 of radius Rz'≥1R$_z$ (and more preferably when R$_z$≤Rz'≤1.7R$_z$, e.g., 1.1 R$_z$≤Rz'≤1.3R$_z$), when incoming Gaussian beam 2 is divided into a series of rings such that equal amount of optical power (or intensity) is situated in each ring the rays forming laser beam focal line, the rays are imaged by the optical system 125 (FLIMOS) along the optical axis such that that: the consecutive beam portions contained within each ring are mapped along the sections of the optical axis that have substantially the same and with substantially the same exit angle β'.

The generation of focal line 4' can be performed via a MGB (Modified Gaussian Beam), as described above. However, other forms of modified slowly diffracting or quasi non-diffracting beams may also be used, such as modified Airy beams, or Gauss-Bessel beams modified to have an elliptical central spot, for example. Thus, according to other the embodiments, the optical component 3' does not have to be a modified axicon, but can be any optical component structured to provide modified slowly diffracting or non-diffracting beams as long as the optical component 3' is structured to provide substantially uniform peak intensity distribution, such that the rings of equal energy within the incoming slowly diffracting or non-diffracting beams are mapped along the optical axis by the optical component 3' (or by the optical system 125 comprising the optical component 3') along the focal line 4' so as to have the same or substantially the same lengths X$_i$' (to within e.g., to within 30%, 25%, 20%, and preferably within 15% or less).

Table 2, below, provides optical parameters for another embodiment of the refractive optical system 125.

TABLE 2

| Group | Surface Radius | Thickness | Spacing | Refractive Index | Abbe No. Vd |
|---|---|---|---|---|---|
| A | R1 = ∞ | T1 = 4.7 | | 1.4745 | 81.6079 |
| | R2 = ∞ | | S1 = 133.115 | | |
| B | R3 = ∞ | T2 = 4.7 | | 1.4745 | 81.6079 |
| | R4 = −64.882 | | S2 = 157.894 | | |
| C | R5 = 46.807 | T3 = 6 | | 1.6200 | 36.3665 |
| | R6 = −157.350 | | S3 = 0.5 | | |
| | R7 = 20.983 | T4 = 7 | | 1.6200 | 36.3665 |
| | R8 = 44.508 | | Image = 21.142 | | |

In this embodiment F1=120 mm; F2=29.115 mm, and F1+F2=149.115 mm. Conic constant/aspheric coefficients for the of the exemplary embodiment of Table 2 are described by the Equation 1.3 and are as follows:
Aspheric Terms for group A (corresponding radius R$_2$ in Table 2) are:
k=0 and a$_1$=−0.085274788; a$_2$=−0.065748845; a$_3$=0.077574995;
a$_4$=−0.054148636; a$_5$=0.022077021; a$_6$=−0.0054987472; a$_7$=0.0006682955.

The optical element's surface corresponding to R$_4$, (Group B component) has a conic constant k=9.331346; and the coefficients a$_1$-a$_{12}$ are 0.
Experimental Results The impact of choosing different values for the parameter Rz' (the parameter Rz' is the maximum height of beam 2 for which the intensity along the focal line 4' is being mapped, so as to be substantially uniform) on the quality of the focal line was evaluated and experimentally verified.

Several refractive optical systems 125 (FLIMOS) were manufactured, that are similar to that in FIG. 9A, by diamond turning BaF$_2$ material to form aspheric surfaces 3a' of the optical component 3' and of the lens component 6a', such that the embodiments of the manufactured optical system 125 satisfied both of the two conditions to within 15% tolerances. In the exemplary embodiment of FIG. 9A the surface 3a' is similar in shape to the surface 3a' of FIG. 8A, and in addition the aspheric surface of component 6a' helps to reimage the optical rays exiting the optical component 6b' such that the converging rays forming the focal line 4' were substantially parallel to one another. The optical systems 125 were tested by using an incoming collimated laser beam 2 that had a Gaussian intensity profile. However, in different embodiments of the optical systems 125 the Gaussian beams 2 were truncated at different radial heights Rz', by using an adjustable diameter iris. As described above, the Gaussian beam 2, up to the radial height Rz' was subdivided into a plurality of rings of equal power. The number of rings N, can be, for example 4 to 100, but preferably 4 to 20, for example 5 to 15, or 5 to 10. The performance of the optical systems 125 were then evaluated in the lab using a CCD camera and 60× microscope objective to image the focal line 4'. By scanning the microscope objective and the CCD camera along the optical axis a series of cross sectional profiles of the focal line 4' were assembled, and the peak intensity calculated as function of position along the optical axis.

Figure 11A:
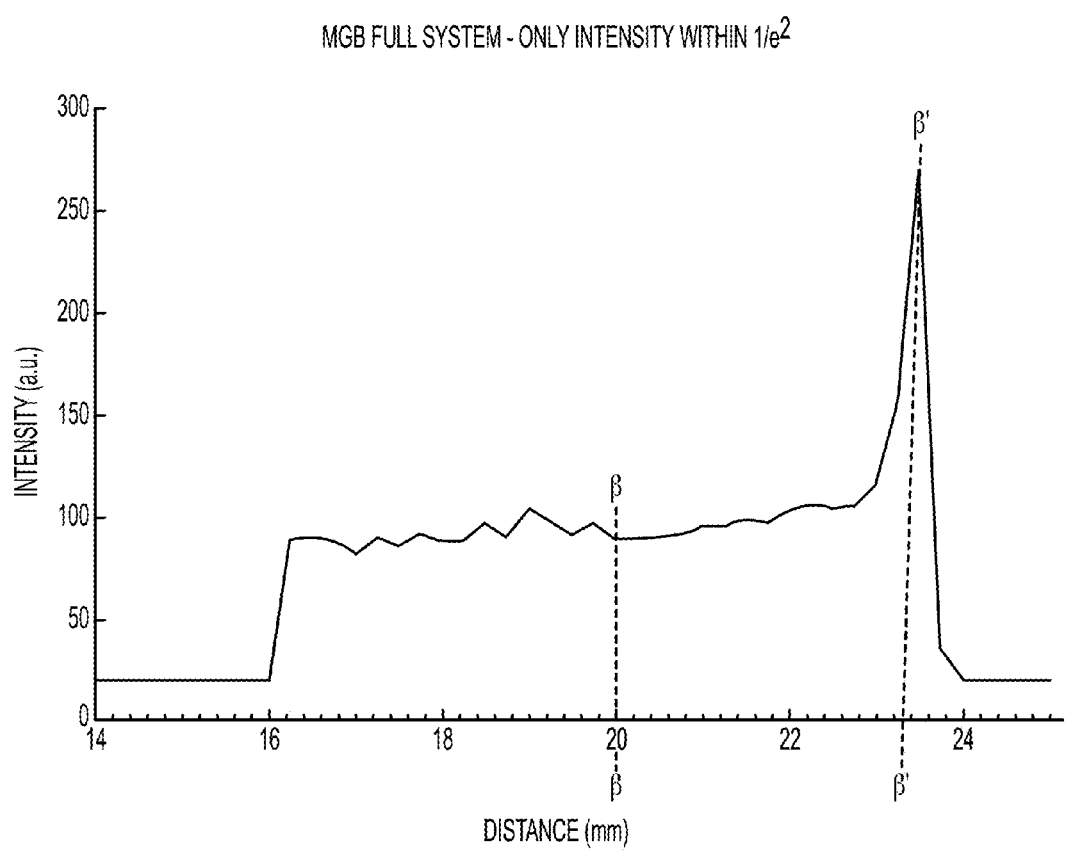
FIG. 11A illustrates measured peak intensity distribution within focal line formed by one embodiment of the optical system for laser processing or cutting glass and other materials.

FIG. 11A illustrates measured results of peak intensity of the focal line 4', as a function of distance the optical axis OA produced by the first exemplary embodiment of the optical system 125. In this embodiment of the optical system 125, in this embodiment Rz'=Rz=1.5 mm. That is, the optical components 3' and 6a' were designed to map the input Gaussian beam into the focal line such that that the for the portion of the input beam 2 contained within the 1/e$^2$ points: 1) the optical power contained within each ring (and the optical power within each ring was equal to the optical power within each of the other rings, up to 1/e$^2$ points) corresponded to the sections of the optical axis that have substantially the same length (e.g., within plus or minus 15%); and 2) the all the light rays contained within t the 1/e$^2$ points, when exiting the last reimaging component have substantially the same angle β' for each ray exiting the optical system (e.g., within plus or minus 15%). Thus in this manufactured embodiment of the optical system 125, the two conditions were satisfied only for rings comprised within the diameter at 1/e$^2$. The experiments results shown in FIG. 11A illustrate that most of the focal line 4' has substantially uniform intensity profile for most of the focal line's length. This is an improvement over the typical Gaussian Bessel intensity distribution profile shown, for example, in FIG. 4A. However, FIG. 11A illustrates that there is a high intensity spike at the end of the focal line with the maximum peak intensity occurring at a distance between about 23 mm and about 23.8 mm. In this embodiment the spike's width corresponds to about 10% of the length of the focal line, with the rest of the focal line having substantially uniform intensity as a function of distance z along the optical axis.

Figure 11B:
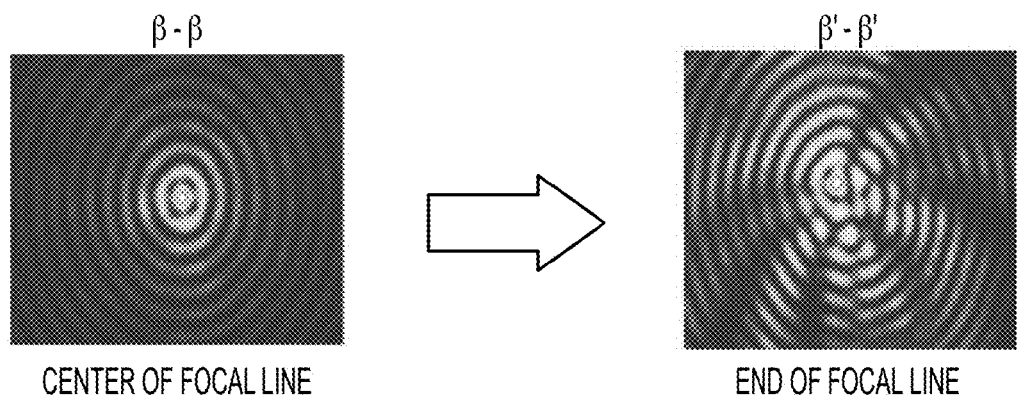
FIG. 11B illustrates beam cross-section in the center of the focal line and near one end of the focal line having the peak intensity distribution shown in FIG. 11A.

FIG. 11B illustrates measured beam cross sectional profile, at two different optical axis locations (indicated by lines B-B and B'-B'), that correspond to the labeled locations in focal line intensity profile of FIG. 11A. The beam cross sectional profile shown on the left hand side corresponds to the position at about the center portion of the focal line—i.e., at z≈20 mm. The central spot or the central lobe 4a' corresponds to the focal line 4'. The beam cross sectional profile shown on the right hand side corresponds to the position near the end of the focal line—i.e., at the location of the energy spike. As, as shown in FIG. 11B, at a location close to the end of the focal line 4', the beam shape presents some interference effects or fringes which affected the cross sectional beam profile. Furthermore, being interference effects, these fringes were highly sensitive to any misalignment in the system. Accordingly, while this optical system is suitable for cutting one or more glass substrate 7 situated between the points z=16.1 mm and z=23 mm, more energy was present between points z=23 mm and z=23.8 mm than is optimally desirable. However, this energy spike can be eliminated by an optional aperture that blocks the light rays from the outermost radii of the input Gaussian beam, which correspond to the spike. For example, an aperture, such as an iris diaphragm, may be placed upstream (to the left) of the optical component 3' (e.g., group A shown in FIG. 9B). Alternatively, an optional neutral density filter that intersects only the light rays corresponding to the spike and removes only the excess energy may also be utilized.

Figure 11C:
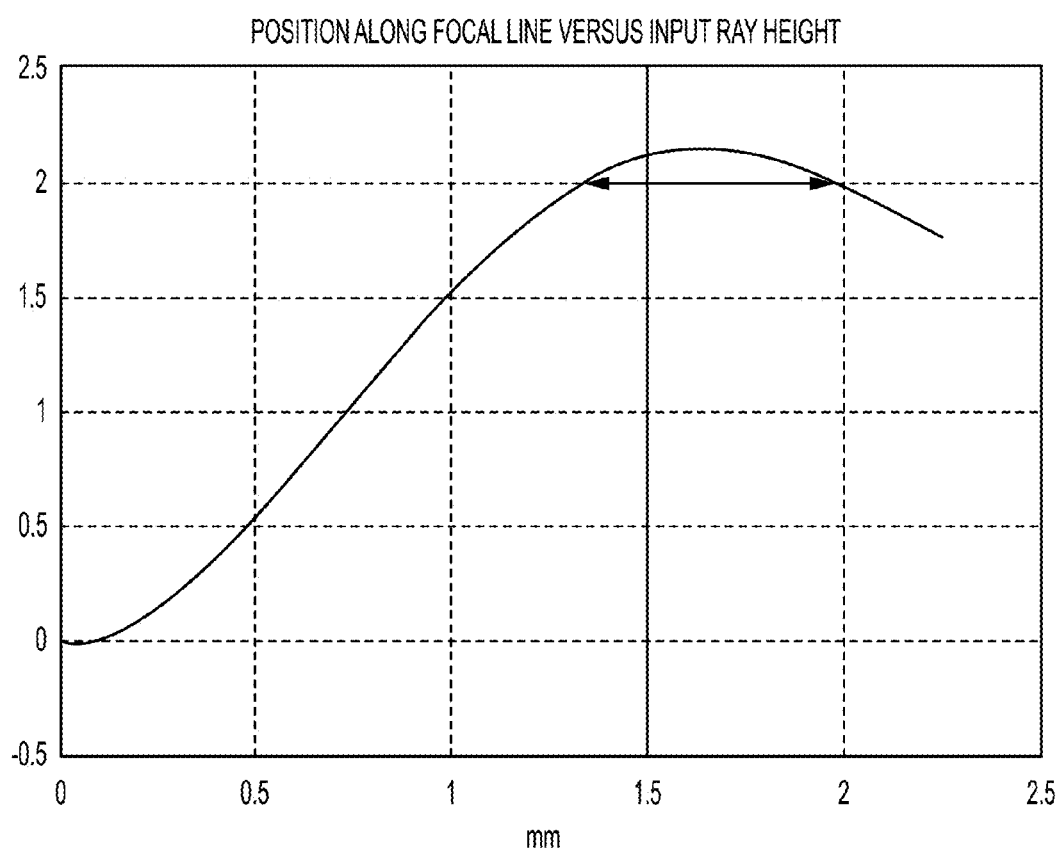
FIG. 11C illustrates input ray heights $h_i$ vs. positions where the rays cross the optical axis when forming the focal line, for the embodiment corresponding to FIGS. 11A and 11B.

It is preferable to minimize or eliminate the spike formed at an end of the focal line by design. In order to understand the source of the spike shown in FIG. 11A, the input ray heights $h_i$ (radius of the ray entering optical component 3') are plotted vs. location where each ray crosses the optical axis (the location z along the focal line 4'), for multiple light rays of the optical beam 2 entering the optical component 3'. This is illustrated in FIG. 11C, in which the horizontal axis depicts incoming ray height $h_i$, and the vertical axis depicts the position where this ray crosses the optical axis. The section corresponding to between 0.5 mm and 1.5 mm on the x-axis has substantially straight slope, indicating rays that are nearly equally distributed in spacing along the optical axis, corresponding to constant energy density However, there exists a top "roll over" portion of the curve, for x-axis location above 1.5 mm, that indicates a higher density of rays striking a small range of locations along the optical axis, corresponding to the spike seen in FIG. 11A.

FIG. 11C illustrates that the rays corresponding to ray height of about 1.5 mm to about 1.75 mm intersect the optical axis closer together which results in an energy spike seen in FIG. 11A. More specifically, the slope of the curve shown in FIG. 11C gives indication on how large each of segments or sub-sections of the focal line are. Around the center of the entrance pupil (h=0) and in the tail of the Gaussian distribution ($h_i$ close to $1/e^2$ radius=1.5 mm), the slope of the mapping curve needs to be kept smaller than in the other regions of the curve, as near h=0 each annulus contains very little area, and at very large radius the input beam has very little intensity. Therefore in those low radius and extremely high radius regions one needs to concentrate light into smaller segments along the optical axis, since the energy integrated over each sub-annulus (rings of radius wi of the optical system's entrance pupil) will be lower. Note this particular design has been optimized only within the input beam corresponding to the beam radius $Rz'=Rz=1/e^2$ of beam intensity=1.5 mm. FIG. 11C also illustrates that curve reaches a maximum which means that the rays of light that strike the entrance pupil between 1.5 mm and about 1.75 mm are imaged at nearly the same location, very close to the end of the focal line. This increases the energy density at that location, explaining the bright peak ("hot spot") at the end of the focal line 4' of FIG. 11A.

It was discovered that there are three different possible solutions for elimination or minimization hot spots or spikes, while maximizing the use of all or most of the beam energy in the focal line 4'. Of course, one can also utilize a combination of these approaches or solutions to improve the quality of the focal line 4'. These solutions are described below:

1) Utilise a diaphragm (iris) to truncate the input beam 2. By utilizing a diaphragm or iris, one can filter out the light outside a given radius, such as the $1/e^2$ points, thus eliminating light that is responsible for creating both the hot spot and the interference fringes, thereby creating the substantially uniform intensity profile.

Figure 12A:
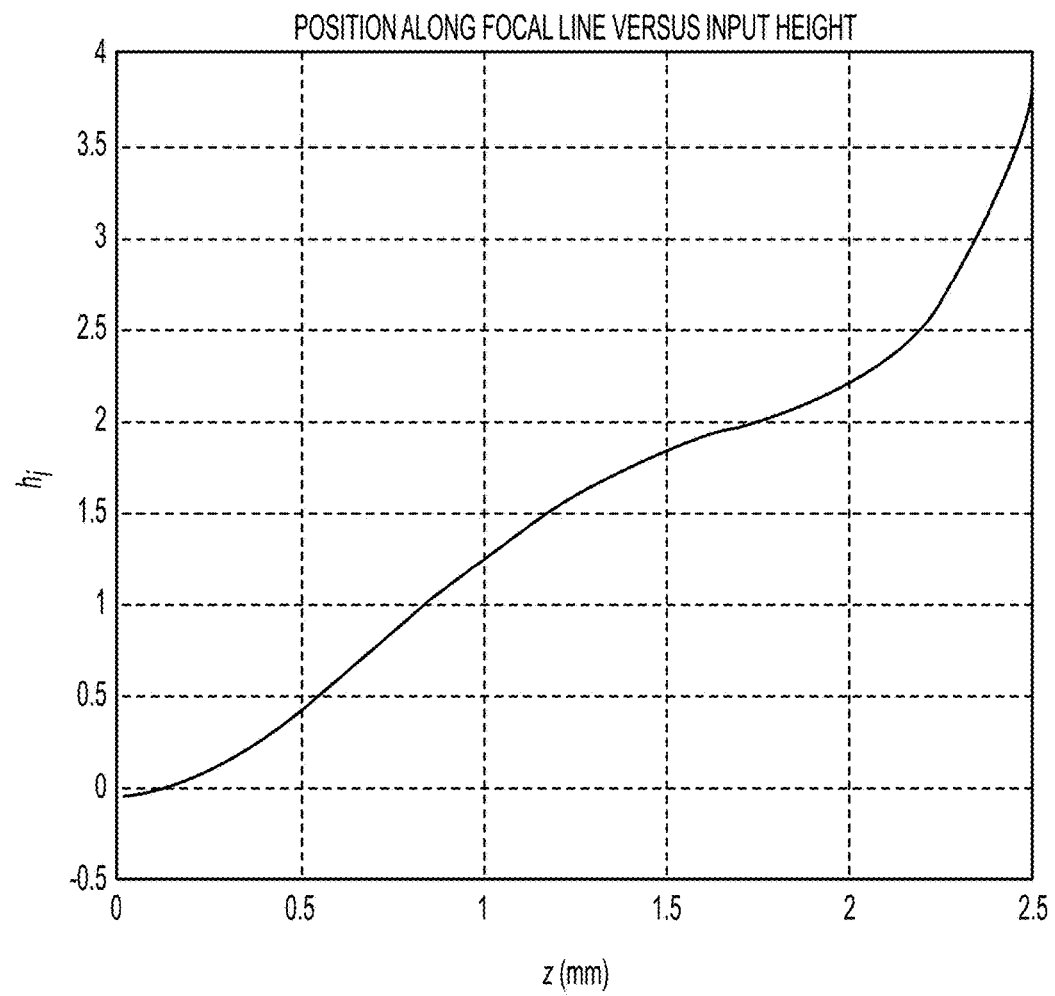
FIG. 12A illustrates input ray heights $h_i$ vs. positions where the rays are crossing the optical axis when forming the focal line, for another embodiment.

2) Design/structure the optical system 125 such that the slope of the optical axis crossing location vs. input ray height curve is always positive. As explained above, the hot spot and interference fringes are due to the fact that the slope in the previous plot had some portions with a negative slope and/or close to zero slope. By structuring the optical system such that the slope is always positive, spikes should be essentially eliminated. The design of such a system can be accomplished by specifying the requirement that slope be positive as one of the merit function requirements in any of the commercially available lens design program that allows the end user to set up the merit function requirements prior to optimisation. FIG. 12A illustrates an example of such slope. As shown in FIG. 12A, in this embodiment of the optical system 125 the ray location ($x_i$) vs. input ray height ($h_i$) is always positive. More specifically, in this embodiment, optical system 125 is structured to satisfy the above two mapping conditions up to the $Rz'=1.2\,R_z$ (i.e., the optical system was designed to provide the satisfy the mapping conditions for the Gaussian beam portion contained within the 1.2 times the $1/e^2$ points, as well as to provide ray heights ($h_i$) such that the slope of the curve positive everywhere within the focal line.

Figure 12B:
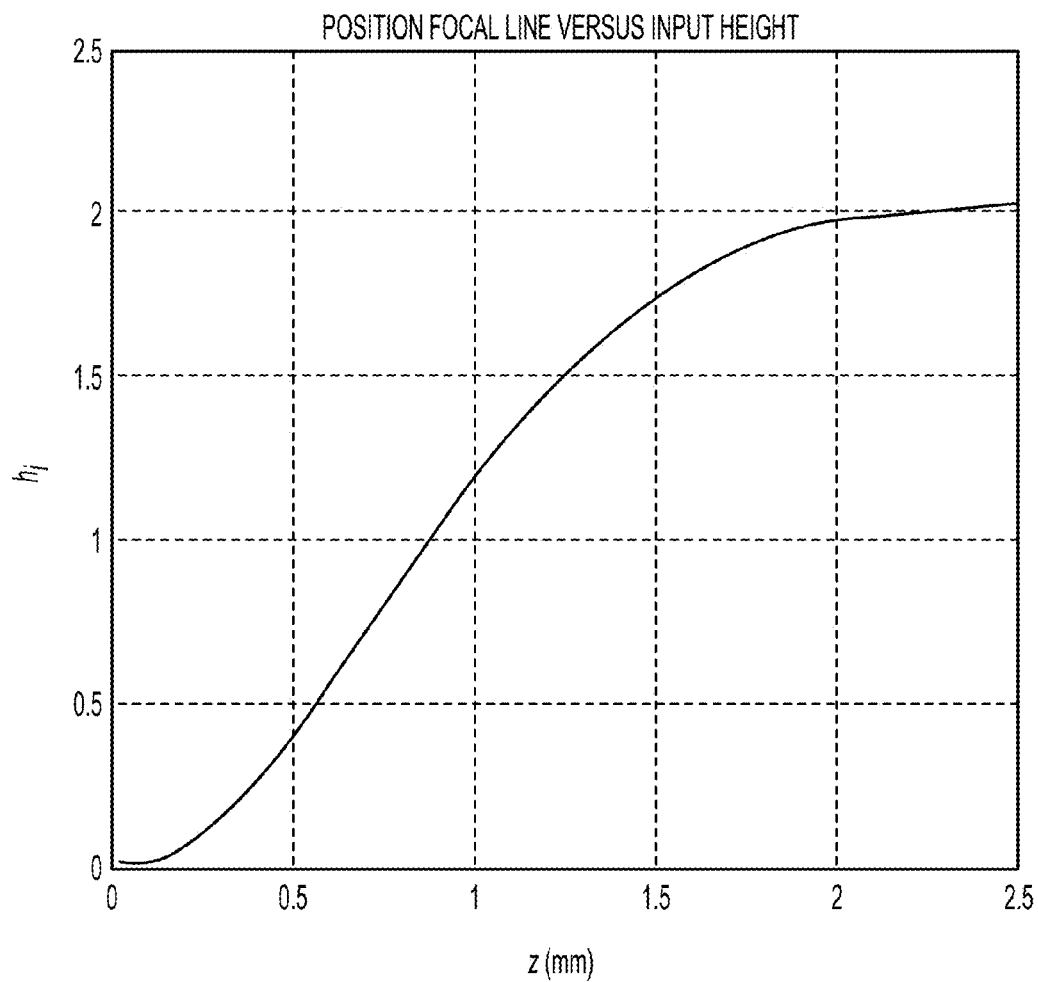
FIG. 12B illustrates input ray heights $h_i$ vs. positions where the rays are crossing the optical axis when forming the focal line, for yet another embodiment.

3) Design the optical system 125 so that conditions 1 and 2 are met over a very large entrance pupil diameter ($D_{EP}=2Rz' \geq 1/e^2$ diameter, and preferably $\geq 1.2$ times $1/e^2$ diameter), so that the optical energy present in the beam 2 that falls outside that diameter is negligible. FIG. 12B illustrates the slope of optical axis crossing location ($x_i$) vs. input ray height ($h_i$) for the embodiment of the optical system 125 that has been designed to work within a diameter of 1.5× the $1/e^2$ diameter. As can be seen from this figure, the embodiment of the optical system 125 corresponding to this figure forms a focal line 4' such that the slope (optical axis crossing location vs. input ray height ($h_i$) gets close to zero but still remains positive enough to avoid hot spots.

Figure 12C:
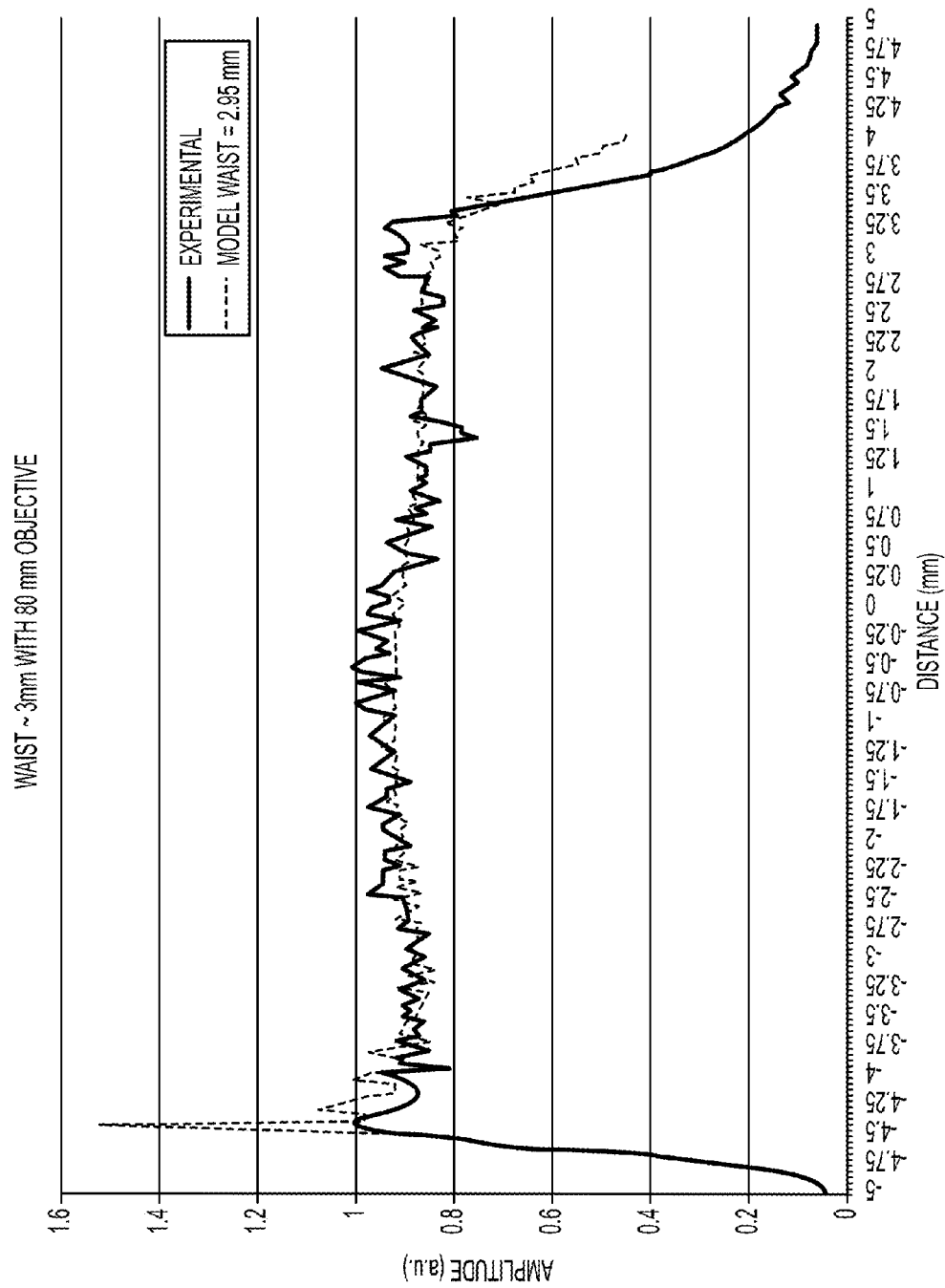
FIG. 12C illustrates modeled and measured peak intensity distributions formed by MGB beam according to one embodiment.

FIG. 12C illustrates modeled as well as measured results obtained from yet another embodiment of the optical system 125. The modeled results are depicted by the light gray curve, the measured results are represented by the dark gray curve. Although the modeled results predicted a presence of a very thin spike at the end of the focal line (much more narrow than the one depicted on the right hand side of in FIG. 11A), this spike was not detected during the measurements of the actual system. Note the left hand side of the modeled curve of FIG. 12C represents the "end" of the focal line (furthest from the optics), and the right hand side represents the beginning of the focal line (closest to the optics). In this embodiment of the optical system 125 the parameter Rz' was chosen to be $1.2R_z$ and optical system 125 was constructed such that the slope of optical axis crossing location vs. incident ray height was kept positive everywhere for the entire focal line 4'.

Figure 13:
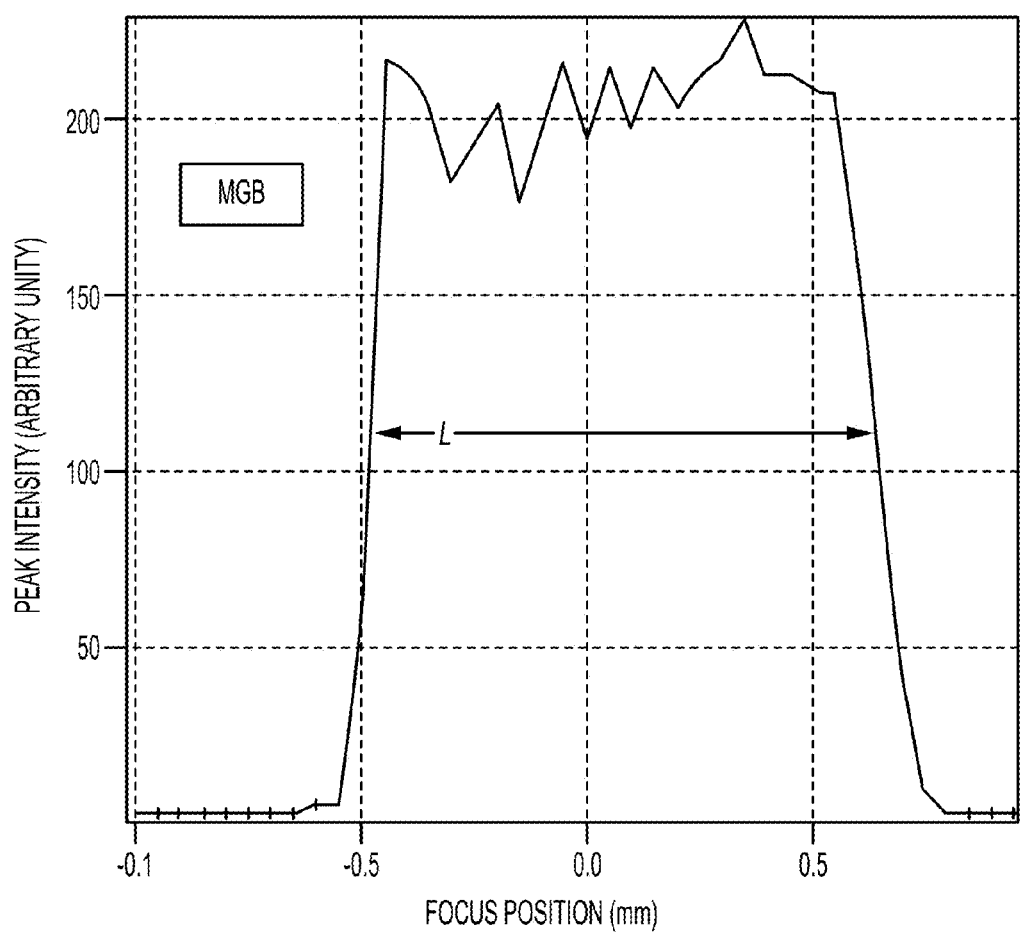
FIG. 13 is a measured peak intensity distribution formed by MGB beam according to one embodiment.

FIG. 13 illustrates the measured results (intensity vs. distance along the optical axis) for yet another embodiment of the optical system 125. In this embodiment Rz' was 1.5 mm, the light wavelength was 1064 nm, and the length L of the formed focal line 4' was about 1.2 mm. As shown in FIG. 13, the variation of peak intensity along the length of the focal line within about 20% of the peak intensity $I_P$, and about ±15% or less from the mean peak intensity. (Mean intensity can be calculated, for example, by taking at least 10 and preferably at least 15 equidistant peak intensity measurements along the length L of the focal line 4', (spread over at least 90% of the focal line length L), and calculating the mean (average) peak intensity.

Figure 14:
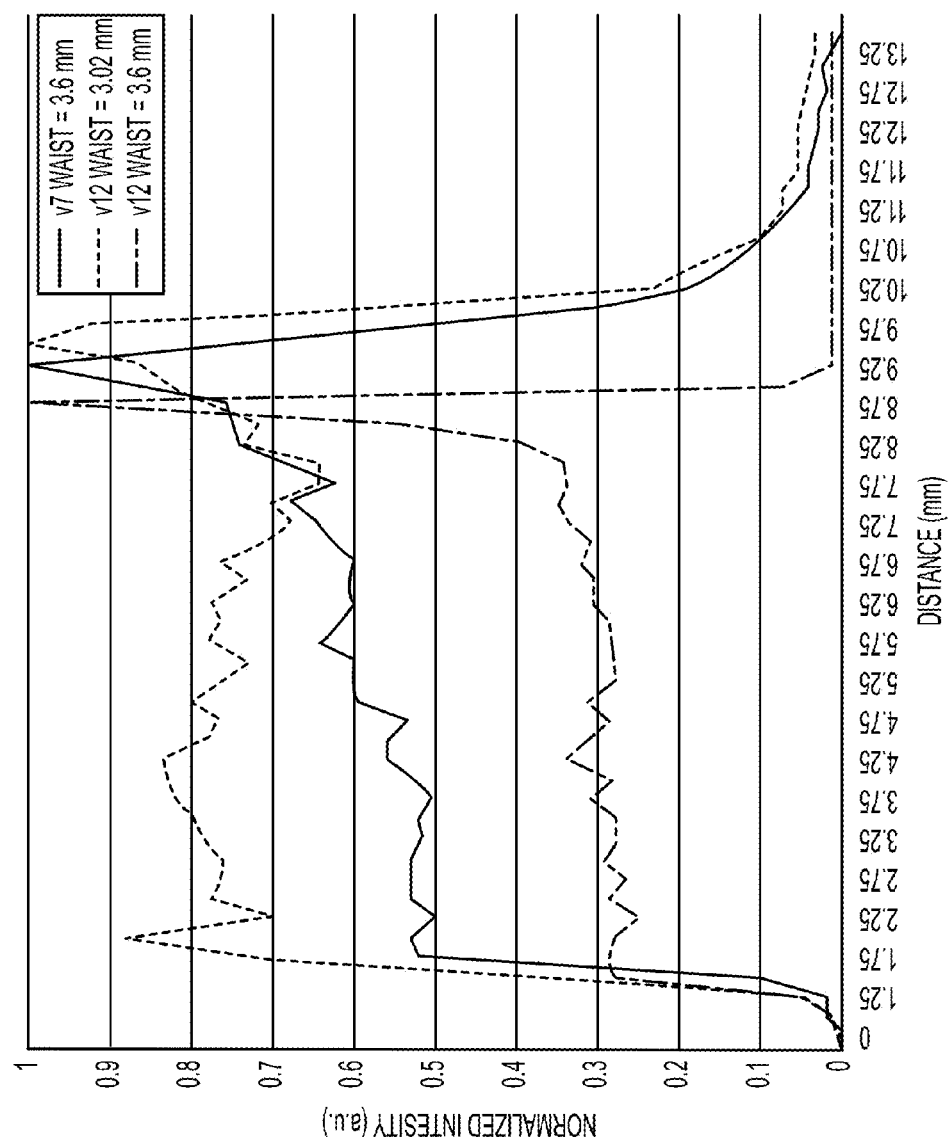
FIG. 14 illustrates normalized peak intensity distribution (with Imax=1) vs. distance along the optical axis for three different sizes of input Gaussian beams used with the same embodiment optical system.

Lastly, it can be desirable to adjust the length of the top-hat beam profile. In general, the length of the focal line created with a Gauss Bessel beam scales with the input beam diameter to the optical component 3'. However, it should be noted that when changing the input beam diameter on the optical component 3', the result will be an uneven power or intensity distribution for the resulting line focus 4', because the optical component 3' as designed to distribute energy based upon a very specific input beam $1/e^2$ diameter, and specific Rz'. That is, optical component 3' should be designed for a specific size of the Gaussian beam coming to the optical system 125. For example, if optical component 3' was designed for a Gaussian beam 2 having $1/e^2$ points at 1.6 mm and the incoming Gaussian beam 2 was changed such that the $1/e^2$ intensity points now correspond to 1.65 mm ($R_z$=1.65 mm) the intensity plot of the focal line 4' will have an intensity spike similar to those shown in FIG. 14. More specifically, FIG. 14 illustrates normalized intensity distribution (with $I_{max}$=1) vs. distance along the optical axis for three different Gaussian beams used with the same embodiment optical system 125. The maximum ray height $h_i$ of the optical system 125 was determined by the clear aperture of the optical component 3' and thus remained the same. The only difference was that the Gaussian beams 2 had slightly different $1/e^2$ points (i.e., slightly different $R_z$), which were different only by a fraction of a millimeter (e.g., $R_z$ was from 1.5 mm to 1.8 mm). As shown in FIG. 14, when the same optical system 125 (FLIMOS) was used with three different Gaussian beams, when the Gaussian beams were changed so that their $1/e^2$ points ($R_z$) was not the $R_z$ of the Gaussian beam that the optical system was designed for, the peak intensities along the focal lines decreased as the difference in $R_z$ increased, and the resultant spike became higher relative to the mean peak intensity of the focal line. Thus the optical system 125 should be designed for to a specific diameter $R_z$ of the incoming Gaussian beam 2.

The length L of the top-hat beam peak intensity profile can be adjusted or changed by redesigning the component 3' to accommodate the Gaussian beam with a different $1/e^2$ diameter (different $R_z$) to avoid the spike formation described above. However, we discovered a more practical solution that enables the optical system to utilize the same optical component 3' and still increases the length of the focal line as need, without creating the spike formation shown in FIG. 14. In addition to the reimaging system 6', an additional reimaging optical system such as a secondary relay telescope (an optical reimaging system similar to that of optical reimaging systems 6 and 6') may be employed to relay the top-hat focal line 4' on a different location, with a different magnification. The telescope magnification M' of the secondary re-imaging system will increase or decrease the diameter D of the focal line 4 formed by the optical component 3' by the factor M', and the length of the focal line 4 by an additional factor of $M'^2$. But, unlike in the case of varying the input beam $1/e^2$ diameter, the top-hat energy distribution now will only be scaled, not distorted, a solution that can create many different focal line lengths while utilizing the same optical component 3'. For example such a relay telescope can be fabricated by placing two lenses 6a', 6b' of focal length F3 and F4 a distance of F3+F4 apart, achieving a magnification M' of F4/F3. Typical length L of focal line 4' is, for example, 275 µm to 100 mm. The diameter D of the focal line 4' may be, for example, 0.3 µm to 5 µm, such as 0.5 µm to 4 µm, or 1 µm to 2.5 µm, or 0.3 µm to 3 µm, or 0.3 µm to 4 µm.

Figure 15A:
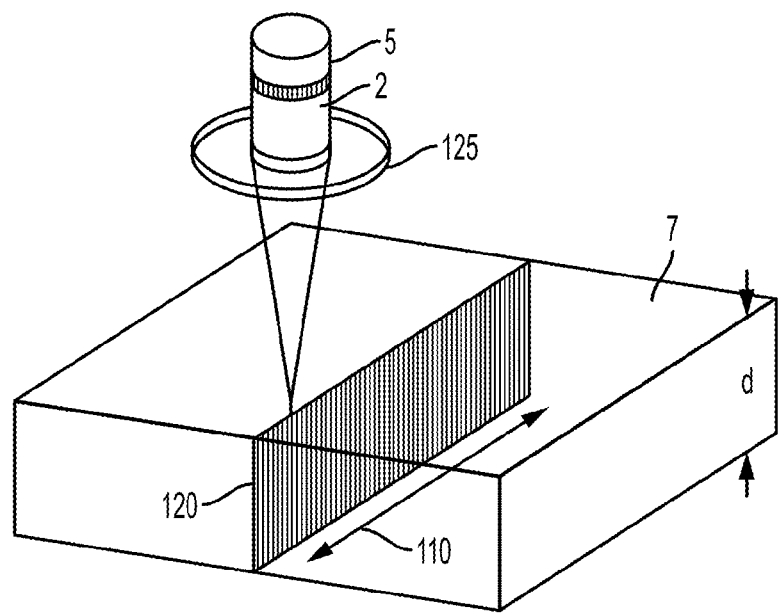
FIGS. 15A-15B are illustrations of a fault line (or perforated line) with equally spaced defect lines or damage tracks of modified glass.
Figure 15B:
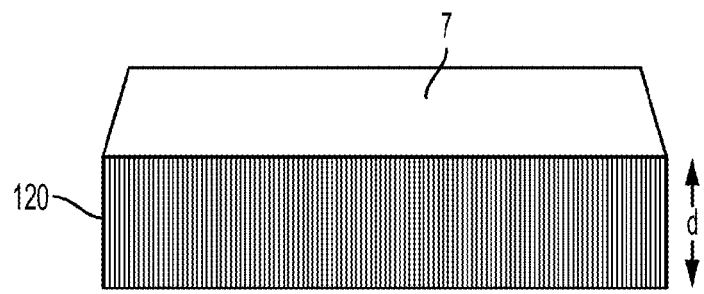

As illustrated in FIGS. 15A-15B, the method to cut and separate transparent materials, and more specifically glass compositions, is essentially based on creating a fault line 110 formed of a plurality of vertical defect lines 120 in the material 130 of the workpiece 7 to be processed with a focal line 4' created by the optical system 125 (FLIMOS) used in conjunction with an ultra-short pulsed laser 5. The defect lines 120 extend, for example, through the thickness of the glass sheet, and are orthogonal to the major (flat) surfaces 7a, 7b of the glass sheet. "Fault lines" 110 are also referred to as "contours" herein. While fault lines or contours can be linear, like the fault line 110 illustrated in FIG. 15A, the fault lines or contours 110 can also be nonlinear, having a curvature. Curved fault lines or contours can be produced by translating either the workpiece 7 or focal line 4' with respect to the other in two dimensions instead of one dimension, for example. Depending on the material properties (absorption, CTE, stress, composition, etc.) and laser parameters chosen for processing the material 130 of the workpiece 7, the creation of a fault line 110 alone can be enough to induce self-separation. In this case, no secondary separation processes, such as tension/bending forces or thermal stress created for example by a $CO_2$ laser, are necessary. As illustrated in FIG. 15A, a plurality of defect lines can define a contour. The separated edge or surface with the defect lines is defined by the contour. The induced absorption creating the defect lines can produce particles on the separated edge or surface with an average diameter of less than 3 microns (e.g., 0.3 to 2 microns), resulting in a very clean cutting process.

In some cases, the created fault line is not enough to separate the material spontaneously, and a secondary step may be necessary. In such a case, for example, second laser can be used to create thermal stress to separate glass along the contour. In the case of some glass compositions, separation can be achieved, after the creation of a fault line, by application of mechanical force or by using a thermal source (e.g., an infrared laser, for example a CO or $CO_2$ laser) to create thermal stress and force separation of the material. Another option is to have the $CO_2$ laser only start the separation and then finish the separation manually. The optional $CO_2$ laser separation is achieved, for example, with a defocused continuous wave (CW) laser emitting at 10.6 microns and with power adjusted by controlling its duty cycle. Focus change (i.e., extent of defocusing up to and including focused spot size) is used to vary the induced thermal stress by varying the spot size. Defocused laser beams include those laser beams that produce a spot size larger than a minimum, diffraction-limited spot size on the order of the size of the laser wavelength. For example, $CO_2$ laser spot sizes of 1 to 20 mm, for example 1 to 12 mm, 3 to 8 mm, or about 7 mm, 2 mm, and 20 mm can be used for $CO_2$ lasers, for example, with a $CO_2$ 10.6 µm wavelength laser. Other lasers, whose emission wavelength is also absorbed by the glass, may also be used, such as lasers with wavelengths emitting in the 9-11 micron range, for example. In such cases $CO_2$ laser with power levels between 100 and 400 Watts may be used, and the beam may be scanned at speeds of 50-500 mm/sec along or adjacent to the defect lines, which creates sufficient thermal stress to induce separation. The exact power levels, spot sizes, and scanning speeds chosen within the specified ranges may depend on the material use, its thickness, coefficient of thermal expansion (CTE), elastic modulus, since all of these factors influence the amount of thermal stress imparted by a specific rate of energy deposition at a given spatial location. If the spot size is too small (i.e. <1 mm), or the $CO_2$ laser power is too high (>400 W), or the scanning speed is too slow (less than 10 mm/sec), the glass may be over heated, creating ablation, melting or thermally generated cracks in the glass, which are undesirable, as they will reduce the edge strength of the separated parts. Preferably the $CO_2$ laser beam scanning speed is >50 mm/sec, in order to induce efficient and reliable part separation. However, if the spot size created by the $CO_2$ laser is too large (>20 mm), or the laser power is too low (<10 W, or in some cases <30 W), or the scanning speed is too high (>500 mm/sec), insufficient heating occurs which results in too low a thermal stress to induce reliable part separation.

For example, in some embodiments, a $CO_2$ laser power of 200 Watts may be used, with a spot diameter at the glass surface of approximately 6 mm, and a scanning speed of 250 mm/sec to induce part separation for 0.7 mm thick Corning Eagle XG® glass that has been perforated with the above mentioned psec laser. Separation along the perforated line will occur very quickly (less than 1 second) after $CO_2$ spot passes a given location, for example within 100 milliseconds, within 50 milliseconds, or within 25 milliseconds.

Distance, or periodicity, between adjacent defect lines 120 along the direction of the fault lines 110 can be greater than 0.1 micron and less than or equal to about 20 microns in some embodiments, for example. For example, in some embodiments, the periodicity between adjacent defect lines 120 may be between 0.5 and 15 microns, or between 3 and 10 microns, or between 0.5 micron and 3.0 microns. For example, in some embodiments the periodicity between adjacent defect lines 120 can be between 0.5 micron and 1.0 micron.

Different types of lasers 5 (picosecond, femtosecond, etc.) and different wavelengths (IR, visible (e.g., green, blue, etc.), UV, etc.) can also be utilized, as long as sufficient optical intensities are reached to create breakdown of the substrate material in the region of focus to create breakdown of the substrate material or glass workpiece, through nonlinear optical effects. Preferably, the laser is a pulse burst laser which allows for control of the energy deposition with time by adjusting the number of pulses within a given burst.

In some embodiments, an ultra-short pulsed laser source 5 is used to create a focal line 4' with high uniformity of peak intensity via optical system 125. One version of this concept is to use a modified axicon lens component 3' in an optical lens system 125 (FLIMOS) to create a region of high aspect ratio, taper-free microchannels using ultra-short (picoseconds or femtosecond duration) laser beams 2'. According to other embodiments a modified waxicon, a modified inverted axicon, or another aspheric component that is designed/structured to satisfy the condition 1 described above can also be utilized. The modified axicon 3' or a similar optical component 3' condenses the laser beam into the focal line 4'—i.e., high intensity region of cylindrical shape and high aspect ratio (long length and small diameter) that also has substantially uniform intensity distribution as described above. Due to the high intensity created with the condensed laser beam, nonlinear interaction of the electromagnetic field of the laser and the substrate material occurs and the laser energy is transferred to the workpiece 7 to effect formation of defects that become constituents of the fault line.

Figure 16:
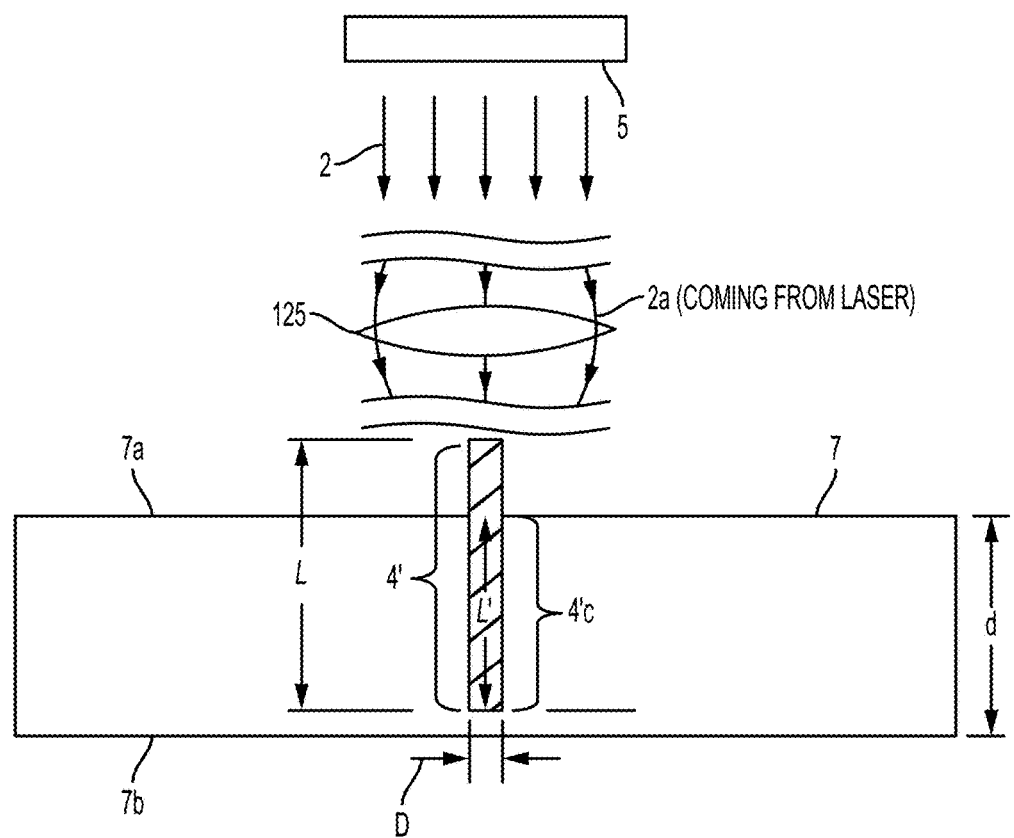
FIG. 16 is a schematic illustration of processing of a material via induced absorption along the focal line formed by the optical system according to some embodiments described herein.

Turning to FIG. 16, a method of laser processing a material includes focusing a pulsed laser beam 2 into a laser beam focal line 4' oriented along the beam propagation direction. As shown in FIG. 16, laser 5 (not shown) emits laser beam 2, which has a portion 2a incident to the optical system 125 (also referred to as an optical assembly herein). The optical system 125 turns the incident laser beam 2 into an extensive laser beam focal line 4' on the output side over a defined expansion range along the beam direction (length L of the focal line). In this exemplary embodiment the planar substrate 7 is positioned in the beam path to at least partially overlap the laser beam focal line 4' of laser beam 2. The laser beam focal line is thus directed into the substrate. Reference 7a designates the surface of the planar substrate facing the optical assembly 125 or the laser, respectively, and reference 7b designates the reverse surface of substrate 7. The substrate or workpiece thickness d (in this embodiment measured perpendicularly to the planes 7a and 7b, i.e., to the substrate plane). The substrate or workpiece can also be referred to as a material and can be a glass article that is substantially transparent to the wavelength of the laser beam 2, for example.

As FIG. 16 depicts, substrate 7 (or the glass composite workpiece) is aligned perpendicular to the longitudinal beam axis and thus behind the same focal line 4' produced by the optical assembly 125 (the substrate is perpendicular to the plane of the drawing). The focal line being oriented or aligned along the beam direction, the substrate is positioned relative to the focal line 4' in such a way that the focal line 4' starts before the surface 7a of the substrate and stops before at or after the surface 7b of the substrate. In the embodiment shown in FIG. 16 the focal line 4' terminates within the substrate and does not extend beyond surface 7b.

Note it is also possible for the substrate or glass piece to be presented at a non-perpendicular angle to the longitudinal beam axis, such as at 5 degrees, or 15 degrees. However, as the angle of the substrate relative to the longitudinal beam axis grows, such as to angles >15 degrees, or in particular to angles >20 deg, increasing aberrations are introduced into the beam, resulting in a degraded focal line and less of an ability to modify the substrate. The exact angle at which too much degradation occurs to prohibit cutting or drilling is dependent on the numerical aperture of the final focusing lens, the amount of laser pulse power available, the composition of the substrate, and the thickness of the substrate.

Furthermore, the length L of the focal line 4' can be adjusted in such a way that it exceeds the substrate thickness d (e.g., by a factor of 2, 3, etc.). If substrate 7 is placed (viewed in longitudinal beam direction) centrally to focal line 4', the induced absorption is generated over the entire substrate thickness. The laser beam focal line 4' can have a length L in a range of between about 0.01 mm and about 100 mm or in a range of between about 0.1 mm and about 10 mm, or in the range of 0.5 mm to 10 mm, for example. Various embodiments can be configured to have length L of about 0.1 mm, 0.2 mm, 0.3 mm, 0.4 mm, 0.5 mm to 5 mm, e.g., 0.5 mm, 0.7 mm, 1 mm, 2 mm, 3 mm, 4 mm, 5 mm, or 10 mm for example. In some embodiments length L is 0.275 mm to 50 mm, in some embodiments length L is 0.3 mm to 50 mm, and in some embodiment 0.3 mm to 100 mm, and in some embodiments 0.5 mm to 100 mm, or 0.7 mm to 100 mm.

In the overlapping area of the laser beam focal line 4' with substrate 7, i.e. in the substrate material covered by focal line 4', the extensive laser beam focal line 4' generates an extensive section 4'c (aligned along the longitudinal beam direction) along which an induced absorption is generated in the substrate material. The induced absorption produces defect line formation in the substrate material along section 4'c. The defect line is a microscopic (e.g., >100 nm and <5 micron in diameter) elongated "hole" (also called a perforation or a defect line) in a substantially transparent material, substrate, or workpiece generated by using a single high energy burst of multiple laser pulses. Individual perforations can be created at rates of several hundred kilohertz (several hundred thousand perforations per second), for example. With relative motion between the source and the material, these perforations can be placed adjacent to one another (spatial separation varying from sub-micron to many microns as desired). This spatial separation (pitch) can be selected to facilitate separation of the material or workpiece. In some embodiments, the defect line is a "through hole", which is a hole or an open channel that extends from the top to the bottom of the substantially transparent material. The defect line formation is not only local, but over the entire length of the extensive section 4'c of the induced absorption. The length of section 4'c (which corresponds to the length of the overlapping of laser beam focal line 4' with substrate 7) is labeled with reference L'. The average diameter or extent of the section of the induced absorption 4'c basically corresponds to the average diameter D of the laser beam focal line 4', that is, an average spot diameter in a range of between about 0.1 micron and about 5 microns.

As FIG. 16 shows, the substrate material (which is transparent to the wavelength λ of laser beam 2) is heated due to the induced absorption along the focal line 4' arising from the nonlinear effects associated with the high intensity of the laser beam within focal line 4'. The heated substrate material will eventually expand so that a corresponding induced tension leads to micro-crack formation.

The selection of a laser source 3 is predicated on the ability to create multi-photon absorption (MPA) in transparent materials. MPA is the simultaneous absorption of two or more photons of identical or different frequencies in order to excite a molecule from one state (usually the ground state) to a higher energy electronic state (ionization). The energy difference between the involved lower and upper states of the molecule can be equal to the sum of the energies of the two photons. MPA, also called induced absorption, can be a second-order or third-order process, or higher-order process, for example, that is several orders of magnitude weaker than linear absorption. MPA differs from linear absorption in that the strength of induced absorption can be proportional to the square or cube (or higher power law) of the light intensity, for example, instead of being proportional to the light intensity itself. Thus, MPA is a nonlinear optical process.

To ensure high quality (regarding breaking strength, geometric precision, roughness and avoidance of re-machining requirements) of the surface of the separated part along which separation occurs, the individual focal lines positioned on the substrate surface along the line of separation should be generated using the optical assembly described below (hereinafter, the optical assembly is alternatively also referred to as laser optics). The roughness of the separated surface (or cut edge), results particularly from the spot size or the spot diameter of the focal line. A roughness of the separated (cut) surface which can be, for example, 0.25 to 1 microns, can be characterized, for example, by an Ra surface roughness statistic (roughness arithmetic average of absolute values of the heights of the sampled surface, which include the heights of bumps resulting from the spot diameter of the focal line). In order to achieve a small spot size of, for example, 0.5 micron to 2 microns in case of a given wavelength λ of laser 5 (interaction with the material of substrate 1), certain requirements must usually be imposed on the numerical aperture of optical assembly 125.

The spot size should not vary too strongly for the purpose of a uniform interaction of the optical beam with the workpiece (e.g., glass substrate) along the focal line 4'. This can, for example, be ensured by keeping the diameter D substantially constant, as described above. Thus, preferably, the laser beam should illuminate the optical system 125 up to the required aperture that corresponds to the beam radius Rz' described above.

Figure 17A:
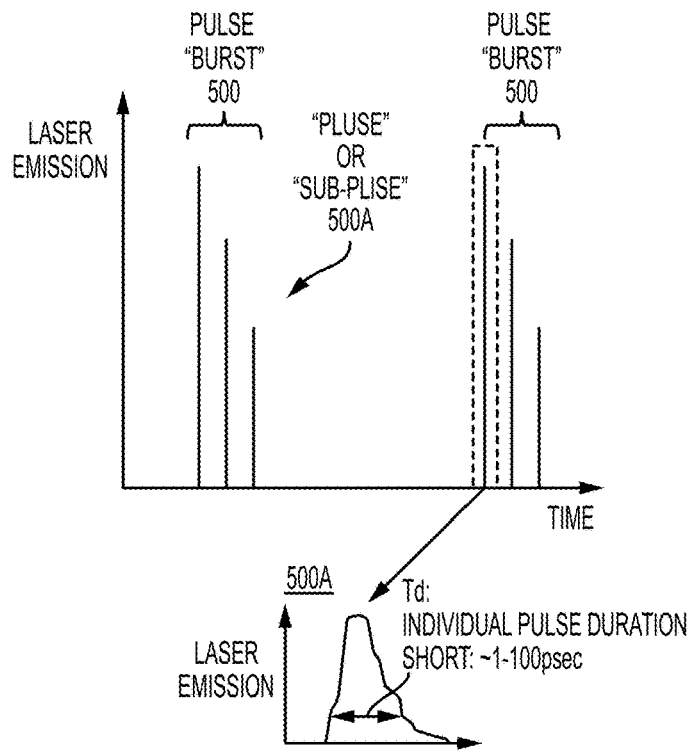
FIGS. 17a and 17B illustrate pulse bursts and multiple pulses within a pulse burst.
Figure 17B:
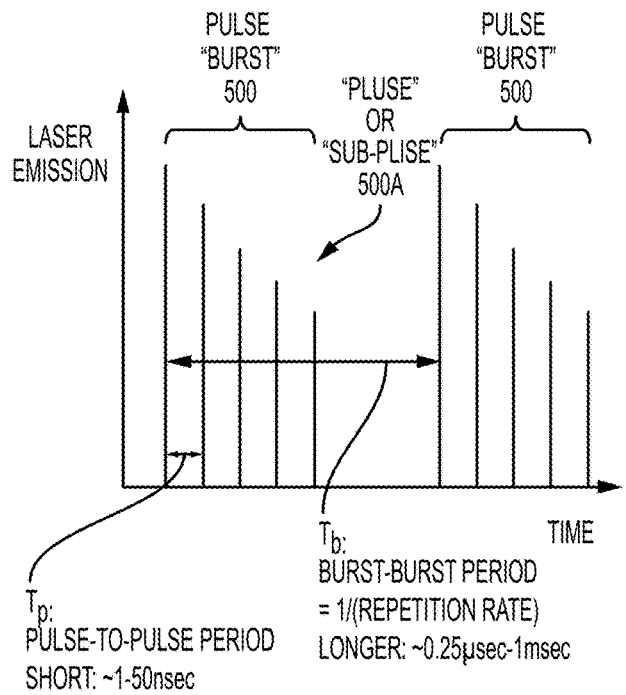

Note that typical operation of such a picosecond laser described herein creates a "burst" 500 of pulses 500A. (See, for example, FIGS. 17A and 17B) Each "burst" (also referred to herein as a "pulse burst" 500) contains multiple individual pulses 500A (such as at least 2 pulses, at least 3 pulses, at least 4 pulses, at least 5 pulses, at least 10 pulses, at least 15 pulses, at least 20 pulses, or more) of very short duration. That is, a pulse burst is a "pocket" of pulses, and the bursts are separated from one another by a longer duration than the separation of individual adjacent pulses within each burst. Pulses 500A have pulse duration $T_d$ of up to 100 psec (for example, 0.1 psec, 5 psec, 10 psec, 15 psec, 18 psec, 20 psec, 22 psec, 25 psec, 30 psec, 50 psec, 75 psec, or therebetween). The energy or intensity of each individual pulse 500A within the burst may not be equal to that of other pulses within the burst, and the intensity distribution of the multiple pulses within a burst 500 often follows an exponential decay in time governed by the laser design. Preferably, each pulse 500A within the burst 500 of the exemplary embodiments described herein is separated in time from the subsequent pulse in the burst by a duration $T_p$ from 1 nsec to 50 nsec (e.g. 10-50 nsec, or 10-30 nsec, with the time often governed by the laser cavity design). For a given laser, the time separation $T_p$ between adjacent pulses (pulse-to-pulse separation) within a burst 500 is relatively uniform (±10%). For example, in some embodiments, each pulse within a burst is separated in time from the subsequent pulse by approximately 20 nsec (50 MHz). For example, for a laser that produces pulse separation $T_p$ of about 20 nsec, the pulse to pulse separation $T_p$ within a burst is maintained within about ±10%, or about ±2 nsec. The time between each "burst" of pulses (i.e., time separation $T_b$ between bursts) will be much longer (e.g., $0.25 \leq T_b \leq 1000$ microseconds, for example 1-10 microseconds, or 3-8 microseconds). In some of the exemplary embodiments of the laser described herein the time separation $T_b$ is around 5 microseconds for a laser with burst repetition rate or frequency of about 200 kHz. The laser burst repetition rate is relates to the time $T_b$ between the first pulse in a burst to the first pulse in the subsequent burst (laser burst repetition rate=$1/T_b$). In some embodiments, the laser burst repetition frequency may be in a range of between about 1 kHz and about 4 MHz. More preferably, the laser burst repetition rates can be, for example, in a range of between about 10 kHz and 650 kHz. The time $T_b$ between the first pulse in each burst to the first pulse in the subsequent burst may be 0.25 microsecond (4 MHz burst repetition rate) to 1000 microseconds (1 kHz burst repetition rate), for example 0.5 microseconds (2 MHz burst repetition rate) to 40 microseconds (25 kHz burst repetition rate), or 2 microseconds (500 kHz burst repetition rate) to 20 microseconds (50 k Hz burst repetition rate). The exact timings, pulse durations, and burst repetition rates can vary depending on the laser design, but short pulses ($T_d$<20 psec and preferably $T_d$≤15 psec) of high intensity have been shown to work particularly well.

The energy required to modify the material can be described in terms of the burst energy—the energy contained within a burst (each burst 500 contains a series of pulses 500A), or in terms of the energy contained within a single laser pulse (many of which may comprise a burst). For these applications, the energy per burst can be from 25-750 µJ, more preferably 50-500 µJ, or 50-250 µJ. In some embodiments the energy per burst is 100-250 µJ. The energy of an individual pulse within the pulse burst will be less, and the exact individual laser pulse energy will depend on the number of pulses 500A within the pulse burst 500 and the rate of decay (e.g., exponential decay rate) of the laser pulses with time. For example, for a constant energy/burst, if a pulse burst contains 10 individual laser pulses 500A, then each individual laser pulse 500A will contain less energy than if the same pulse burst 500 had only 2 individual laser pulses.

The use of a laser capable of generating such pulse bursts is advantageous for cutting or modifying transparent materials, for example glass. In contrast with the use of single pulses spaced apart in time by the repetition rate of the single-pulsed laser, the use of a pulse burst sequence that spreads the laser energy over a rapid sequence of pulses within the burst 500 allows access to larger timescales of high intensity interaction with the material than is possible with single-pulse lasers. While a single-pulse can be expanded in time, as this is done the intensity within the pulse must drop as roughly one over the pulse width. Hence if a 10 psec single pulse is expanded to a 10 nsec pulse, the intensity drop by roughly three orders of magnitude. Such a reduction can reduce the optical intensity to the point where non-linear absorption is no longer significant, and light material interaction is no longer strong enough to allow for cutting. In contrast, with a pulse burst laser, the intensity during each pulse 500A within the burst 500 can remain very high—for example three 10 psec pulses 500A spaced apart in time by approximately 10 nsec still allows the intensity within each pulse to be approximately three times higher than that of a single 10 psec pulse, while the laser is allowed to interact with the material over a timescale that is now three orders of magnitude larger. This adjustment of multiple pulses 500A within a burst thus allows manipulation of time-scale of the laser-material interaction in ways that can facilitate greater or lesser light interaction with a pre-existing plasma plume, greater or lesser light-material interaction with atoms and molecules that have been pre-excited by an initial or previous laser pulse, and greater or lesser heating effects within the material that can promote the controlled growth of microcracks. The required amount of burst energy to modify the material will depend on the substrate material composition and the length of the focal line used to interact with the substrate. The longer the interaction region, the more the energy is spread out, and higher burst energy will be required. The exact timings, pulse durations, and burst repetition rates can vary depending on the laser design, but short pulses (<15 psec, or ≤10 psec) of high intensity have been shown to work well with this technique. A defect line or a hole is formed in the material when a single burst of pulses strikes essentially the same location on the glass. That is, multiple laser pulses within a single burst correspond to a single defect line or a hole location in the glass. Of course, since the glass is translated (for example by a constantly moving stage) (or the beam is moved relative to the glass, the individual pulses within the burst cannot be at exactly the same spatial location on the glass. However, they are well within 1 µm of one another—i. e., they strike the glass at essentially the same location. For example, they may strike the glass at a spacing, sp, from one another where 0<sp≤500 nm. For example, when a glass location is hit with a burst of 20 pulses the individual pulses within the burst strike the glass within 250 nm of each other. Thus, in some embodiments 1 nm<sp<250 nm. In some embodiments 1 nm<sp<100 nm.

If the substrate (workpiece 7) has sufficient stress (e.g., with ion exchanged glass), then the part will spontaneously crack and separate along the path of perforated damage traced out by the laser process. However, if there is not a lot of stress inherent to the substrate (as is the case of Corning Eagle XG® compositions), then the picosecond laser will simply form damage tracks in the workpiece. These damage tracks generally take the form of holes with interior dimensions of about 0.1-1.5 microns, or 0.2 microns to 2 microns (for example, in some embodiments, 0.2 to 0.7 microns, or 0.3 to 0.6 microns). Preferably the holes are very small (single microns or less) in dimension.

The holes or defect lines can perforate the entire thickness of the material, and may or may not be a continuous opening throughout the depth of the material.

It is also possible to perforate stacked sheets of glass. In this case, the focal line length needs to be longer than the stack height.

In general, the higher the available laser power, the faster the material can be cut with the above process. Processes disclosed herein can cut glass at a cutting/perforation speed of 0.4 m/sec, or faster. A cutting/perforation speed is the rate the laser beam moves relative to the surface of the transparent material (e.g., glass) while creating multiple holes or modified regions.) High cutting/perforation speeds, such as, for example 400 mm/sec, 500 mm/sec, 750 mm/sec, 1 m/sec, 1.2 m/sec, 1.5 m/sec, or 2 m/sec, or even 3.4 m/sec to 4 m/sec are often desired in order to minimize capital investment for manufacturing, and to optimize equipment utilization rate. The laser power is equal to the burst energy multiplied by the burst repetition frequency (rate) of the laser. In general, to cut such glass materials at high cutting speeds, the damage tracks are typically spaced apart by 1-25 microns, in some embodiments the spacing is preferably 3 microns or larger—for example 3-12 microns, or for example 5-10 microns.

For example in order to achieve a 0.4 m/sec cutting/perforation speed at 4 µm pitch (defect lines pacing, or between damage tracks spacing) and 100 µJ/burst one would require at least a 10 Watt laser, and to achieve a 0.5 m/sec cut speed at 4 µm pitch and 100 µJ/burst one would require at least a 12 Watt laser. For example, to achieve a cutting/perforation speed of 1 m/sec at 3 µm pitch and 40 µJ/burst one would require at least a 13 Watt laser. Also for example 1 m/sec cut speed at 4 µm pitch and 400 µJ/burst would require at least a 100 Watt laser. The optimal pitch between damage tracks and the exact burst energy is material dependent, and can be determined empirically. However, it should be noted that raising the laser pulse energy or making the damage tracks at a closer pitch are not conditions that always make the substrate material separate better or with improved edge quality. Too dense a pitch (for example <0.1 micron, in some exemplary embodiments <1 µm, or in some embodiments <2 µm) between damage tracks can sometimes inhibit the formation of nearby subsequent damage tracks, and often can inhibit the separation of the material around the perforated contour, and may also result in increased unwanted micro cracking within the glass. Too long a pitch (>50 µm, and in some glasses >25 µm or even >20 µm) may result in "uncontrolled microcracking"—i.e., where instead of propagating from hole to hole the microcracks propagate along a different path, and cause the glass to crack in a different (undesirable) direction. This may ultimately lower the strength of the separated glass part, since the residual microcracks will acts as flaws which weaken the glass. Too high a burst energy (e.g., >2500 µJ/burst, and in some embodiments >500 µJ/burst) used to form each damage track can cause "healing" or re-melting of already formed microcracks of adjacent damage tracks, which will inhibit separation of the glass. Accordingly, it is preferred that burst energy be <2500 µJ/burst, for example, ≤500 µJ/burst. Also, using a burst energy that is too high can cause formation of microcracks that are extremely large and create flaws which reduce the edge strength of the parts after separation. Too low a burst energy (<40 µJ/burst) may result in no appreciable damage track formed within the glass, and hence very high separation strength or complete inability to separate along the perforated contour.

Typical exemplary cutting/perforation speeds enabled by this process are, for example, 0.4 msec and higher. In some embodiments described herein the cutting rates are 500 mm/sec to 2000 mm/sec, or even higher (e.g., 2 m/s-5 m/s). In some embodiments the picosecond (ps) laser utilizes pulse bursts to produce defect lines with periodicity between 0.5 microns and 13 microns, e.g. 0.5 and 3 microns. In some embodiments the pulsed laser has laser power of 10 W-100 W and the material and/or the laser beam are translated relative to one another at a rate of at least 0.25 msec, for example at the rate of 0.25 to 0.35 msec, or 0.4 msec to 5 msec. Preferably, each pulse burst of the pulsed laser beam has an average laser energy measured at the workpiece greater than 40 microJoules per burst mm thickness of workpiece. Preferably, each pulse burst of the pulsed laser beam has an average laser energy measured at the workpiece greater of less than 2500 microJoules per burst per mm thickness of workpiece, and preferably lass than about 2000 microJoules per burst per mm, and in some embodiments less than 1500 microJoules per burst per mm thickness of workpiece, for example not more than 500 microJoules per burst per mm thickness of workpiece.

Accordingly, it is preferable that the laser produces pulse bursts with at least 2 pulses per burst. For example, in some embodiments the pulsed laser has laser power of 10 W-150 W (e.g., 10-100 W) and produces pulse bursts with at least 2 pulses per burst (e.g., 2-25 pulses per burst). In some embodiments the pulsed laser has the power of 25 W-60 W, and produces pulse bursts with at least 2-25 pulses per burst, and periodicity or distance between the adjacent defect lines produced by the laser bursts is 2-10 microns. In some embodiments the pulsed laser has laser power of 10 W-100 W, produces pulse bursts with at least 2 pulses per burst, and the workpiece and the laser beam are translated relative to one another at a rate of at least 0.25 msec. In some embodiments the workpiece and/or the laser beam are translated relative to one another at a rate of at least 0.4 msec.

The work pieces may be, for example, 100 µm thick or thicker, for example, 0.2 mm to 10 mm. It is also possible to perforate stacked sheets of glass. In this case, the focal line length L needs to be longer than the stack height.

The lateral spacing (pitch) between the holes or defect lines is determined by the pulse rate of the laser as the substrate is translated underneath the focused laser beam. Only a single picosecond laser pulse burst is usually necessary to form an entire hole, but multiple bursts may be used if desired. To form holes at different pitches, the laser can be triggered to fire at longer or shorter intervals. For cutting operations, the laser triggering generally is synchronized with the stage driven motion of the workpiece beneath the beam, so laser pulse bursts are triggered at a fixed spacing, such as for example every 1 micron, or every 5 microns. Distance, or periodicity, between adjacent perforations or defect lines along the direction of the fault line can be greater than 0.1 micron and less than or equal to about 20 microns in some embodiments, for example. For example, the spacing or periodicity between adjacent perforations or defect lines is between 0.5 and 15 microns, or between 3 and 10 microns, or between 0.5 micron and 3.0 microns. For example, in some embodiments the periodicity can be between 0.5 micron and 1.0 micron.

According to some embodiments, a method of laser processing a glass workpiece 7, comprises:
(i) focusing a pulsed laser beam 2' into a laser beam focal line 4' oriented along the beam propagation direction and directed into the glass workpiece 7, the laser beam focal line 4' generating an induced absorption within the material, and the induced absorption producing a defect line 120 along the laser beam focal line 4' within the workpiece 7, wherein the focal line 4' has a substantially uniform intensity profile, such that the peak intensity of the laser beam focal line along its optical axis does is not vary by more than 40%, and preferably, according to some embodiments, does is not vary by more than 35%, and preferably does is not vary by more than 30%, and even more preferably does not vary by more than 25% or 20% or by no more than 10%, for at least 85% of the length L of the focal line and preferably for at least 90%, or even or 95% of the length L of the focal line; and
(ii) translating the workpiece 7 and/or the focused laser beam 2' relative to each other along a contour, thereby laser forming a plurality of defect lines 120 along the contour within the workpiece 7.

According to some embodiments periodicity between adjacent defect lines 120 is between 0.1 micron and 20 microns.

Laser forming the plurality of defect lines 120 along the contour within the workpiece 7 with a MGB beam can facilitate separating the workpiece along a surface defined by the contour to form a separated surface. The induced absorption can produce an Ra surface roughness of the cut and separated edge of less than or equal to about 0.5 micron. The induced absorption can also produce features on the separated surface with an average diameter of less than 3 microns.

According to some embodiments the focal line 4' has a substantially uniform intensity profile, such that the peak intensity of the laser beam focal line along its optical axis does (or the beam propagation axis) does not vary by more than 10% or even 5%, for at least 90% of the length L of the focal line. Also, according to some embodiments, a region of focal line 4' that contains 60% of the total optical energy of the entire optical energy of focal line 4' is characterized by 0 to 25% peak intensity variability, relative to the mean peak intensity within that region. Also, according to at least some embodiments the diameter D of the focal line 4' does not vary by more than 20% from its mean diameter within the focal line region corresponding to the length L. For example, according to at least some embodiments the diameter D of the focal line 4' does not vary by more than 15% or 10% from its mean diameter within the focal line region corresponding to the length L of the focal line 4'.

According to one embodiment a method of laser processing a glass workpiece 7 (e.g., glass substrate, a sapphire substrate, silicon material, or a transparent plastic) comprises the steps of: (i) focusing a pulsed laser beam 2 provided by a laser 5 into a laser beam focal line 4' oriented along the beam propagation direction and directed into the glass workpiece, the laser beam focal line 4' generating an induced absorption within the material of the glass workpiece 7, and the induced absorption producing a defect line 120 along the laser beam focal line 4' within the workpiece 7, wherein the focal line 4' has a substantially optical power distribution at least along the length of the defect line 120; and (ii) translating the workpiece 7 and the laser beam 2' relative to each other along a contour, thereby laser forming a plurality of defect lines 120 along the contour within the workpiece 7. According to some embodiments the peak intensity of the laser beam focal line 4' along its optical axis does (or the beam propagation axis) does not vary by more than 20% or more than 15%, or more than 10%, or even more than 5% from the mean peak intensity, for at least 90% of the length of the focal line.

According to one embodiment, a method of laser cutting at least one workpiece or glass article 7 comprises the steps of:
(I) producing a Gaussian laser beam 2 with a laser source 5, for example with a femtosecond or picosecond laser source 5,
(II) modifying the Gaussian laser beam to produce a non-diffracting laser beam 2' such that the quasi non-diffracting laser beam has a substantially uniform intensity profile at least along the length of the defect line 120 (e.g., variability ≤20%, ≤15%, for example ≤10% or even ≤5%, relative to maximum intensity within the length of the defect line 120); or ii) for at least 85% of distance L of the focal line 4' (e.g., variability ≤25%, ≤20%, for example ≤15% or even ≤10%, relative to maximum intensity within the focal line for at least 85% of distance L); and
(III) feeding the workpiece or the glass article to the altered beam spot so that the spot achieves at least one defect line 120, damage area or perforation in the workpiece or the glass article.

According to at least one embodiment the one embodiment non-diffracting laser beam 2' is, for example, a MGB beam or a top hat intensity distribution beam. According to at least some embodiments, modification of the Gaussian laser beam produces a quasi-non-diffracting laser beam 2' such that the quasi non-diffracting laser beam has a substantially uniform intensity profile (e.g., in some embodiments within 25% or within 20% of mean peak intensity, and in some embodiments within 20% of mean maximum peak intensity) for at least for a 90% of distance L of the focal line 4'.

According to at least some embodiments the substantially uniform intensity profile has less than 40%, less than 35%, less than 30%, less than 25%, and even less than 20% intensity variation relative to $I_{max}$ for at least 85% (and preferably for at least 90%) of the focal line's length L that is situated between ½ $I_{max}$ points of the intensity distribution of focal line 4'. According to at least some embodiments the substantially uniform intensity profile has less than 15% intensity variation relative to mean peak intensity for the peak intensities situated between ½ $I_{max}$ points of the intensity distribution of focal line 4', for at least 85% (and preferably for at least 90%) of the focal line's length L that is situated between ½ $I_{max}$ points of the intensity distribution of focal line 4'.

According to one embodiment, a device 100 for processing glass materials comprises:
(i) a laser source 5 generating a light beam 2 having Gaussian intensity profile,
(ii) an optical system 125 (FLIMOS) that converts the light beam 2 into a modified Gauss-Bessel beam 2' and forms a focal line 4' having the following characteristics: (i) a substantially uniform power and/or peak intensity distribution at least for a distance (length) L of the focal line 4'; and (ii) substantially constant diameter D (i.e., within ±25% of mean diameter, and preferably within ±20%, within ±15%, or even within ±10%); and wherein the optical system has optical components with clear apertures that allow for the at least the central portion of the optical beam 2 situated between the $1/e^2$ (radial) points to propagate through. According to at least some embodiments the optical system 125 (FLIMOS) is structured to provide a substantially constant focal line diameter D (i.e., within ±25% of maximum diameter, and preferably within ±20%, within ±15%, or even within ±10% or within 10%, or within 5%, or even within 2% of maximum focal line diameter, at least for the 90% of the length L of the focal line 4'.

According to one embodiment, a device 100 for processing glass materials comprises:
(i) a laser source 5 generating a light beam 2 having Gaussian intensity profile,
(ii) an optical system 125 (FLIMOS) that converts the light beam 2 into a modified Gauss-Bessel beam 2' and forms a focal line 4' having the following characteristics: (i) a substantially uniform power and/or peak intensity distribution at least for a distance d=0.85L (e.g., d=0.9L, or d=0.9L) within the focal line 4'; and (ii) substantially constant diameter D, (i.e., within ±25% of mean diameter, and preferably within ±20%, within ±15%, or even within ±10%) at least along this distance d; and wherein the optical system has optical components with clear apertures that allow for the at least the central portion of the optical beam 2 situated between the $1/e^2$ (radial) points to propagate through.

Further exemplary embodiments are described in the following paragraphs labeled A1 through G17:

A1. A method of laser processing a workpiece, the method comprising:
focusing a pulsed laser beam into a laser beam focal line directed into the workpiece, the laser beam focal line generating an induced absorption within the material, and the induced absorption producing a defect line along the laser beam focal line within the workpiece, wherein said focal line having length L and a substantially uniform intensity profile such that the peak intensity distribution over at least 85% of the length L of the focal line does not vary by more than 40% (and preferably does is not vary by more than 35%, preferably does is not vary by more than 30%, preferably does not vary by more than 20%, preferably does is not vary by more than 20%, and even more preferably does not vary by more than 10%), from mean peak intensity.

A2. The method of paragraph A1, further utilizing an optical system comprising at least one aspheric surface.

A3. The method of paragraph 1A, further utilizing an optical system comprising at least two aspheric surfaces.

A4. The method of paragraph A1 or A2 wherein the aspheric surface is a curved surface of a refractive or a reflective element.

A5. The method any of the paragraphs A1-A4, wherein the focal line has a substantially uniform intensity profile such that the peak intensity distribution over at least 90% of the length L of the focal line does not vary by more 40% (or does not vary by more 35%, or by more than 30%, or by more than 25%, or by more than 20%, or by more than 10%) from mean peak intensity.

A6. The method of any of the paragraphs A1-A4, wherein the focal line has a substantially uniform intensity profile such that the intensity distribution over the length L of the focal line does not vary by more than 30% (and preferably does not vary by more than 20%) from mean peak intensity.

A7. The method any of the paragraphs A1-A4, wherein the focal line has a substantially uniform intensity profile such that the peak intensity distribution over at least 90% of the length L of the focal line does not vary by more 15% from mean peak intensity.

A8. The method of any of the paragraphs A1-A4, wherein said focal line has a substantially uniform intensity profile such that the peak intensity distribution over at least 90% of the length L of the focal line does not vary by more 10% from mean peak intensity.

A9. The method according to A1-A8, utilizing an optical system an optical system 125 (FLIMOS), wherein the optical system is structured to form said laser beam focal line such that for any given cross-section of the beam focal line the laser beam focal line diameter D does not vary by more than 15% from a maximum diameter for at least 90% of the length L of the defect line.

A10. The method of paragraph A9, wherein for any given cross-section of the beam focal line the diameter D does not vary by more than 10% from a maximum diameter for the length L of the defect line B1. A method of laser processing a workpiece, the method comprising:
 focusing a pulsed laser beam into a laser beam focal line directed into the workpiece, the laser beam focal line generating an induced absorption within the material, and the induced absorption producing a defect line along the laser beam focal line within the workpiece, wherein said focal line having length L has a substantially uniform intensity profile such that, the peak intensity distribution over at least 85% of the length L of the focal line in the direction of beam propagation does not vary by more 20% from maximum peak intensity.

B2. The method of any of the paragraphs A1-B1, wherein the workpiece 7 is a glass workpiece.

B3. The method of any of the paragraphs B1-B2, further comprising: translating the workpiece and the laser beam relative to each other along a contour, thereby laser forming a plurality of defect lines along the contour within the workpiece.

B4. The method of any of the paragraphs B1-B3, wherein the focal line has a substantially uniform intensity profile such that the peak intensity distribution over at least 90% of the length L of the focal line in the direction of beam propagation does not vary by more 20% from maximum peak intensity.

B5. The method of paragraph B4, wherein the focal line has a substantially uniform intensity profile such that the peak intensity distribution over at least 90% of the length L of the focal line in the direction of beam propagation does not vary by more than 10% from maximum peak intensity.

B6. The method any of the paragraphs B1-B5, wherein the focal line has a substantially uniform intensity profile such that the peak intensity distribution over at least 90% of the length L of the focal line in the direction of beam propagation does not vary by more 5% from maximum peak intensity.

B7. The method of any of the paragraphs B1-B6, further utilizing an optical system structured to form the laser beam focal line such that for any given cross-section of the beam focal line, the laser beam focal line has a diameter D, and the diameter D does not vary by more than 15% from a maximum diameter for at least 90% of the length L.

B8. The method of paragraph B7, wherein the diameter D does not vary by more than 10% from a maximum diameter for the length L of the defect line.

B9. The method of paragraph B8, wherein the diameter D does not vary by more than 5% from a maximum diameter for the length L of the defect line.

B7-2. The method of any of the paragraphs B1-B6, further utilizing an optical system structured to form the laser beam focal line such that for any given cross-section of the beam focal line, the laser beam focal line has a diameter D, and the diameter D does not vary by more than 15% from a median diameter for at least 90% of the length L.

B8-2. The method of paragraph B7, wherein the diameter D does not vary by more than 10% from a mean (average) diameter for the length L of the defect line.

B9-2. The method of paragraph B8, wherein the diameter D does not vary by more than 5% from a mean (average) diameter for the length L of the defect line.

B10. The method according to any of paragraphs: B1 to B9, B7-2 to B9-2, wherein the optical system includes at least two aspheric components.

B10-1. The method according to any of paragraphs: B1 to B9, B7-2 to B9-2, wherein the optical system includes at least two aspheric components each having at least one curved surface.

B10-2. The method according to any of paragraphs A1-A9, or B1-B9, or B7 through B9-2, wherein the optical system includes at least one aspheric component with a curved surface, wherein said aspheric component is defined by at least one non-zero higher order aspheric coefficient $a_2$-$a_{12}$.

C1. A method of laser processing a workpiece, the method comprising:
 (i) focusing a pulsed laser beam into a laser beam focal line oriented along the beam propagation axis;
 (ii) directing the laser beam focal line into the workpiece, the laser beam focal line generating an induced absorption within the workpiece material, and the induced absorption producing a defect line along the laser beam focal line within the workpiece, wherein the focal line has a L and a peak on-axis optical power profile and the optical power of the laser beam focal line is confined into a region along the propagation axis such that 80% of the power is contained being between the half-maximum power points of the power distribution along the propagation axis.

C2. The method of laser processing a workpiece according to paragraph C1, wherein the focal line is characterized by energy density per unit length, and the energy density of the focal line per unit length along the propagation axis does not vary by more than 20% over at least 90% of the length L of the focal line.

C3. The method of laser processing a workpiece according to paragraph C1, wherein said focal line is characterized by energy density per unit length and the energy density of the focal line per unit length along the propagation axis does not vary by more than 10% over at least 90% of the length L of the focal line.

C4. The method of laser processing a glass workpiece according to any of the paragraphs C1 to C3, further utilizing an optical system structured to form said laser beam focal line such that the laser beam focal line has a length L and diameter D, and the diameter D for any given cross-section of the beam focal line does not vary by more than 15% from a maximum diameter for at least 90% of the length L.

C5. The method of laser processing a glass workpiece according to paragraphs C1, C2, C3, or C4, wherein the diameter D does not vary by more than 10% from a maximum diameter for the length L of the defect line.

C6. The method of laser processing a glass workpiece according to paragraph C5, wherein the diameter D does not vary by more than 5% from a maximum diameter for the length L of the defect line.

C7. The method according to paragraphs C1, C2, C3, or C4, wherein the-optical system 125 includes at least two aspheric optical components.

C7-1. The method according to paragraphs C1, C2, C3, or C4, wherein the-optical system 125 includes at least one aspheric optical component having a curved surface and the aspheric component is defined by at least one non-zero higher order aspheric coefficient $a_2$-$a_{12}$.

C8. The method of any of the paragraphs C1-C7, wherein the aspheric component(s) of the optical system 125 are reflective or refractive optical component(s) having at least one aspherical surface.

C9. The method any of the paragraphs C1-C8, or C7-1, wherein the optical system 125 is structured such that optical beams exiting the optical system, for any cross-section, at different heights relative to the focal line converge toward the focal line at a substantially the same angle β', within 10% of each other.

D0. A method of laser processing a glass workpiece, the method comprising:
(i) focusing a pulsed laser beam into a laser beam focal line oriented along the beam propagation axis;
(ii) directing the laser beam focal line into the glass workpiece, the laser beam focal line generating an induced absorption within the material, and the induced absorption producing a defect line along the laser beam focal line within the workpiece, wherein the focal line has an on-axis peak intensity profile and the optical energy of the laser beam focal line is confined into a region along the propagation axis such that >80% of total intensity is contained being between the half-maximum peak intensity points of the peak intensity distribution along the propagation axis.

D0-1. A method of laser processing a glass workpiece, the method comprising:
(i) focusing a pulsed laser beam into a laser beam focal line oriented along the beam propagation axis;
(ii) directing the laser beam focal line into the glass workpiece, the laser beam focal line generating an induced absorption within the material, and the induced absorption producing a defect line along the laser beam focal line within the workpiece, wherein the focal line has an on-axis peak intensity profile and the optical energy of the laser beam focal line is confined into a region along the propagation axis such that >60%, greater than 65%, greater than 70%, greater than 80%, or >85% (e.g., greater than 85%, or greater than 90%, of total energy is contained being between the half-maximum peak intensity points of the peak intensity distribution along the propagation axis D1. The method of claim D0 or D0-1, further utilizing an optical system 125 structured to form said laser beam focal line such that the laser beam focal line has a diameter D, and the diameter D for any given cross-section of the beam focal line does not vary by more than 15% from a maximum diameter for at least 90% of the length L of the defect line.

D2. The method of claim D1, wherein the optical system 125 includes at least two aspheric components, and at least one of the aspheric components having a surface being defined by at least one no zero aspheric coefficient chosen from aspheric coefficients $a_2$-$a_{12}$.

D2A. The method of claim D1, wherein the optical system 125 includes at one or more aspheric components having an aspheric surface being defined by at least one no zero aspheric coefficient chosen from aspheric coefficients $a_2$-$a_{12}$.

D2B The method of claim D1A, wherein an aspheric surface is a curved surface.

D3. The method of D1, D2A, D2B, or D2 further comprising: utilizing a optical system such that optical beams exiting the optical system, for any cross-section, at different heights relative to the focal line converge toward the focal line at a substantially the same angle β', within 10% of each other.

D4. The method of claim D2A, D2, or D2B, further comprising: utilizing a optical system such that optical beams exiting the optical system at different heights relative to the focal line converge toward the focal line at a substantially the same angle β', within 5% of each other.

D5. A device for laser processing transparent materials, comprising: (i) a laser source generating a Gaussian intensity profile beam,
(ii) an optical system 125 forming a modified Gauss-Bessel beam, the optical system comprising at least two aspheric components and configured to provide into a laser beam focal line oriented along the beam propagation axis;
wherein the laser beam focal line has an on-axis peak intensity profile and the optical energy of the laser beam focal line is confined into a region along the propagation axis such that greater than 80% of total intensity is contained being between the half-maximum power points of the peak intensity distribution along the propagation axis.

D6. The device according to paragraph D5, further utilizing an optical system 125 is structured to form the laser beam focal line such that the laser beam focal line has a length L and diameter D, and the diameter D for any given cross-section of the beam focal line does not vary by more than 20% from a maximum diameter for at least 90% of the length L.

D7. The device of paragraphs D5 or D6, wherein the optical system 125 comprises at least one aspheric surface.

D7-1. The device of any of the paragraphs D5-D7, wherein the optical system 125 comprises at least two aspheric surfaces.

D8. The device of any of the paragraphs D5-D7 wherein said aspheric surface is formed on a curved surface of a refractive or a reflective element. Preferably the optical system 125 has at least one aspheric defined by at least one no zero aspheric coefficient chosen from aspheric coefficients $a_2$-$a_{12}$ D9. The device according to paragraphs D5, D6, D7, D7-1, or D8, wherein the laser source is a femtosecond or picosecond laser.

D10. The device according to paragraphs D0-D9, wherein pulsed laser has laser power of 10 W-150 W and produces pulse bursts with at least 2 pulses per pulse burst.

D11. The device according to claim D0-D10, wherein the pulsed laser has laser power of 10 W-100 W and produces pulse bursts with at least 2-25 pulses per pulse burst.

D12. The device according to paragraphs D0-D11, wherein (i) the pulsed laser has laser power of 10 W-100 W; and (ii) the workpiece or the laser beam is translated relative to one another at a rate of at least 0.4 msec.

E0. A device for laser processing transparent materials, comprising: (i) a laser source generating a Gaussian intensity profile beam, (ii) an optical system 125 forming a modified Gauss-Bessel beam, said optical system comprising at least one aspheric component, and configured to provide into a laser beam focal line oriented along the beam propagation axis such that the laser beam focal line has a length L and diameter D, and the diameter D for any given cross-section of the beam focal line does not vary by more than 20% from a maximum diameter of the focal line for at least 90% of the length L.

E1. The device according E0, further utilizing an optical system 125 is structured to form said laser beam focal line such that the laser beam focal line has a length L and diameter D, and the diameter D for any given cross-section of the beam focal line does not vary by more than 10% from a maximum diameter of the focal line for at least 90% of the length L.

E2. The device of E0 or E1, further utilizing an optical system 125 comprising at least one aspheric surface, E3. The device of claim E0-E2, further utilizing an optical system 125 comprising at least two aspheric surfaces.

E5. The device of claim E2, wherein said aspheric surface is formed on a curved surface of a refractive or a reflective element of the optical system 125.

E6. The device of E1-E5 wherein the optical system of includes at least one aspheric component with a curved surface, wherein said aspheric component is defined by at least one (and preferably at least two) non-zero higher order aspheric coefficient(s) $a_2$-$a_{12}$.

E7. A method of any of the paragraphs A1 through C9 wherein the pulsed laser beam is produced by a pulse laser source, wherein the laser source is a femtosecond or picosecond laser.

E8. The method of paragraph E7, wherein pulsed laser source (i.e., the pulsed laser) has laser power of 10 W-150 W and produces pulse bursts with at least 2 pulses per pulse burst.

E8. The device according to paragraph E7, wherein the pulsed laser has laser power of 10 W-100 W and produces pulse bursts with at least 2-25 pulses per pulse burst.

E9. The device according to paragraph E7, wherein (i) the pulsed laser has laser power of 10 W-100 W; and (ii) the workpiece or the laser beam is translated relative to one another at a rate of at least 0.4 msec.

F1. A method for laser processing a transparent workpiece, the method comprising: forming a contour line in the transparent workpiece, the contour line comprising defects in the transparent workpiece, wherein forming the contour line comprises: directing a pulsed laser beam oriented along a beam pathway and output by a beam source through a conical (e.g., axicon, waxicon, etc.) or approximately conical (e.g., a modified axicon or a modified waxicon, or another aspherical element, with at least one aspheric surface having a non-zero higher order aspheric coefficient(s) $a_2$-$a_{12}$) wavefront producing optical element and into the transparent workpiece such that the portion of the pulsed laser beam directed into the transparent workpiece forms a focal line and generates an induced absorption within the transparent workpiece, the induced absorption producing a defect within the transparent workpiece, and the portion of the pulsed laser beam directed into the transparent workpiece comprises:

a wavelength λ;

an effective spot size $w_{o,\mathit{eff}}$; and a non-axisymmetric beam cross section that comprises a minimum Rayleigh range $Z_{Rx,min}$ in a cross-sectional x-direction and a minimum Rayleigh range $Z_{Ry,min}$ in a cross-sectional y-direction, wherein the smaller of $Z_{Rx,min}$ and $Z_{Ry,min}$ is greater than $$F_D \frac{\pi w_{0,\mathit{eff}}^2}{\lambda},$$

where $F_D$ is a dimensionless divergence factor that is greater tan 10, and preferably greater than 50, and in at least some embodiments greater than 75 (e.g., 100≥$F_D$≥10000) wherein the focal line has a length L and a substantially uniform intensity profile such that the peak intensity distribution over at least 85% of the length L of the focal line does not vary by more than 40%, (e.g, does not vary by more than 35%, or by more than 30%, or by more than 25%, or by more than 20%, or by more than 10%) from mean peak intensity.

F2. The method of paragraph F1 wherein the such that for any given cross-section of the beam focal line the laser beam focal line diameter D does not vary by more than 15% from a maximum diameter for at least 90% of the length L of the defect line.

F3. The method of paragraph F1 or F2 wherein the conical wavefront producing optical element is positioned offset in a radial direction from the beam pathway (i.e., is not centered on the center of the beam).

F4. The method of paragraph F3 or F2 wherein the optical element positioned offset in a radial direction from the beam pathway is optical component 3' described above.

F5. The method of paragraph F1 or F2 further comprising the step of decohering a first beam portion of the pulsed laser beam from a second beam portion of the pulsed laser beam using a decohering optical element positioned between the beam source and the transparent workpiece. For example, according to some embodiments, polarizing the first beam portion to a first polarization and polarizing the second beam portion to a second polarization that is orthogonal the second beam portion decoheres the first beam portion from the second beam portion.

F6. The method of paragraph F5 wherein decohering optical element comprises at least one waveplate (e.g., a split quarter waveplate SQW), and wherein the step of decohering (making incoherent) the first beam portion from the second beam portion comprises:

(a) polarizing the first beam portion of the pulsed laser beam such that the first beam portion of the pulsed laser beam comprises a first polarization at the transparent workpiece; and (b) polarizing the second beam portion of the pulsed laser beam such that the second beam portion of the pulsed laser beam comprises a second polarization at the transparent workpiece, wherein the first polarization is orthogonal the second polarization.

For example, the SQW may be utilized in conjunction with the optical system 125 (FLIMOS) to create beam focal lines with an oblong (e.g., elliptical cross sections). In some embodiments SQW is situated in front of the optical system 125 (FLIMOS). In some embodiments the SQW is situated inside the optical system 125 (FLIMOS), or it can be situated between the optical system 125 (FLIMOS) and the focal line. In this embodiment, an additional quarter wave plate is placed upstream of SQW to create circularly polarized light. In some embodiments, split quarter waveplate SQW comprises a first plate portion SQW1 having a first fast axis SQW1$a$ and a first slow axis SWQ1$a'$. The split quarter waveplate also comprises and a second plate portion SQW2 having a second fast axis SQW2$b$ and a second slow axis SQW2$b'$. Further, the first fast axis QW1$a$ is orthogonal to the second fast axis SQW2$b$ and the first slow axis SWQ1$a'$ is orthogonal to the second slow axis SQW2$b'$. When the pulsed laser beam reverses the split quarter waveplate SQW, the first plate portion SQW1 having the first fast axis SQW1$a$ and first slow axis SWQ1$a'$ polarizes a first beam portion of the pulsed laser beam—into a first polarization (e.g., a specific horizontal, vertical, or circular polarization) and the second plate portion SQW1 having the second fast axis SQW2$b$ polarizes a second beam portion of the pulsed laser beam into a second polarization (e.g., another specific horizontal, vertical, or circular polarization). Polarizing the first beam portion to a first polarization and polarizing the second beam portion to a second polarization that is orthogonal the second beam portion decoheres the first beam portion from the second beam portion. While the split quarter waveplate SQW is depicted as comprising two plate portions (e.g., the first and second plate portions SQW1, SQW2), other embodiments of the split quarter waveplate SQW may comprise any number of plate portions. As with the previously described blocking elements, these portions of the spilt quarter waveplate SQW may be made in the form of cross sectional chord portions, or more preferably sectors. In these embodiments, a first plurality of plate portions comprise the first fast axis SQW1$a$ and the first slow axis SWQ1$a'$ and a second plurality of plate portions comprise the second fast axis SQW2$b$ and the second slow axis SQW2$b'$. Further, the first plurality of plate portions may collectively comprise about 50% of the split quarter waveplate SQW and the second plurality of plate portions may collectively comprise another 50% of the split quarter waveplate SQW. It is noted that other components that de-cohere the optical beam may be utilized instead of SQW (e.g., a blocking element that blocks a portion of the optical beam and that is preferably situated within the optical system 125 (FLIMOS). Other ways to de-cohere one beam portion from the rest of the beam, so as to create a non-axisymmetric beam cross section. Preferably, the non-axisymmetric beam cross section that comprises a minimum Rayleigh range $Z_{Rx,min}$ in a cross-sectional x-direction and a minimum Rayleigh range $Z_{Ry,min}$ in a cross-sectional y-direction, wherein the smaller of $Z_{Rx,min}$ and $Z_{Ry,min}$ is greater than $$F_D \frac{\pi w_{0,eff}^2}{\lambda},$$

where $F_D$ is a dimensionless divergence factor that is greater than 15 and preferably greater than 50, and in at least some embodiments greater than 75 (e.g., $100 \geq F_D \geq 10000$).

F7. The method of paragraph F1 or F2 or F5, the method further including directing the pulsed laser beam beyond an optical blocking element, wherein the optical blocking element is positioned between the conical wavefront producing optical element and the transparent workpiece. Preferably, the beam cross section is anon-axisymmetric beam cross section that comprises a minimum Rayleigh range $Z_{Rx,min}$ in a cross-sectional x-direction and a minimum Rayleigh range $Z_{Ry,min}$ in a cross-sectional y-direction, wherein the smaller of $Z_{Rx,min}$ and $Z_{Ry,min}$ is greater than $$F_D \frac{\pi w_{0,eff}^2}{\lambda},$$

where $F_D$ is a dimensionless divergence factor that is greater than 15 and preferably greater than 50, and in at least some embodiments greater than 75 (e.g., $100 \geq FD \geq 10000$).

F8. The method of paragraph F1 or F2, further utilizing an optical delay plate, configured to induce a specific optical delay (retardation) into a first portion of the pulsed laser beam, relative to another portion (second portion of the pulsed laser beam). For example, the optical delay plate may induce an optical retardation of $\pi$ over half the pulsed laser beam (where one optical period of the laser wavelength is considered to cover 2η radians of optical phase, so an optical retardation of $\pi$ is a delay of one-half the optical period), an optical retardation of $0.875\pi$ over half the pulsed laser beam 112, and, in some embodiments, an optical retardation of $0.5\pi$ over half the laser beam. Preferably, the beam cross section is a non-axisymmetric beam cross section that comprises a minimum Rayleigh range $Z_{Rx,min}$ in a cross-sectional x-direction and a minimum Rayleigh range $Z_{Ry,min}$ in a cross-sectional y-direction, wherein the smaller of $Z_{Rx,min}$ and $Z_{Ry,min}$ is greater than $$F_D \frac{\pi w_{0,eff}^2}{\lambda},$$

where $F_D$ is a dimensionless divergence factor that is greater than 15 and preferably greater than 50, and in at least some embodiments greater than 75 (e.g., $100 \geq F_D \geq 10000$).

G1. A method of laser processing a workpiece, the method comprising:
focusing a pulsed laser beam into a laser beam focal line directed into the workpiece, the laser beam focal line generating an induced absorption within the material, and the induced absorption producing a defect line along the laser beam focal line within the workpiece,
wherein said focal line having length L and a substantially uniform intensity profile such that the peak intensity distribution over at least 85% of the length L of the focal line does not vary by more than 40%, or by more than 35%, or by more than 30%, or by more than 25%, or by more than 20%, or by more than 10% from mean peak intensity.

G2. The method according to paragraph G1, further utilizing an optical system comprising at least one aspheric surface.

G3. The method according to paragraph G2 wherein said aspheric surface is a curved surface of a refractive or a reflective element.

G4. The method according to paragraph G1, wherein (i) said focal line has a substantially uniform intensity profile such that the peak intensity distribution over at least 90% of the length L of the focal line does not vary by more 20% from mean peak intensity, such that the peak intensity distribution over at least 90% of the length L of the focal line does not vary by more 15% or does not vary by more 15% from mean peak intensity; or (ii) said focal line has a substantially uniform intensity profile such that the intensity distribution over the length L of the focal line does not vary by more 40%, or by more than 35%, or by more than 30%, or by more than 25%, or by more than 20%, from mean peak intensity, and preferably does not vary by more 15% or by more than 10% from mean peak intensity.

G5. The method according to any of the paragraphs G1-4, said optical system being structured to form said laser beam focal line such that: (i) for any given cross-section of the beam focal line the laser beam focal line diameter D does not vary by more than 15% from a maximum diameter for at least 90% of the length L of the defect line; or (ii) for any given cross-section of the beam focal line the diameter D does not vary by more than 10% from a maximum diameter for the length L of the defect line.

G6. The method of laser processing a workpiece according to any of the paragraphs G1-G5, wherein said focal line is characterized by energy density per unit length, and the energy density of the focal line per unit length along the propagation axis does not vary by more than does not vary by more than 15% over at least over at least 90% of the length L of the focal line, and preferably does not vary by more than 10% (or by no more than 5%) over at least over at least 90% of the length L of the focal line. According to some embodiments, the energy density of the focal line per unit length along the propagation axis does not vary by more than does not vary by more than 25% the length L of the focal line. According to some embodiments, the energy density of the focal line per unit length along the propagation axis does not vary by more than does not vary by more than 20% the length L of the focal line. According to some embodiments, the energy density of the focal line per unit length along the propagation axis does not vary by more than does not vary by more than 15% the length L of the focal line. According to some embodiments, the energy density of the focal line per unit length along the propagation axis does not vary by more than does not vary by more than 10% the length L of the focal line.

G7. The method according to any of the Paragraphs G1-G6, wherein the optical system includes at least two aspheric optical components.

G8. The method according to any of the paragraphs G1-G7, wherein optical system is structured such that optical beams exiting the optical system, for any cross-section, at different heights relative to the focal line converge toward the focal line at a substantially the same angle β', within 10% of each other.

G9. A device for laser processing transparent materials, comprising: (i) a laser source generating a Gaussian intensity profile beam,
an optical system forming a modified Gauss-Bessel beam, said optical system comprising at least two aspheric components and configured to provide into a laser beam focal line oriented along the beam propagation axis;
wherein the laser beam focal line has an on-axis peak intensity profile and the optical energy of the laser beam focal line is confined into a region along the propagation axis such that: (i) greater than 75%, or even greater than 80% of total intensity is contained being between the half-maximum power points of the peak intensity distribution along the propagation axis; and/or (ii) the diameter D for any given cross-section of the beam focal line does not vary by more than 20%, and preferably by no more than 10% from a maximum diameter for at least 90% of the length L.

G10. The device according to paragraph G9, further utilizing an optical system comprising at least one aspheric surface.

G11. The device according to paragraph G8 or G10, further utilizing an optical system comprising at least two aspheric surfaces.

G11. The method according to paragraph G11 wherein the aspheric surface is formed on a curved surface of a refractive or a reflective element.

G12. The device according to according to paragraph G9-11, wherein the laser source is a femtosecond or picosecond laser.

G13. The device according to paragraph G12, wherein pulsed laser has laser power of 10 W-150 W and produces pulse bursts with at least 2 pulses per pulse burst.

G14. The device or a method according to any of the paragraphs A1-G13, wherein the beam focal line has a non-axisymmetric beam cross section that comprises a minimum Rayleigh range $Z_{Rx,min}$ in a cross-sectional x-direction and a minimum Rayleigh range $Z_{Ry,min}$ in a cross-sectional y-direction, wherein the smaller of $Z_{Rx,min}$ and $Z_{Ry,min}$ is greater than $$F_D \frac{\pi w_{0,eff}^2}{\lambda},$$

where $F_D$ is a dimensionless divergence factor that is greater than 15 and preferably greater than 50, and in at least some embodiments greater than 75 (e.g., $100 \geq F_D \geq 10000$).

G15. The device or a method according to any of the paragraphs A1-G14, wherein said workpiece comprises a portion that includes a coating, and a portion that does not include a coating.

G16. The device or method according to paragraphs G15, wherein the uncoated workpiece portion has a thickness d, and a distance between the center of the focal line and the coating (i.e., of the coating that is adjacent to the focal line) is less than 500 μm, preferably less than 350 μm, for example between 10 μm and 250 μm, or between 10 μm and 200 μm, between 20 μm and 500 μm, or between and 400 μm, or between 20 μm and 300 μm, or between 20 μm and 250 μm, or between 15 μm and 300 μm, or between 15 μm and 400 μm, or between 15 μm and 500 μm.

G17. The method or device according paragraph G15 or G16, wherein a plurality of perforations or defects are formed via said focal line within the portion of the workpiece that does not include the coating, and said plurality of perforations or defects are formed a distance Zd from said coated portion (distance Zd is measured edge-to edge—i.e., from the edge of the perforation(s) or defect(s) to the edge of the coating that is adjacent to the perforation(s) or defect(s)), wherein the uncoated workpiece portion has a thickness d and wherein Zd≤d/3 and Zd>5 µm, for example Zd>10 µm, or >15 µm. According to some embodiments Zd≤d/4, and according to some embodiments Zd≤d/5.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of laser processing a workpiece, the method comprising:
   focusing a pulsed laser beam into a laser beam focal line directed into the workpiece, the laser beam focal line generating an induced absorption within the material, and the induced absorption producing a defect line along the laser beam focal line within the workpiece,
   wherein said focal line having length L and a substantially uniform intensity profile such that the peak intensity distribution over at least 85% of the length L of the focal line does not vary by more than 20% from mean peak intensity.

2. The method of claim 1, further utilizing an optical system comprising at least one aspheric surface.

3. The method of claim 2, wherein said aspheric surface is a curved surface of a refractive or a reflective element.

4. The method according to claim 2, said optical system being structured to form said laser beam focal line such that for any given cross-section of the beam focal line the laser beam focal line diameter D does not vary by more than 15% from a maximum diameter for at least 90% of the length L of the defect line.

5. The method of claim 4, wherein for any given cross-section of the beam focal line the diameter D does not vary by more than 10% from a maximum diameter for the length L of the defect line.

6. The method of claim 1, further utilizing an optical system comprising at least two aspheric surfaces.

7. The method of claim 1, wherein said focal line has a substantially uniform intensity profile such that the peak intensity distribution over at least 90% of the length L of the focal line does not vary by more than 20% from mean peak intensity.

8. The method of claim 1, wherein said focal line has a substantially uniform intensity profile such that the intensity distribution over the length L of the focal line does not vary by more than 20% from mean peak intensity.

9. The method of claim 1, wherein said focal line has a substantially uniform intensity profile such that the peak intensity distribution over at least 90% of the length L of the focal line does not vary by more than 15% from mean peak intensity.

10. The method of claim 1, wherein said focal line has a substantially uniform intensity profile such that the peak intensity distribution over at least 90% of the length L of the focal line does not vary by more than 10% from mean peak intensity.

11. The method of claim 1, wherein said workpiece is a glass workpiece.

12. The method of claim 11, further comprising: translating the workpiece and the laser beam relative to each other along a contour, thereby laser forming a plurality of defect lines along the contour within the workpiece.

13. The method of claim 1, wherein the beam focal line has a non-axisymmetric beam cross section that comprises a minimum Rayleigh range $Z_{Rx,min}$ in a cross-sectional x-direction and a minimum Rayleigh range $Z_{Ry,min}$ in a cross-sectional y-direction, wherein the smaller of $Z_{Rx,min}$ and $Z_{Ry,min}$ is greater than $$F_D \frac{\pi w_{0,eff}^2}{\lambda},$$

where $F_D$ is a dimensionless divergence factor that is greater than 15.

14. The method of the claim 1, wherein said workpiece comprises: (a) at least one portion that includes a coating, and (b) at least one portion that does not include a coating.

15. The method or device according to claim 1, wherein the uncoated workpiece portion has a thickness d, and a distance between the center of the focal line and the coating is less than 500 µm.

16. The method of claim 1, wherein the uncoated workpiece portion has a thickness d, and wherein a plurality of perforations or defects are formed via said focal line within the least one portion of the workpiece that does not include a coating, and said plurality of perforations or defects are formed a distance $Z_d$ from said coated portion, such that $Z_d \leq d/3$ and $Z_d > 5$ µm.

17. A method of laser processing a workpiece, the method comprising:
    focusing a pulsed laser beam into a laser beam focal line directed into the workpiece, the laser beam focal line generating an induced absorption within the material, and the induced absorption producing a defect line along the laser beam focal line within the workpiece,
    wherein said focal line having length L has a substantially uniform intensity profile such that, the peak intensity distribution over at least 85% of the length L of the focal line in the direction of beam propagation does not vary by more than 20% from maximum peak intensity.

18. The method of claim 17, wherein said focal line has a substantially uniform intensity profile such that the peak intensity distribution over at least 90% of the length L of the focal line in the direction of beam propagation does not vary by more than 20% from maximum peak intensity.

19. The method of claim 18, wherein said focal line has a substantially uniform intensity profile such that the peak intensity distribution over at least 90% of the length L of the focal line in the direction of beam propagation does not vary by more than 10% from maximum peak intensity.

20. The method of claim 17, wherein said focal line has a substantially uniform intensity profile such that the peak intensity distribution over at least 90% of the length L of the focal line in the direction of beam propagation does not vary by more than 5% from maximum peak intensity.

21. The method of claim 17, further utilizing an optical system structured to form said laser beam focal line such that for any given cross-section of the beam focal line, the laser beam focal line has a diameter D, and the diameter D does not vary by more than 15% from a maximum diameter for at least 90% of the length L.

22. The method of claim 21, wherein the diameter D does not vary by more than 10% from a maximum diameter for the length L of the defect line.

23. The method of claim 22, wherein the diameter D does not vary by more than 5% from a maximum diameter for the length L of the defect line.

24. The method of claim 21, wherein the optical system includes at least two aspheric components.

25. A method of laser processing a workpiece, the method comprising:
(i) focusing a pulsed laser beam into a laser beam focal line oriented along the beam propagation axis;
(ii) directing the laser beam focal line into the workpiece, the laser beam focal line generating an induced absorption within the workpiece material, and the induced absorption producing a defect line along the laser beam focal line within the workpiece, wherein the focal line has a L and a peak on-axis optical power profile and the optical power of the laser beam focal line is confined into a region along the propagation axis such that 80% of the power is contained being between the half-maximum power points of the power distribution along the propagation axis.

26. The method of laser processing a workpiece according to claim 25, wherein said focal line is characterized by energy density per unit length, and the energy density of the focal line per unit length along the propagation axis does not vary by more than 20% over at least 90% of the length L of the focal line.

27. The method of laser processing a workpiece according to claim 25, wherein said focal line is characterized by energy density per unit length, and the energy density of the focal line per unit length along the propagation axis does not vary by more than 10% over at least 90% of the length L of the focal line.

28. The method of laser processing a glass workpiece according to claim 25, further utilizing an optical system structured to form said laser beam focal line such that the laser beam focal line has a length L and diameter D, and the diameter D for any given cross-section of the beam focal line does not vary by more than 15% from a maximum diameter for at least 90% of the length L.

29. The method of laser processing a glass workpiece according to claim 28, wherein the diameter D does not vary by more than 10% from a maximum diameter for the length L of the defect line.

30. The method of laser processing a glass workpiece according to claim 12, wherein the diameter D does not vary by more than 5% from a maximum diameter for the length L of the defect line.

31. The method of claim 28, wherein the optical system includes at least two aspheric optical components.

32. The method of claim 31, wherein optical system is structured such that optical beams exiting the optical system, for any cross-section, at different heights relative to the focal line converge toward the focal line at a substantially the same angle $\beta'$, within 10% of each other.

33. The method of claim 28, wherein said aspheric components are reflective or refractive optical components, each having at least one aspherical surface.

34. A method of laser processing a glass workpiece, the method comprising:
(i) focusing a pulsed laser beam into a laser beam focal line oriented along the beam propagation axis;
(ii) directing the laser beam focal line into the glass workpiece, the laser beam focal line generating an induced absorption within the material, and the induced absorption producing a defect line along the laser beam focal line within the workpiece, wherein the focal line has an on-axis peak intensity profile and the optical energy of the laser beam focal line is confined into a region along the propagation axis such that >80% of total intensity is contained being between the half-maximum peak intensity points of the peak intensity distribution along the propagation axis.

35. The method of claim 34, further utilizing an optical system structured to form said laser beam focal line such that the laser beam focal line has a diameter D, and the diameter D for any given cross-section of the beam focal line does not vary by more than 15% from a maximum diameter for at least 90% of the length L of the defect line.

36. The method of claim 35, wherein the optical system includes at least two aspheric components.

37. The method of claim 36, further comprising: utilizing a optical system such that optical beams exiting the optical system, for any cross-section, at different heights relative to the focal line converge toward the focal line at a substantially the same angle $\beta'$, within 10% of each other.

38. The method of claim 36, further comprising: utilizing a optical system such that optical beams exiting the optical system at different heights relative to the focal line converge toward the focal line at a substantially the same angle $\beta'$, within 5% of each other.

39. A device for laser processing transparent materials, comprising: (i) a laser source generating a Gaussian intensity profile beam,
(ii) an optical system forming a modified Gauss-Bessel beam, said optical system comprising at least two aspheric components and configured to provide into a laser beam focal line oriented along the beam propagation axis;
wherein the laser beam focal line has an on-axis peak intensity profile and the optical energy of the laser beam focal line is confined into a region along the propagation axis such that greater than 80% of total intensity is contained being between the half-maximum power points of the peak intensity distribution along the propagation axis.

40. The device according to claim 39, further utilizing an optical system structured to form said laser beam focal line such that the laser beam focal line has a length L and diameter D, and the diameter D for any given cross-section of the beam focal line does not vary by more than 20% from a maximum diameter for at least 90% of the length L.

41. The device of claim 39, further utilizing an optical system comprising at least one aspheric surface.

42. The device of claim 39, further utilizing an optical system comprising at least two aspheric surfaces.

43. The method of claim 39, wherein said aspheric surface is formed on a curved surface of a refractive or a reflective element.

44. The device according to claim 39, wherein the laser source is a femtosecond or picosecond laser.

45. The device according to claim 39, wherein pulsed laser has laser power of 10 W-150 W and produces pulse bursts with at least 2 pulses per pulse burst.

46. The device according to claim 39, wherein the pulsed laser has laser power of 10 W-100 W and produces pulse bursts with at least 2-25 pulses per pulse burst.

47. The device according to claim 39, wherein (i) the pulsed laser has laser power of 10 W-100 W; and (ii) the workpiece or the laser beam is translated relative to one another at a rate of at least 0.4 msec.

48. The device of claim 47, further utilizing an optical system comprising at least one aspheric surface.

49. The device of claim 47, further utilizing an optical system comprising at least two aspheric surfaces.

50. The device of claim 47, wherein said aspheric surface is formed on a curved surface of a refractive or a reflective element.

51. The device according to claim 39, further utilizing an optical system structured to form said laser beam focal line such that the laser beam focal line has a length L and diameter D, and the diameter D for any given cross-section of the beam focal line does not vary by more than 10% from a maximum diameter of the focal line for at least 90% of the length L.

52. The device of claim 39, wherein said device is structured such that the beam focal line has a non-axisymmetric beam cross section that comprises a minimum Rayleigh range $Z_{Rx,min}$ in a cross-sectional x-direction and a minimum Rayleigh range $Z_{Ry,min}$ in a cross-sectional y-direction, wherein the smaller of $Z_{Rx,min}$ and $Z_{Ry,min}$ is greater than $$F_D \frac{\pi w_{0,eff}^2}{\lambda},$$

where $F_D$ is a dimensionless divergence factor that is greater than 15.

53. The device of claim 39, wherein said workpiece comprises: (a) at least one portion that includes a coating, and (b) at least one portion that does not include a coating.

54. The device according to claim 39, wherein the uncoated workpiece portion has a thickness d, and a distance between the center of the focal line and the coating is less than 500 µm.

55. The device of claim 39, wherein the uncoated workpiece portion has a thickness d, and wherein a plurality of perforations or defects are formed via said focal line within the least one portion of the workpiece that does not include a coating, and said plurality of perforations or defects are formed a distance $Z_d$ from said coated portion, such that $Z_d \leq d/3$ and $Z_d > 5$ µm.

56. A device for laser processing transparent materials, comprising: (i) a laser source generating a Gaussian intensity profile beam,
(ii) an optical system forming a modified Gauss-Bessel beam, said optical system comprising at least one aspheric component, and configured to provide into a laser beam focal line oriented along the beam propagation axis such that the laser beam focal line has a length L and diameter D, and the diameter D for any given cross-section of the beam focal line does not vary by more than 20% from a maximum diameter of the focal line for at least 90% of the length L.

* * * * *

UNITED STATES PATENT AND TRADEMARK OFFICE
CERTIFICATE OF CORRECTION

| | | |
|---|---|---|
| PATENT NO. | : 10,522,963 B2 | Page 1 of 2 |
| APPLICATION NO. | : 15/689456 | |
| DATED | : December 31, 2019 | |
| INVENTOR(S) | : Lovell Eglin Comstock, II et al. | |

It is certified that error appears in the above-identified patent and that said Letters Patent is hereby corrected as shown below:

On the Title Page

On page 5, in Column 1, item (56), Other Publications, Line 4, delete "micro-achitecture," and insert -- micro-architecture, --, therefor.

On page 5, in Column 2, item (56), Other Publications, Line 10, delete "Egineering" and insert -- Engineering --, therefor.

On page 5, in Column 2, item (56), Other Publications, Line 48, delete "EuropeTec" and insert -- EuropTec --, therefor.

On page 5, in Column 2, item (56), Other Publications, Line 62, delete "Proccessing" and insert -- Processing --, therefor.

On page 6, in Column 2, item (56), Other Publications, Line 35, delete "pluse" and insert -- pulse --, therefor.

In the Claims

In Column 54, Line 29, Claim 14, delete "method of the" and insert -- method of --, therefor.

In Column 54, Line 32, Claim 15, delete "method or device" and insert -- method --, therefor.

In Column 55, Line 46, Claim 28, after "processing a" delete "glass".

In Column 55, Line 53, Claim 29, after "processing a" delete "glass".

In Column 55, Line 57, Claim 30, after "processing a" delete "glass".

Signed and Sealed this
Twenty-fifth Day of February, 2020

Andrei Iancu
*Director of the United States Patent and Trademark Office*

In Column 56, Line 63, Claim 43, delete "method" and insert -- device --, therefor.

In Column 57, Line 11, Claim 47, delete "msec." and insert -- m/sec. --, therefor.